(12) United States Patent
Ohsaki et al.

(10) Patent No.: US 6,475,461 B1
(45) Date of Patent: *Nov. 5, 2002

(54) POROUS CARBONACEOUS MATERIAL, MANUFACTURING METHOD THEREFOR AND USE THEREOF

(75) Inventors: Takushi Ohsaki; Akira Wakaizumi; Takashi Inui; Akihiro Nakamura; Katsuyoshi Yanagita; Masayoshi Hayashida, all of Kitakoma-gun (JP)

(73) Assignee: Nippon Sanso Corporation, Tokyo (JP)

(*) Notice: Subject to any disclaimer, the term of this patent is extended or adjusted under 35 U.S.C. 154(b) by 0 days.

This patent is subject to a terminal disclaimer.

(21) Appl. No.: 08/737,806

(22) PCT Filed: Mar. 29, 1996

(86) PCT No.: PCT/JP96/00839

§ 371 (c)(1),
(2), (4) Date: Nov. 27, 1996

(87) PCT Pub. No.: WO96/30318

PCT Pub. Date: Oct. 3, 1996

(30) Foreign Application Priority Data

Mar. 30, 1995 (JP) ............................................... 7-074227

(51) Int. Cl.$^7$ ................................................ C01B 31/10
(52) U.S. Cl. ................... 423/445 R; 423/460; 502/432
(58) Field of Search .............................. 423/445 R, 460, 423/210, 245.1; 502/437, 432

(56) References Cited

U.S. PATENT DOCUMENTS

| | | | | |
|---|---|---|---|---|
| 3,320,030 A | * | 5/1967 | Bisignani et al. | 423/466 |
| 3,557,020 A | | 1/1971 | Shindo et al. | 252/422 |
| 3,700,975 A | * | 10/1972 | Butherus et al. | 317/230 |
| 3,714,336 A | * | 1/1973 | Davis et al. | 423/468 |
| 3,960,768 A | * | 6/1976 | Ripperger et al. | 423/445 R |
| 4,046,709 A | | 9/1977 | Yuki | 264/29.3 |
| 4,551,155 A | * | 11/1985 | Wood et al. | 48/202 |
| 4,590,055 A | * | 5/1986 | Yamaha et al. | 423/447.4 |
| 4,839,331 A | * | 6/1989 | Maroldo et al. | 502/416 |
| 5,179,058 A | | 1/1993 | Knoblauch et al. | 502/181 |
| 5,300,272 A | * | 4/1994 | Simondl et al. | 423/445 R |
| 5,372,619 A | | 12/1994 | Greinke et al. | 502/526 |

FOREIGN PATENT DOCUMENTS

| | | | |
|---|---|---|---|
| DE | 257 821 | | 6/1988 |
| JP | 60-20322 | * | 5/1985 |
| JP | 60-170163 | | 9/1985 |
| JP | 61-151012 | | 7/1986 |
| JP | 62-76155 | | 4/1987 |
| JP | 62-108722 | | 5/1987 |
| JP | 62-132543 | | 6/1987 |
| JP | 62-163562 | | 7/1987 |
| JP | 63-10574 | | 3/1988 |
| JP | 1-186555 | | 7/1989 |
| JP | 1-186556 | | 7/1989 |
| JP | 1-242409 | * | 9/1989 |
| JP | 1-321620 | | 12/1989 |
| JP | 4-175277 | | 6/1992 |
| JP | 4-70770 | | 11/1992 |
| JP | 4-310209 | | 11/1992 |
| JP | 4-319265 | | 11/1992 |
| JP | 5-132377 | * | 5/1993 |
| JP | 5-49606 | * | 7/1993 |
| JP | 5-66886 | | 9/1993 |
| JP | 5-269331 | | 10/1993 |
| JP | 5-82324 | * | 11/1993 |
| JP | 5-305214 | | 11/1993 |
| JP | 6-187972 | | 7/1994 |
| JP | 7-69611 | | 3/1995 |

OTHER PUBLICATIONS

S.N. Vyas Et Al, "Carbon Molecular Sieves from Bituminous Coal by Controlled Coke Deposition", Carbon, 30 (1992), pp. 605–612 No Month.
Database WPI, Derwent Publications, AN–89–135599, JP–A–01 081 896, Mar. 28, 1989.
Database WPI, Derwent Publications, AN–85–308555, SU–A–1 158 225, May 30, 1985.
Patent Abstracts of Japan, vol. 018, No. 527 (E–1613), Oct. 5, 1994, JP–A–06 187987, Jul. 8, 1994.
The Canadian Journal of Chemical Engineering, pp. 146–151, Aug. 1964, W. H. Cook, et al., "Correlation of Adsorption Equilibria of Pure Gases on Activated Carbon".*
Journal of Chemical and Engineering Data, vol. 12, No. 2, pp. 259–261 Apr. 1967, John M. Meredith, et al., "Adsorption of Carbon Dioxide and Nitrogen on Charcoal at 30° to 50° C".*
Seisan Kenkyu (Production Research), vol. 25, No. 11, pp. 513–516, Nov. 1973, Kunitaro Kawazoe, et al., "Adsorption Equilibria of Vapors and Gases on Microporous Adsorbents (III)—Correlation of Adsorption Equilibrium Data on Gases on Molecular–Sieving Carbon".*

(List continued on next page.)

Primary Examiner—Stuart L. Hendrickson
(74) Attorney, Agent, or Firm—Oblon, Spivak, McClelland, Maier & Neustadt, P.C.

(57) ABSTRACT

A halogen treatment is conducted comprising: a halogenation step wherein a halogenation heat treatment for preparing a halogenated carbonized charcoal is conducted in which the carbonized charcoal is brought into contact with halogen; and a dehalogenation step wherein a dehalogenation treatment is conducted in which a part of or all halogen atoms in the halogenated carbonized charcoal are eliminated. A porous carbonaceous material is obtained at a high yield, and the amounts of nitrogen, oxygen, carbon dioxide, and methane adsorbed by this porous carbonaceous material are large. When this porous carbonaceous material is used as an electrical double layer capacitor carbon, the electrostatic capacity is increased compared to conventional carbonaceous materials. Consequently, a carbonaceous material is obtained which has micopores and/or sub-micropores which are suitable for the adsorption of small molecules such as nitrogen, and for storage of electrochemical energy.

24 Claims, 14 Drawing Sheets

OTHER PUBLICATIONS

Kogai (Pollution), vol. 16, No. 3, pp. 25–33, 1981, Hiroshi Kitagawa, et al., "Preparation of Molecular Sieving Carbon From Saran Waste—Separation of Air by Pressure Swing Adsorption" No Month .

Carbon, vol. 27, No. 6, pp. 931–934, 1989, M. S. A. Baksh, et al., "Composite Sorbents by Chemical Vapor Deposition on Activated Carbon" No Month.

Journal of Chemical Engineering of Japan, vol. 24, No. 4, pp. 476–483, 1991, Yoshio Nakano, et al., 'Micropore Structure and Intrapore Diffusion of Oxygen and Nitrogen in a Molecular Sieving Carbon No Month.

Kagaku Kogaku (Chemical Engineering), vol. 25, No. 9, pp. 654–664,, 1961, Takeo Yano, et al., "Equilibria of Binary Gas Mixture Adsorption by Active Carbon" No Month.

Kagaku Kogaku Kyokai (Association of Chemical Engineering) (eds.), Kagaku Kogaku Benran (Chemical Engineering Handbook), revised $5^{th}$ ed., Maruzen, pp. 589–590, Mar. 18, 1988.

Shinban Kasseitan—Kiso To Oyo—(Activated Carbon (new edition)—Basics and Applications), Kodansha, pp. 17–23, Mar. 1, 1992.

Journal of Chemical Engineering of Japan, vol. 25, No. 2, pp. 176–182, 1992, Tomoshige Nitta, et al., "Gas–Phase Adsorption Characteristics of High–Surface Area Carbons Activated From Meso–Carbon Micro–Beads" No Month.

Chemical Engineering Science, vol. 47, No. 7, pp. 1569–1579, 1992, Kimberly R. Matranga, et al., "Storage of Natural Gas by Adsorption on Activated Carbon" No Month.

Tanso Zairyo Gakkai (Society of Carbon Material) (eds.), Kaitei Tanso Zairyo Nyumon (Carbon Material Guide, revised edition), pp. 188–189 and 207–208 No Date.

Proceedings of the Third Sony Research Forum, pp. 333–338, Yoshio Nishi, "Development of Lithium Ion Rechargeable Batteries" No Date.

Denki Kagaku (Electrochemistry), vol. 61, No. 12, pp. 1383–1389, 1993, Takashi Iijima, et al., "Application of Carbon Fibers and Pitch Cokes for Negative Electrodes of Lithium Rechargeable Batteries" No Month.

Tansoka Kogaku–no Kiso (Basics of Carbonization Engineering), $1^{st}$ ed., Ohm–sha, pp. 11–13, Nov. 20, 1980.

Tanso (Carbon), No. 133, pp. 115–126, 1988, Tetsuro Yokono, "Application of NMR–ESR to Unraveling Structure of Carbon" No Month.

Carbon, vol. 28, No. 1, pp. 1–6, 1990, H. Fritz Stoeckli, "Microporous Cabons and Their Characterization: The Present State of the Art" No Month.

Kasseitan Kogyo (Activated Carbon Industry), $1^{st}$ ed. pp. 52–58, Nov. 20, 1974, Mutsuo Kitagawa, et al., "Jukagaku Kogyo Tsushin–sha".

* cited by examiner

+ CARBONACEOUS MATERIAL OF COMPARATIVE EXAMPLE

◇ CHLORINE TREATED CARBONACEOUS MATERIAL

EXAMPLE 3:B, HIGH TEMP. DECHLORINATION;
EFFECT OF AMOUNT OF CARBONIZED CHARCOAL ON CHLORINATION TREATMENT AND EFFECT OF TEMPERATURE ON HEAT TREATMENT IN NITROGEN

□ 10g SPECIMEN     + 25g SPECIMEN

EXAMPLE 5:A, HIGH TEMP. DECHLORINATION +
LOW TEMP. DECHLORINATION;
EFFECT OF TEMPERATURE ON CHLORINATION TREATMENT

EXAMPLE 8: A, HIGH TEMP. DECHLORINATION +
LOW TEMP. DECHLORINATION;
EFFECT OF TEMPERATURE ON HEAT TREATMENT IN NITROGEN

EXAMPLE 9: A, HIGH TEMP. DECHLORINATION +
LOW TEMP. DECHLORINATION;
EFFECT OF TEMPERATURE ON HEAT TREATMENT IN STEAM

EXAMPLE 14:B,HIGH TEMP.DECHLORINATION +
LOW TEMP.DECHLORINATION;
EFFECT OF TEMPERATURE ON HEAT TREATMENT IN METHANE
(cc/g)

EXAMPLE 15:B,LOW TEMP.DECHLORINATION;
EFFECT OF TEMPERATURE ON CHLORINATION TREATMENT
(cc/g)

EXAMPLE 16:B, LOW TEMP. DECHLORINATION;
EFFECT OF TEMPERATURE ON DECHLORINATION TREATMENT

EXAMPLE 17:B, HIGH TEMP. DECHLORINATION + LOW TEMP. DECHLORINATION;
EFFECT OF TEMPERATURE ON CHLORINATION TREATMENT

EXAMPLE 18:B,HIGH TEMP.DECHLORINATION +
LOW TEMP.DECHLORINATION;
EFFECT OF TEMPERATURE ON HEAT TREATMENT IN NITROGEN
(cc/g)

EXAMPLE 19:B,HIGH TEMP.DECHLORINATION +
LOW TEMP.DECHLORINATION;
EFFECT OF TEMPERATURE ON HEAT TREATMENT IN NITROGEN
(cc/g)

EXAMPLE 20:B,HIGH TEMP.DECHLORINATION / LOW TEMP.DECHLORINATION; EFFECT OF TEMPERATURE ON HEAT TREATMENT IN NITROGEN AND COMPARISON OF DECHLORINATION BY WATER AND METHANE

EXAMPLE 22:B,LOW TEMP.DECHLORINATION + HIGH TEMP.DECHLORINATION; EFFECT OF TEMPERATURE ON HEAT TREATMENT IN NITROGEN

POROUS CARBONACEOUS MATERIAL, MANUFACTURING METHOD THEREFOR AND USE THEREOF

This is a National stage application of PCT/JP96/00834, filed Mar. 29, 1996.

TECHNICAL FIELD

The present invention relates to a porous carbonaceous material which has micropore and/or sub-micropore structures which are suitable for the adsorption of small molecules such as nitrogen and oxygen, and to a manufacturing method therefor. In addition, the present invention provides a porous carbonaceous material which can be used in applications such as an adsorbing agent for use in separating and refining industrially used gases, and as a material for electrodes of a secondary battery.

BACKGROUND ART

Starting Material for Carbonaceous Materials

As starting materials for carbonaceous materials, carbonized plant and animal material such as lignite, brown coal, anthracite coal, coke, wood charcoal, coconut shell char; any kind of resin such as phenol resin, furan resin, vinylidene chloride copolymer, etc. which have been heat-treated (carbonized) in an atmosphere of inert gas; and the like can be used. In the present invention, these starting materials are called generic carbon compounds, and materials obtained by carbonization of carbon compounds are called carbonized charcoal.

Uses of Carbonaceous Materials

Because carbonaceous materials are chemically inactive, they are used in a wide range of applications such as adsorption agents, catalysts, electrode materials, structural materials for use in machines, etc.; however, these applications are closely related to the structure of the carbon.

That carbon which is referred to as porous carbon has special effects due to the development of pores. For example, using the adsorption phenomenon, there are mixture separation and refining actions. In addition, the carbon used in electrical double layer capacitors, the carbon used in lithium secondary batteries, and the like display electrochemical storage effects.

The Structure of Carbonaceous Materials

The structure of the carbonaceous material can take various forms depending on the starting material, and the manufacturing method.

Char and activated carbon obtained by activating char comprise microcrystalline carbon (crystallite), and carbon which takes on a chain structure. When the carbonaceous material is a nongraphitizing carbon, the crystallites take on a structure which is layered in a disorderly manner, and a wide range of pores, from micropores to macropores, are formed in the gaps between these crystallites.

The crystallites are layers of net planes of six membered carbon rings of several parallel layers, and graphite carbon which has a six membered carbon ring structure bonds using hybridized orbitals $SP^2$. A net plane comprising six membered ring carbon is called a basic plane.

A graphitizing carbon grows/develops crystallites by means of heating at a high temperature, and finally becomes graphite.

A nongraphitizing carbon and a graphitizing carbon which has not been completely graphitized usually contain unorganized carbon. Unorganized carbon is carbon other than graphite carbon which is chemically bonded to graphite carbon only; carbon which has a chain structure; carbon which is stuck around six membered ring carbon; carbon which is in the periphery (the prism plane) of six membered ring carbon; carbon which is held in cross-linked structures with other six membered carbon rings (crystallites), and the like. Unorganized carbon is bonded with oxygen atoms, hydrogen atoms, and the like in forms such as C—H, C—OH, C—OOH, and C=O; or is in the form of double bonded carbon (—C=C—).

Adsorption Action of Carbon

When pores have a diameter of 0.8 nm or less, they are called sub-micropores, when they have a diameter in the range of 0.8~2 nm, they are called micropores. Pore diameters within these spheres are approximately of the same order as the diameter of adsorbed molecules, and therefore these pores are believed to take part in the adsorption phenomena.

Because present measuring techniques are unable to directly observe the pore structure of pores in the sub-micropore range, the situation at present is such that it is not possible to establish this as a general theory.

It is believed that the quantity of small molecules, such as nitrogen and oxygen, adsorbed is correlated with the degree of development of micropores and/or sub-micropores, and that the extent of the quantity of small molecules, such as nitrogen and oxygen, adsorbed indicates the degree of development of micropores and/or sub-micropores.

Manufacturing Methods for Porous Carbonaceous Material; Activation Treatments

Methods for manufacturing porous carbonaceous material have variously been offered. In the following, representative manufacturing methods will be explained.

As commonly used methods for obtaining porous carbonaceous material, methods are known in which activation treatments are given in oxidizing gases such as steam, carbon dioxide, and air.

In activation treatments, the oxidation/corrosion (the carbon is gasified) of carbon occurs by means of an activating agent. In other words, new pores are formed in the surface of the carbonaceous material, and, in addition, open pores are made even larger. As a result, it is believed that the specific surface area and the pore volume are increased. However, in normal activation treatments, the activation yield (the carbon yield in other treatments) is of the level of 40~80%, and the carbon loss reaches 20~60%. In addition, it is not possible to form pores of a uniform pore diameter.

Here, the activation yield and the carbon yield take the weight of carbon compounds before treatment as 100, and express the weight after treatment.

As an example of steam activation, there is Japanese Patent Application, First Publication, No. Hei 1-242409; as an example of carbon dioxide activation, there is Japanese Patent Application, First Publication, No. Hei 5-132377; as a combination method of air (oxygen) activation with steam and/or carbon dioxide activation, there is Japanese Patent Application, Second Publication, No. Hei 5-49606; and in addition, as an example of activation by means of hydroxides of sodium, potassium, and the like, there is Japanese Patent Application, First Publication, No. Hei 2-97414 (Japanese Patent Application, Second Publication, No. Hei 5-82324).

Manufacturing Methods for Porous Carbonaceous Material; Carbonization of Resin Methods of manufacturing porous carbonaceous material by means of carbonization of polymeric resins which have specific molecular structures are also known. When decomposing organic substances by carbonization, the carbon re-bonds in such a way as to form an aromatic structure of a six membered ring which is thermally stable. The proportion of components other than carbon contained within the resin starting material is still not clear.

As examples of the carbonization of polymeric resins, there are Japanese Patent Application, Second Publication, No. Sho 60-20322, Japanese Patent Application, First Publication, No. Hei 6-187972, U.S. Pat. No. 4,839,331, U.S. Pat. No. 3,960,768, and the like.

The above-mentioned U.S. Pat. No. 4,839,331 and U.S. Pat. No. 3,960,768 aim to reform the carbonaceous material by reacting sulfur compounds and halogens with polymeric resins beforehand. The present invention aims to reform the carbonaceous material by means of reacting a post-carbonization material (carbonized charcoal) with chlorine.

Manufacturing Methods for Porous Carbonaceous Materials; Others

As a manufacturing method which obtains porous carbonaceous material without making use of an activation treatment, there is Japanese Patent Application, First Publication, No. Hei 4-310209. This application discloses a way of obtaining an adsorption agent with oxygen selectivity by means of heating coconut shell char, which has been crushed into granules, in an inert gas at 775 up to 900° C. while controlling the heating speed, and maintaining this for 8 hours.

Japanese Patent Application, First Publication, No. Sho 62-108722 discloses a method of forming pores in carbonaceous material by mixing organic metal compounds into a heated polymeric resin, heat treating this mixture, and eluting the contained metals.

Adsorption Quantities for Carbonaceous Materials Manufactured by Means of Conventional Techniques A number of examples of oxygen and nitrogen adsorption amounts for carbonaceous materials (activated carbon) manufactured by conventional techniques are shown in Table 1. This data was recorded in chemical references and patent references, in addition to the quantities adsorbed ("Literature Values" in the Table) at equivalent adsorption temperature lines in the literature, Henry type adsorption is presumed and values calculated for 1 atm (Values Calculated for 1 atm in the Table) are also shown in the table. Moreover, there are cases where the measurement temperature is unclear, and these measurement temperatures are presumed to be temperatures close to room temperature.

TABLE 1

| Starting Material Product Name etc. | | Pressure | Literature Values Temperature | Measured value | Value Calculated for 1 atm | Literature |
|---|---|---|---|---|---|---|
| Pittsburgh C | $N_2$ | 1 atm | 24° C. | 8.8 ccSTP/g | 8.8 ccSTP/g | 1) |
| Pittsburgh C | $O_2$ | — | — | — | — | " |
| Calgon BPL | $N_2$ | 760 mmHg | 30° C. | 0.097 g/g | 7.8 ccSTP/g | 2) |
| Calgon BPL | $O_2$ | — | — | — | — | " |
| Takeda MSC-5A | $N_2$ | 700 mmHg | 20° C. | 0.92 g/100 g | 8.0 ccSTP/g | 3) |
| Takeda MSC-5A | $O_2$ | " | 21° C. | 1.08 g/100 g | 8.2 ccSTP/g | " |
| Saran Waste | $N_2$ | 760 mmHg | 25° C. | 8.8 Nml/g | 8.8 ccSTP/g | 4) |
| Saran Waste | $O_2$ | " | " | 8.8 Nml/g | 8.8 ccSTP/g | " |
| Calgon BPL | $N_2$ | 1 atm | 25° C. | 0.287 mmol/g | 6.4 ccSTP/g | 5) |
| Calgon BPL | $O_2$ | — | — | — | — | " |
| Coconut Char | $N_2$ | 76.14 kPa | 25° C. | 0.30 mol/kg | 8.94 ccSTP/g | 6) |
| Coconut Char | $O_2$ | 76.31 kPa | " | 0.30 mol/kg | 8.92 ccSTP/g | " |
| Coconut Shell | $N_2$ | — | — | — | — | 7) |
| Coconut Shell | $O_2$ | 1 atm | 25° C. | 10.7 cc/g | 10.7 cc/g | " |
| Phenol Resin | $N_2$ | 2.52 kg/cm$^2$G | ? | 20.4 mg/g | 4.79 ccSTP/g | 8) |
| Phenol Resin | $O_2$ | 2.51 kg/cm$^2$G | ? | 25.2 mg/g | 5.19 ccSTP/g | " |
| Takeda Grain Carbon | $N_2$ | 2.0 kg/cm$^2$G | ? | 11.5 cc/g | 3.96 cc/g | 9) |
| Takeda Grain Carbon | $O_2$ | 2.0 kg/cm$^2$G | ? | 12.0 cc/g | 4.13 cc/g | " |
| Coconut Shell | $N_2$ | — | — | — | — | 10) |
| Coconut Shell | $O_2$ | 1 atm | 25° C. | 8.0 ml/g | 8.0 cc/g | " |
| Coconut | $N_2$ | — | — | — | — | 11) |
| Coconut | $O_2$ | 1 atm | ? | 12.2 cc/g | 12.2 cc/g | " |

1) W. H. Cook and D. Basmadjian, Canadian J. Chem. Eng., Aug., 146, 1964, FIG. 8
2) J. M. Meredith and C. A. Plank, J. Chem. and Eng. Data, 12, 259, 1967, FIG. 1
3) Kunitaro Kawazoe and Toshinaga Kawai, Seisan Kenkyu (Production Research), 25, 513, 1973, FIG. 2
4) Hiroshi Kitagawa and Chuji Yuki, Kougai (Pollution), 16, 153, 1981, FIG. 3
5) M. S. A. Bakush, R. T. Yang and D. D. L. Chung, Carbon, 27, 931, 1989, FIG. 1.
6) Y. Nakano, T. Kato, K. Suzuki, J. Chem. Eng. Jap. 24, 476, 1991, FIG. 3
7) Japanese Patent Application, First Publication, No. Hei 4-310209, Example 38 (Table 6)
8) Japanese Patent Application, First Publication, No. Hei 5-305214, end of paragraph 0024
9) Japanese Patent Application, First Publication, No. Sho 62-132543, FIG. 1
10) Japanese Patent Application, Second Publication, No. Hei 5-66886, Comparative Example 6 (Table 6)
11) Japanese Patent Application, First Publication, No. Hei 5-269331, Example 58 (Table 10)

Note: In the above "Literature Value" Column, the "?" indicates that the measurement temperature is not clearly recorded. In the "Converted Value for 1 atm" Column, ccSTP/g is a value calculated for the gas of volume cc adsorbed for 1 g at conditions of standard temperature (0° C.) and pressure (1 atm).

From the above publicly known literature, the largest amount of nitrogen adsorbed is 8.94 ccSTP/g (calculated to be 9.76 cc/g at 25° C. and 1 atm), the largest amount of oxygen adsorbed is 12.2 cc/g, and carbonaceous material which has adsorption quantities greater than these are not known.

Moreover, oxygen from carbonaceous material which has no particular allowance for oxygen selectivity have some differences with the amount of nitrogen adsorbed, but it is clear for Table 1, references 3, 4, and 6, that the values are approximately the same.

The following examples give data for carbon dioxide adsorption by activated carbon. 1) Kawazoe et al. Production Research, Vol. 25, No. 11, page 513, 1973 [8.5 g/100 g=43 mlSTP/g (20° C., 1 atm)]. 2) Yano et al. Kagaku Kogaku, Vol. 25, No. 9, page 654, 1961 [30 ccSTP/g (30° C., 1 atm)]. 3) Kagaku Kogaku Handbook, page 589, 1992 [40 $cm^3$ NTP/g (37.7° C., 1 atm)].

The following examples give data for methane adsorption by activated carbon. 1) Nitta et al. J. Chem. Eng. Jpn, Vol. 25, No. 2, page 176, 1992 [1 mol/kg=22.4 mlSTP/g (25° C., 1 atm)]. 2) Kimberly et al. Chem. Eng. Science, Vol. 47, No. 7, page 1569, 1992 [0.7~1.1 mmol/g=15.7~24.6 mlSTP/g (25° C., 1 atm)]. 3) Kagaku Kogaku Handbook, page 589, 1992 [21 $cm^3$ NTP/g (37.7° C., 1 atm)].

The specific surface area for normal activated carbon is of the level of 700~2000 $m^2/g$ (Kagaku Kogaku Handbook, 1992), and with regard to the pore volume for normal activated carbon, for example, the pore volume of micropores to sub-micropores is of the level of 0.2832~0.4365 ml/g, and pore volume for diameters to 20 nm is of the level of 0.4408~0.6938 ml/g (Shinban Kasseitan (Activated Carbon, New Edition) 1995).

The composition ratio (the H/C atomic ratio) of hydrogen to carbon in carbonaceous material can vary widely depending on the temperature of carbonization, but, for example, when phenol is carbonized at 400~740° C., it is 0.55~0.07 (Japanese Patent Application, First Publication, No. Sho 60-170163).

The way that these parameters are concerned with adsorption quantities and electrochemical energy storage capacity is not sufficiently clear.

Crystallite Size

As indicators which show the characteristics of crystallites, examples which are disclosed in the literature of survey values for the distance of the (002) measured by means of X-ray diffraction are as shown in Table 2; sizes of between 0.3367 and 0.395 nm are known.

TABLE 2

| Starting Material or Carbon | Heat Treatment Temperature (° C.) | d(002) (nm) | Reference |
|---|---|---|---|
| Mesophase Pitch Carbon fiber | 1600~3000 | 0.347~0.3378 | 1) |
| furfuryl alcohol resin | 800~1500 | 0.380~0.371 | 2) |
| pitch carbon fiber | 800~2900 | 0.3618~0.3379 | 3) |
| pitch coke | 1200~2900 | 0.3487~0.3367 | 3) |
| petroleum tar | 1300 | 0.353 | 4) |
| PVC (polyvinylchloride) | 1200 | 0.356 | 4) |
| furan resin | 1200 | 0.378 | 4) |
| petroleum pitch | 1200~1600 | 0.375~0.367 | 5) |
| p-t-butylphenol resin | 2000 | 0.3547 | 6) |
| cresol resin | 3000 | 0.3419 | 6) |
| phenol resin | 3000 | 0.3460 | 6) |
| polyimide | 800 | 0.3525 | 7) |
| polybenzimidazole | 2000 | 0.3404 | 7) |
| cellulose fiber | 800~2000 | 0.395~0.36 | 8) |
| PAN fabric | 800 | 0.35 | 8) |
| rayon fiber | 800~2000 | 0.395~0.36 | 8) |
| phenol resin | 800 | 0.37 | 9) |

1) Carbon Material Society "Revised Carbon Materials Guide" (1984)
2) Proceedings of the third Sony Forum (1993)
3) Denki Kagaku, Vol. 12, No. 4, 1383, (1993)
4) Japanese Patent Application, First Publication, No. Hei 7-69611
5) Japanese Patent Application, First Publication, No. Hei 4-319265
6) Japanese Patent Application, First Publication, No. Hei 1-186555
7) Japanese Patent Application, First Publication, No. Hei 1-186556
8) Japanese Patent Application, First Publication, No. Sho 62-163562
9) Japanese Patent Application, First Publication, No. Sho 62-76155

Electrical Double Layer Capacitors

Electrodes for electrical double layer capacitors are called polarizable electrodes, but those which have much larger electrostatic capacity are being demanded. Since electrical capacity (electrostatic capacity) which is stored in electrical double layers is in general terms determined by the surface area of the solid liquid interface, as electrode materials, carbonaceous materials which have large specific surface areas and have conductivity are used. In particular, activated carbon which has been given an activation treatment is often used.

As conventional techniques for carbon electrodes for use in electrical double layer capacitors, U.S. Pat. No. 3,700, 975, Japanese Patent Application, Second Publication, No. Hei 4-70770, Japanese Patent Application, Second Publication, No. Sho 63-10574, Japanese Patent Application, First Publication, No. Hei 4-175277, Japanese Patent Application, First Publication, No. Hei 1-321620, and the like are known.

In conventional manufacturing methods for porous carbonaceous material, because the micropores and/or sub-micropores are not sufficiently developed, when used as an adsorbing agent directed to gases which have small molecular diameters such as nitrogen, the adsorption capacity is insufficient. In addition, there is the problem that the carbon yield is low.

In addition, even when used as an electrode material such as carbon for use in electrical double layer capacitors and carbon for use in lithium secondary batteries, the storage capacity for electrochemical energy is insufficient.

The present invention solves these problems.

DISCLOSURE OF INVENTION

In order to solve the above-mentioned problems, the inventors of the present invention earnestly researched manufacturing methods for porous carbonaceous material. As a result of this, they discovered that when carbonized charcoal is given chlorine treatment, the amount of nitrogen adsorbed is increased significantly, and they realized the accomplishment of the present invention.

Moreover, in the following description, the present invention is explained chiefly using chlorine gas as an example; however, using the same technical concept, halogens such as bromine can also be used.

Constitution of the Invention

The manufacturing method for the porous carbonaceous material of the present invention is characterized by halogen treatment of carbonized charcoal. In FIG. 1, a process diagram of a manufacturing method of a porous carbonaceous material by means of a halogen treatment according to the present invention is shown. The halogen treatment of the present invention is a treatment which provides a halogenation step in which a halogenation treatment is conducted which obtains halogenated carbonized charcoal by bringing carbonized charcoal into contact with halogen gas; and a dehalogenation step in which a dehalogenation treatment is conducted which eliminates part or all of the halogen atoms in the subsequently halogenated carbonized charcoal. According to the present invention, as the above-mentioned halogen, chlorine or bromine can be suitably used.

Using chlorine as an example, the degree of chlorination of chlorinated carbonized charcoal is expressed by the atomic ratio of chlorine and carbon (Cl/C). This atomic ratio in the chlorination step is a molar ratio of the numbers of atoms which are obtained by the conversion from the weight of carbon and the weight of chlorine, in which the weight of the carbonized charcoal before the chlorination step is assumed to be the weight of carbon and the weight increase due to the chlorination step is assumed to be the weight of chlorine. In addition, in the dechlorination step, the degree of dechlorination is calculated from the value which is obtained by taking the weight decrease due to the dechlorination step to be the reduction in the quantity of chlorine, converting this into the number of atoms, and subtracting it from the number of chlorine atoms in the chlorinated carbon.

In real chlorine treatments, due to the destructive distillation action accompanying the progress of carbonization, the activated action by steam (the gasification of carbon) and the like, the ratio of the number of atoms according to the above definition can be a negative value.

Chlorination Step

The chlorination step is characterized by conducting a heat treatment on the carbonized charcoal in chlorine gas which has been diluted with an inert gas such as nitrogen at a temperature of 350~1000° C., and preferably of 400~700° C.

When the temperature of the heat treatment of the chlorination step exceeds 1000° C., due to the reduction in the quantity of hydrogen atoms as the destructive distillation progresses, the degree of chlorination (Cl/C) is reduced, and this is not desirable. In addition, since it is necessary that the carbons of the polyaromatic ring structures be inactive with respect to the chlorine, it is preferable that the temperature of the chlorination step be 1000° C. or less. In addition, when the temperature of the heat treatment of the chlorination step is less than 350° C., because the reaction speed of the unorganized carbon and the chlorine is too slow, a long period of time is required for the chlorination step, and this is not desirable.

With regard to the supply rate for the chlorine gas, when the concentration of the chlorine gas is 10% by volume, the superficial velocity in the column is of the level of 0.2~0.3L/(min·cm$^2$). The time for the chlorination treatment is about 30 minutes when in the high temperature region of the above-mentioned temperature range; however, about 120 minutes are required when in the low temperature range close to 400° C. Moreover, the flow rate of the gas is expressed by the volume (L) of the gas at room temperature at approximately atmospheric pressure per period of time (minutes) (this is the same hereinafter).

Here, the inert gas is nitrogen, or rare gases such as helium, argon, and the like, or a mixture of these gases.

By means of the above-mentioned chlorination treatment, a chlorinated carbonized charcoal is obtained which has an atomic ratio of chlorine to carbon (Cl/C) of preferably 0.03 or greater, and more preferably of 0.07 or greater. Moreover, when this atomic ratio is less than 0.03, the contribution to the formation of the micropores is small, therefore this is not desirable.

In addition, the upper limit of the above-mentioned atomic ratio is determined by the carbonization temperature and the quantity of hydrogen atoms in the carbonized charcoal; however, it is understood from the Examples mentioned below that the desired results of the present invention can be obtained at 0.315 or less.

In a bromination treatment, even when the atomic ratio of bromine to carbon (Br/C) approaches 0.01, the effects of the present invention can be obtained.

Dechlorination Step

The dechlorination step is characterized by being conducted by means of a high temperature dechlorination treatment, a low temperature dechlorination treatment, or a treatment which combines a high temperature dechlorination treatment and a low temperature dechlorination treatment.

The degree of dechlorination is preferably a situation in which the above-mentioned atomic ratio after the dechlorination step is 0.02 or less; however, it is not absolutely essential for complete dechlorination.

The high temperature dechlorination treatment is characterized by a heat treatment conducted at a temperature of 600~1300° C. under vacuum evacuation or in an inert gas, or preferably at 900~1100° C. when the carbonaceous material is to be used as an adsorbent, or 600~900° C. when it is to be used as electrode material. The degree of vacuum evacuation is not particularly limited, a vacuum of vacuum evacuation approaching 10 Torr is sufficient. A time of 20~30 minutes is sufficient for the heat treatment.

When a high temperature dechlorination treatment conducted in inert gas is conducted at treatment temperatures exceeding 1300° C., the openings of the fine pores become too small due to heat shrinkage and nitrogen gas cannot enter inside the fine pores, therefore, the desired amount of nitrogen adsorption cannot be obtained. In addition, when a high temperature dechlorination treatment conducted in inert gas is conducted at treatment temperatures lower than 600° C., sufficient dechlorination cannot take place.

Moreover, in the high temperature dechlorination treatment, the chlorine in the carbonized charcoal is not completely dechlorinated, and a part of the chlorine remains.

The low temperature dechlorination treatment is characterized by a heat treatment conducted at a temperature of 600~850° C., and preferably at 650~750° C., in a gas of a hydrogen containing compound or a gas of a hydrogen containing compound; which has been diluted with inert gas. A time of 20~30 minutes is sufficient for the heat treatment.

In the low temperature dechlorination treatment, the chlorine in the carbonized charcoal is almost completely dechlorinated.

Here, the gas of a hydrogen containing compound; is steam ($H_2O$); hydrogen; lower hydrocarbons, such as methane ($CH_4$), ethane ($C_2H_6$), ethylene ($C_2H_4$), propane ($C_3H_8$), propylene ($C_3H_6$), butane ($C_4H_{10}$), and butylene ($C_4H_8$); and mixtures of these gases. As a gas of a hydrogen containing compound; in an inert gas, the exhaust gas of LPG (liquid petroleum gas) which has been incompletely burned is suitable for industrial use. The composition of the above-mentioned exhaust gas is, for example, steam: 13~17% by volume; carbon dioxide: 9~12% by volume; carbon monoxide: 0.01~1% by volume; nitrogen: 68~74% by volume; and unburned lower hydrocarbons: 0.01~3% by volume.

When the above-mentioned gas of a hydrogen containing compound; is steam, the concentration of the steam is not particularly limited; however, when the superficial velocity in the column is from 0.05 to 0.15 L/(min·cm$^2$), 3% by volume is sufficient.

Furthermore, when the above-mentioned gas of a hydrogen containing compound; is steam, and the heat treatment occurs at a temperature exceeding 850° C., the activation activity due to the steam progresses too far, thereby obstructing the formation of micropores, and in addition to reducing the carbon yield, the effects of the present invention are reduced.

When the above-mentioned gas of a hydrogen containing compound; is hydrogen, since there is no activation activity, there is no restriction on the above-mentioned upper limited.

When the above-mentioned gas of a hydrogen containing compound; is a lower hydrocarbon such as methane, the concentration of the lower hydrocarbon is not particularly limited; however, when the gas column speed is 0.05~0.15 L/(min·cm$^2$), 20% by volume is sufficient.

Furthermore, when the above-mentioned gas of a hydrogen containing compound; is a lower hydrocarbon, and the heat treatment occurs at a temperature exceeding 850° C., a carbon impregnation effect due to the thermal decomposition of the lower hydrocarbon is produced, and because the micropores are blocked, the effects of the present invention are reduced.

When the above-mentioned gas of a hydrogen containing compound; is either steam or a lower hydrocarbon, and the heat treatment occurs at a temperature of less than 600° C., sufficient dechlorination can not take place.

There are five treatment methods for dechlorination: methods in which only a high temperature dechlorination treatment is conducted; methods in which only a low temperature dechlorination treatment is conducted; methods which are combinations of these methods in which a high temperature dechlorination treatment and a low temperature dechlorination treatment are successively conducted; methods in which a low temperature dechlorination treatment and a high temperature dechlorination treatment are successively conducted; and methods in which a high temperature dechlorination treatment, a low temperature dechlorination treatment, and a high temperature dechlorination treatment are successively conducted. These are shown in Table 3.

TABLE 3

Five Treatment Methods for Dechlorination Treatment

| | | | | | |
|---|---|---|---|---|---|
| 1) | High Temperature Dechlorination Treatment: | | heat treatment under vacuum evacuation or in inert gas | | |
| 2) | Low Temperature Dechlorination Treatment: | | heat treatment in a gas of a hydrogen containing compound or in hydrogen compound gas diluted with inert gas | | |
| 3) | High Temperature Dechlorination Treatment | → | Low Temperature Dechlorination Treatment | | |
| 4) | Low Temperature Dechlorination Treatment | → | High Temperature Dechlorination Treatment | | |
| 5) | High Temperature Dechlorination Treatment | → | Low Temperature Dechlorination Treatment | → | High Temperature Dechlorination Treatment |

Within the treatment methods for dechlorination explained above, when a treatment in which a high temperature dechlorination treatment and a low temperature dechlorination treatment are successively conducted is adopted using a gas of a hydrogen containing compound; steam, or a mixture of steam and a lower hydrocarbon, the effects of the present invention become even more apparent.

In the manufacturing method of the above-mentioned porous carbonaceous material, various carbonized charcoals can be used, but, in particular, carbonized charcoal obtained by the carbonization of coconut shell, phenol resin, furan resin, or vinylidene chloride resin are the most suitable as starting materials.

When the chlorine content relative to carbon after the dechlorination treatment is 17.7% by weight or less (chemical analysis value), in other words, an atom ratio of chlorine relative to carbon of 0.06 or less, the effects of the dechlorination treatment of the present invention are apparent.

By means of conducting the above-mentioned manufacturing method using the above-mentioned carbonized charcoals as a starting materials, a porous carbonaceous material is obtained for which the amount of nitrogen adsorption at 25° C. and 1 atm is 12.5~20 cc/g. This amount of nitrogen adsorption is 15~50% greater than conventional carbonaceous materials.

According to the manufacturing method for the porous carbonaceous material of the present invention, a porous carbonaceous material is obtained which has a pore volume calculated from benzene adsorption of 0.20~0.50 cm$^3$/g, and a specific surface area of 600~1300 m$^2$/g. On the other hand, carbonaceous material which has been given the activation treatment of the conventional art has a pore volume calculated by benzene adsorption of the size of 0.25~0.7 cm$^3$/g, a specific surface area of 800~1900 m$^2$/g, and nitrogen adsorption of about 10~12 cc/g.

The amount of nitrogen adsorbed by a chlorine treated carbonaceous material is extremely large when compared with that of carbonaceous material which has been given the activation treatment of the conventional art, and even when their pore volume and specific surface area are approximately the same size. The chlorine treated carbonaceous material has a large number of micropores and/or submicropores suitable for the adsorption of small molecules such as nitrogen, this is so even though the amount of benzene, which has a large molecular diameter, adsorbed is approximately the same compared with that of carbonaceous material which has been given the activated treatment of the conventional art.

By means of the manufacturing method for the porous carbonaceous material of the present invention, a carbonaceous material is obtained in which the amount of carbon dioxide adsorbed at 25° C. and 1 atm is 60~90 cc/g. Compared with carbonaceous materials obtained by normal methods, the amount of carbon dioxide adsorbed is approximately 20~79% greater.

By means of the manufacturing method for the porous carbonaceous material of the present invention, a carbonaceous material is obtained in which the amount of methane adsorbed at 25° C. and 1 atm is 25~33 cc/g. Compared with carbonaceous material obtained by normal methods, the amount of methane adsorbed is approximately 14~51% greater.

According to the manufacturing method for porous carbonaceous material of the present inventions, a carbonaceous material is obtained in which the distance of the (002) is 0.40~0.43 nm.

According to the manufacturing method for the porous carbonaceous material of the present invention, a carbonaceous material is obtained in which, according to X-ray photoelectron spectroscopy, the carbons of the polyaromtic ring structures are 66~74% of the total carbon.

According to the manufacturing method for porous carbonaceous material of the present invention, a carbonaceous material is obtained in which the volume of accumulated pores with a radius of 1.5 nm or less is 90% or greater with regard to the volume of all pores.

According to the manufacturing method for porous carbonaceous material of the present invention, a carbonaceous material is obtained which has a true density of 1.75~1.90 cm$^3$/g.

According to the manufacturing method for porous carbonaceous material of the present invention, a carbonaceous material is obtained in which the atomic ratio is 0.010~0.17, and the weight ratio is 0.084~1.42% by weight for hydrogen to carbon.

According to the manufacturing method for porous carbonaceous material of the present invention, a carbonaceous material in which the value of indicator G, which shows the degree of crystallinity, is 1.2~1.5 according to Raman spectroscopy.

According to the manufacturing method for porous carbonaceous material of the present invention, a carbonaceous material is obtained in which electric conductivity is 30~100 S/cm at room temperature.

By means of using the carbonaceous material obtained by means of the manufacturing method for porous carbonaceous material of the present invention, an electrical double layer capacitor is obtained in which capacitance is 70~90 F/cm$^3$.

In addition, according to the manufacturing method for porous carbonaceous material of the present invention, the porous carbonaceous material can be manufactured at a high yield.

Selective Activation

Another invention of this application relates to an activation method for carbonaceous material. That is, by means of this activation method, after obtaining chlorinated carbonized charcoal by bringing carbonized charcoal into contact with chlorine gas, it is possible to selectively gasify the carbon atoms which are combined with the chlorine atoms (the chlorinated carbon) alone by means of conducting a heat treatment on the chlorinated carbonized charcoal in steam or steam which has been diluted with inert gas at 500~800° C.

Next the action of the means of the present invention will be explained.

Structure Model

There are a number of structural models for nongraphitizing carbon and graphitizing carbon in which the degree of crystallinity is insufficient. In the Franklin Model (Otani and Sanada, "The Basics of Carbonization Engineering", page 13, Ohm Company, 1980; Hagiwara "Revised Guide to Carbon Material", page 188, Carbon Materials Society, 1984), which has been known for a long time, microcrystal (crystallites) comprising multiple layers of a net plane of six-membered carbon rings take a structure like piled up building blocks. With regard to low temperature treated char, there is also a model in which building blocks are constructed by single layer carbon net planes (Yokono "Carbon", No. 133, page 115, (1988)). In addition, there is also a model in which it is as if the carbon net plane is lined up on plane shavings (H. F. Stoeckli, "Carbon" 28, page 1, (1990)).

Action of the Chlorination Step

When chlorine gas is brought into contact with carbonized charcoal, the chlorine is physically adsorbed and/or chemically adsorbed to the carbonized charcoal. When the contact temperature is increased, the amount of physical adsorption is reduced and the amount of chemical adsorption is increased. In the main, chemical adsorption occurs by reaction with the above-mentioned unorganized carbon. Since the present invention makes use of the reaction of chlorine with unorganized carbon, it is necessary that the carbonized charcoal used in the present invention be nongraphitizing carbon and graphitizing carbon in which the degree of crystallinity is insufficient.

Unorganized carbon which has been reacted with chlorine can be considered to take chemical structures such as C—Cl, C—O—Cl, C—O—O—Cl, C(=O)—O—Cl, and C=Cl$_2$.

When hydrogen atoms are bonded to unorganized carbon, the chlorination reaction shown in Formula (1), Formula (2), and Formula (3) occurs (C| shows unorganized carbon; a pair of symbols C| which are shown in a vertical alignment are unorganized carbons which are. next to each other in the same net plane or crystallite).

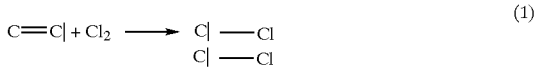

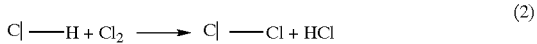

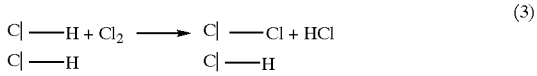

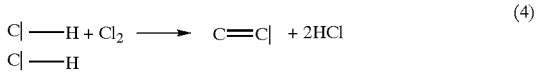

Formula (1) is a chlorine addition reaction for double bonded carbon, Formula (2) and Formula (3) are exchange reactions of chlorine atoms with hydrogen atoms which are bonded to unorganized carbon (hydrogen chloride in a molar equivalent to chlorine is generated), and Formula 4 is a dechlorination reaction (hydrogen chloride twice that of the chlorine is generated). It is presumed that these four reactions all occur.

As is clear from the above-mentioned reactions, the larger value for the above-mentioned atomic ratio (Cl/C) is determined by the proportion of unorganized carbon in relation to total carbon atoms. The amount of unorganized carbon (therefore, hydrogen atoms, oxygen atoms, double bonded carbon, etc.) is dependent on the degree of carbonization in the carbonized charcoal.

Action of the Dechlorination Step

When the dechlorination treatment occurs in an inert gas, the chlorine which is bonded to the unorganized carbon is eliminated as hydrogen chloride (HCl) by means of the reactions shown in Formula 5 and Formula 6.

When the dechlorination treatment takes place in a gas of a hydrogen containing compound; the chlorinated carbon is reduced by the hydrogen containing as shown in Formula (7) and Formula (8).

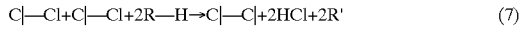

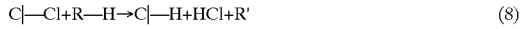

Here, R—H represents a hydrogen containing compound, and R' represents an oxide of R—H.

By means of the reactions of Formula (5), Formula (6), and Formula (7), new bonds between carbon atoms (hereinafter, carbon bonds) are generated. The formation of these new carbon bonds can be considered to achieve actions such as the action of repairing defects in the polyaromatic ring structure of the crystallites or the carbon net planes, the action of growth (change in form) of the crystallites or the carbon net planes, and the action of changes in the condition of crystallite to crystallite bonds (change of the aggregation condition). At this time, it can also be considered that the effect of heat shrinkage due to heating has a synergistic action.

In whichever way, by means of newly formed carbon bonds, it is presumed that the sub-micropores and/or the micropores which surround the crystallites are in a plurality of shapes.

When carbon which is in a position in which the carbon bonds cannot participate is chlorinated, hydrogen atoms are again added in accordance with Formula (8). In other words, all carbon which is chlorinated does not contribute to the generation of the above-mentioned carbon bonds.

As shown in the Examples, when the hydrogen containing compound is a lower hydrocarbon such as methane, the weight after dechlorination is not reduced even if dechlorination and rechlorination are repeated. In other words, as shown in Formula 9 below, there is no activating effect.

However, when dechlorination and rechlorination are repeated in steam, as shown in Formula (9), the average weight reduction for each cycle of dechlorination and rechlorination is approximately equal to the weight reduction when chlorinated carbon is gasified.

Consequently, when the hydrogen containing compound gas is steam, in addition to the reduction action of Formula (8), Formula (7), and (R=OH), an effect in which chlorinated carbon is selectively activated also occurs as shown in Formula (9) (n is 1 or 2).

As explained above, according to the reaction of each of the above-mentioned Formula (7), Formula (8), and Formula (9), when a hydrogen containing compound is added in a dechlorination step, it is possible to promote dechlorination.

The mechanism of dechlorination is complicated, and reactions other than those of the above-mentioned Formulae (5) to (9) can be considered.

The generation means for micro pores and/or sub-micro pores according to the above-mentioned chlorination treatment is a means which is completely different to conventional generation means which depend on activated treatments and the like, and loss of carbon (gasification) is small.

In dechlorination treated carbonaceous material, even when a part of the chlorine bonded to the carbon atoms remains, there are the above-mentioned uses and effects.

When a chlorination treatment is carried out, hydrogen can be replaced by chlorine. The bond dissociation energy with regard to carbon is smaller for chlorine when compared with hydrogen. As a result, chlorine is more easily dissociated compared with hydrogen, and carbon atoms can be considered as being easily taken into the carbon net plane structure by means of reduction and the like. In addition, it is presumed that for the same reason, crystals which have few defects are produced, and this is considered to be the cause of the manifested high adsorption strength.

The bond dissociation energy for bromine is smaller than that for chlorine. For this reason, for bromine, crystallization progresses even more easily, crystals with few defects are produced, and it is assumed that uses and effects will be manifested which are the same as those for chlorine.

Porous carbonaceous material is an aggregate of graphite microcrystallites. As a basic indicator which shows the characteristics of the crystallites, it is possible to consider the distance of the (002) calculated from X-ray diffraction measurements. As indicators showing the characteristics in order to understand the crystallites as a whole, the proportion of carbons of the polyaromatic ring structures, obtained by means of X-ray photoelectron spectroscopy; the G value showing the condition of crystallization, obtained by Raman spectroscopic measurement; the proportion of carbon and hydrogen contained in the carbonaceous material; and the real density of carbonaceous material can be considered. It can be considered that, by virtue of these characteristics, the properties desired for an electrical double layer capacitor or the property of electrical conductivity are given to a carbonaceous material. In addition, by virtue of the characteristics of pore volume and the specific surface area of the pores which are formed by the crystallites or the their aggregation conditions, the properties of gas adsorption are given.

THE BEST MODE FOR CARRYING OUT THE INVENTION

In the following, the present invention is explained very specifically and in detail by means of examples.

Carbonized Charcoal Starting Material

In the Examples, the carbonized charcoal starting material and its manufacturing method are indicated by the following terms.

Carbonized Charcoal A is Philippine coconut shell char which has been finely crushed (crusher: Model MB-1 manufactured by Chuo Kakouki Co. (Ltd)), made into pellets (pelletizer: Model PV-5 manufactured by Fuji Powdal (Ltd)) of 2 mm ø×5~6 mm using coal tar as a binder, and then carbonized at 600° C. under a nitrogen gas current.

Carbonized Charcoal B is phenol resin (PGA-4560, product name: Resitop, manufactured by Gun-ei Chemical Industry (Ltd)) which has been hardened at 160° C., finely crushed, then made into pellets of 2 mm ø×5~6 mm using coal tar as a binder, and carbonized at 550° C. under a nitrogen gas current.

Carbonized Charcoal C is furan resin (VF-303 manufactured by Hitachi Chemical Co. (Ltd)) which has undergone carbonization at 500° C., been finely crushed, then made into pellets of 2 mm ø×5~6 mm using coal tar as a binder, and carbonized at 550° C. under a nitrogen gas atmosphere.

Equipment for Halogen Treatment

Figure 1:
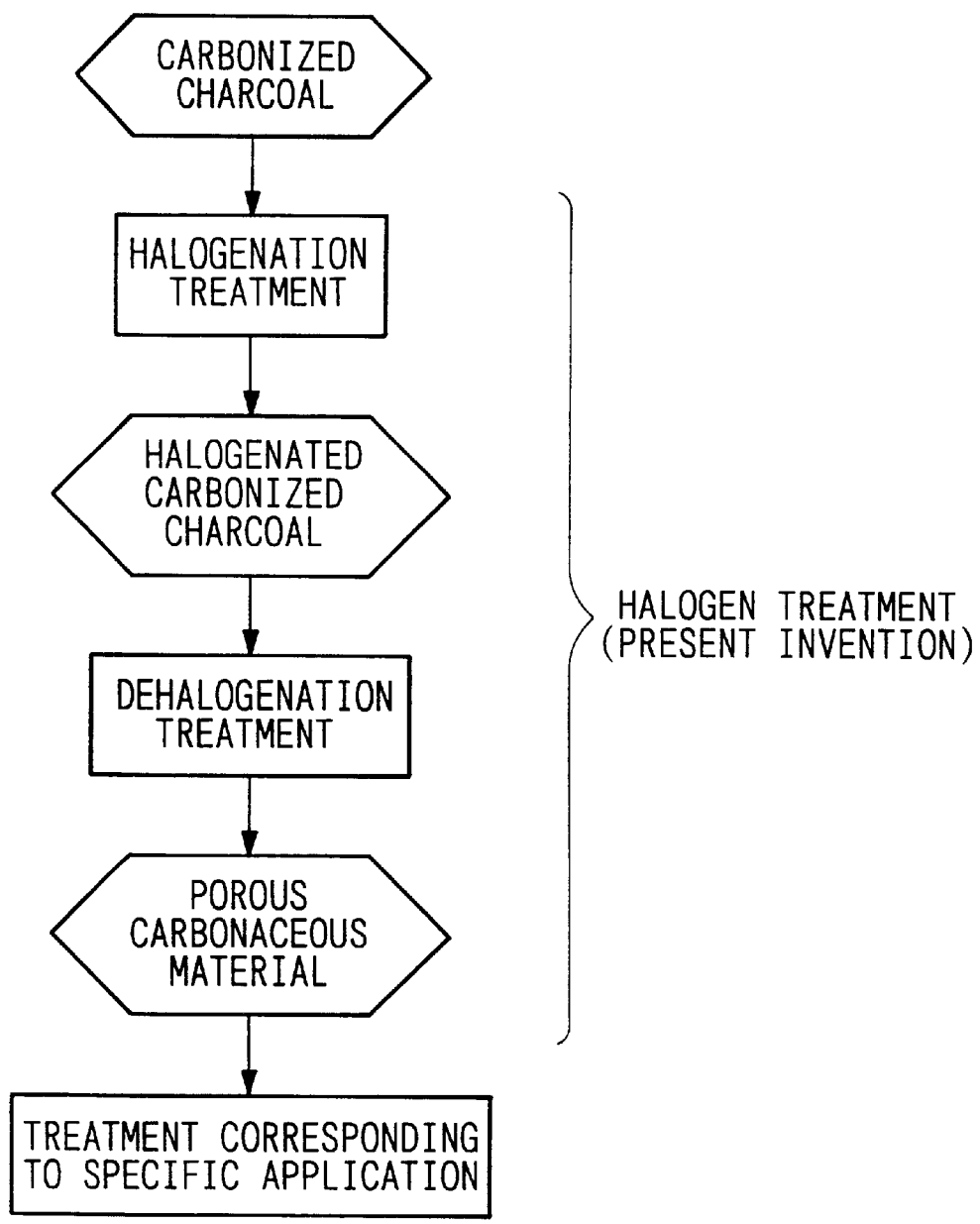
FIG. 1 is a process diagram of the manufacturing method for a porous carbonaceous material according to the halogen treatment of the present invention.
Figure 2:
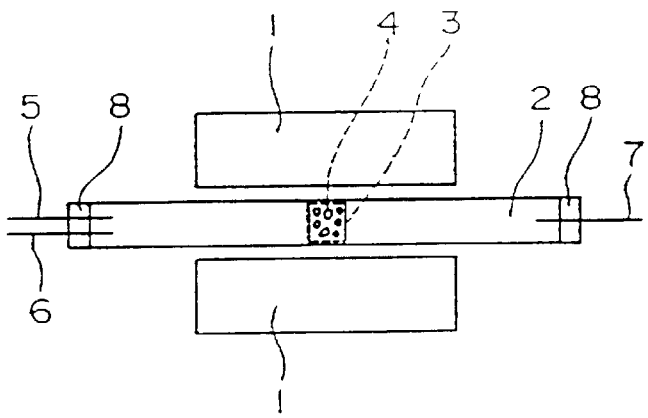
FIG. 2 is an outline diagram of the halogen treatment apparatus for the purpose of putting the present invention into effect.

An outline of the halogen treatment apparatus for the purpose of putting the present invention into effect is shown in FIG. 2. In the FIG., 1 is a pipe shaped electric kiln which is equipped with a temperature control device (the pipe shaped kiln is manufactured by Yoshida Seisakusho, the temperature control device is a thermocouple, JIS R, Model SU manufactured by Chino); 2 is a quartz pipe; 3 is a carbonaceous material container (gas permeable); 4 is a carbonaceous material; 5 is a nitrogen gas supply pipe; 6 is a supply pipe for chlorine, steam, methane, or exhaust gas of incompletely burned LPG; 7 is an exhaust gas outlet pipe; and 8 is a gum stopper. The supplying pressure for each gas is approximately atmospheric pressure.

In the chlorination treatment, nitrogen gas flows at a predetermined rate from pipe 5, and chlorine gas flows at a predetermined rate from pipe 6. In the high temperature dechlorination treatment, nitrogen gas flows from pipe 5 at a predetermined rate. In the low temperature dechlorination treatment, nitrogen gas flows from pipe 5 at a predetermined rate, and nitrogen gas containing steam, methane, or the like; or incompletely burned LPG flows from pipe 6 at a predetermined rate. The flow rate is measured by a float-type flowmeter (chlorine gas: PGF-N model manufactured by Ryutai Kogyo (Ltd)); other gases: ST-4 model manufactured by Nippon Flowcell Co.).

Measurement of Adsorbed Amount, Weight, Specific Surface Area, and Pore Volume

The measurements of the amount of nitrogen and oxygen adsorbed in the following Examples were undertaken by means of a capacity method (equipment: a BElSORP28 manufactured by Nippon Bell (Ltd)) at conditions of 25° C. and 1 atm. Nitrogen gas saturated with benzene at 25° C. was supplied, and the amount of benzene adsorbed was calculated from the change in weight. Before measurement, the specimen was degassed by means of vacuum evacuation for 2 hours at 100° C.

Weight is measured by an electric balance (LIBROR EB-430HW manufactured by Shimadzu Co.). In the following Examples, unless otherwise indicated, the increase in weight is shown based on the weight of the carbonized charcoal starting material before the chlorination treatment.

The specific surface area was calculated from the Brunauer-Emmett-Teller adsorption equation after measuring the amount of nitrogen gas adsorbed at −196° C. (the temperature at which liquid nitrogen boils). The measurement equipment used an Accusorb 2100-02 model manufactured by Shimadzu Co.

The pore volume was calculated as a value of the amount of benzene adsorbed (g Benzene/g Carbon) divided by the density of liquid benzene (0.879 g/cm$^3$).

Figure 3:
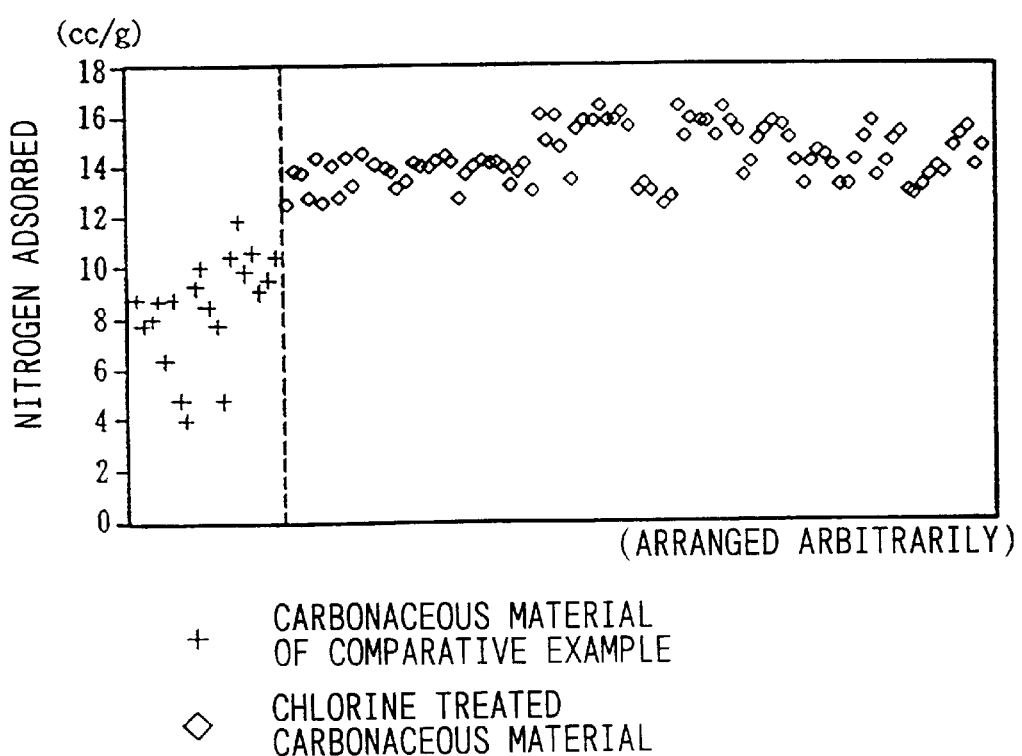
FIG. 3 is a diagram which compares the amount of nitrogen adsorbed by the conventional carbonaceous materials shown in Table 1 and the carbonaceous material shown in the Comparative Example with the amount of nitrogen adsorbed by chlorine treated carbonaceous materials of the present invention.

The quantities of nitrogen gas adsorbed in each Example up to Example 25, are gathered together into Tables 4~6, which follow Example 25. In addition, the quantities of nitrogen gas adsorbed for the conventional carbonaceous materials shown in Table 1 and the carbonaceous materials shown in the Comparative Examples, and the quantities of nitrogen adsorbed for the chlorine treated carbonaceous materials of the present invention up to Example 25 are shown in FIG. 3.

Furthermore, when the starting materials, specimen manufacturing conditions, measuring methods, etc. in the following Examples and Comparative Examples are different to those mentioned above, they will be described.

COMPARATIVE EXAMPLE 1

Quantities of Nitrogen Adsorbed for Commercial Products and Carbonized Charcoals Undergone Heat Treatment Only The amounts of nitrogen and oxygen adsorbed by carbonaceous material obtained by heat-treating commercially available carbonaceous materials (activated carbon) and the above-mentioned carbonized charcoal were measured. Specimen (1) was Shirasagi G2-X manufactured by Takeda Chemical Industries (Ltd), and Specimen (2) was 4GA manufactured by Kuraray Chemical Co. (Ltd). Specimen (3) was Maxsorp G15L manufactured by Kansai Netsukagaku (Ltd). Sample (4) was Carbonized Charcoal A heat-treated at a temperature of 800° C. in nitrogen gas. Specimen (5) was Carbonized Charcoal B. Specimen (6) was Carbonized Charcoal B heat-treated at a temperature of 700° C. in nitrogen gas. Specimen (7) was Carbonized Charcoal B heat-treated at a temperature of 900° C. in nitrogen gas. Specimen (8) was Carbonized Charcoal C heat-treated at a temperature of 800° C. in nitrogen gas. Specimen (9) was Carbonized Charcoal C heat-treated at a temperature of 1000° C. in nitrogen gas. The quantities of nitrogen adsorbed were (1): 9.3 cc/g; (2): 10.0 cc/g; (3): 8.5 cc/g; (4): 7.8 cc/g; (5): 4.8 cc/g; (6): 10.4 cc/g; (7): 11.9 cc/g; (8): 9.9 cc/g; and (9): 10.6 cc/g. The quantities of oxygen adsorbed were (4): 7.6 cc/g; (7): 11.3 cc/g; and (9): 9.5 cc/g.

Even the commercial activated carbon which adsorbed the greatest amount of nitrogen did not show an adsorption amount exceeding 10.0 cc/g.

EXAMPLE 1

A/B, High Temperature Dechlorination/In Nitrogen Gas

Carbonized Charcoal A (1) (15 g) and Carbonized Charcoal B (2) (15 g) were each chlorinated (60 minutes) by heating to a temperature of 500° C., and running a gas mixture of 0.1 L/min chlorine in 0.9 L/min nitrogen over them. Next, specimens (1) and (2) were dechlorinated (high temperature dechlorination treatment) by heat-treating at 1000° C. for 60 minutes under a nitrogen gas flow (3 L/min). During the dechlorination treatment, the presence of hydrogen chloride in the nitrogen exhaust gas was confirmed by means of a detector tube (models 14L and 14M manufactured by Gastech (Ltd)). The weights after the dechlorination treatment had decreased, respectively, (1) −5.8% by weight, and (2) −4.3% by weight, (the "−" sign before the numbers indicates the decrease in weight based on the carbonized charcoal; this is the same hereinafter). The amount of nitrogen adsorbed was (1): 12.6 cc/g, and (2): 13.9 cc/g.

The amount of nitrogen adsorbed by chlorine treated (high temperature dechlorination) Carbonized Charcoal A (1) was 62% greater than that of (4) in Comparative Example 1. The amount of nitrogen adsorbed by chlorine treated (high temperature dechlorination) Carbonized Charcoal B (2) was 17% greater than that of (7) in Comparative Example 1.

EXAMPLE 2

B, High Temperature Dechlorination/In a Vacuum

Carbonized Charcoal B (10g) was chlorinated (60 minutes) by heating to a temperature of 550° C., and running a gas mixture of 0.1 L/min chlorine in 0.9 L/min nitrogen over it. Next, it was dechlorinated by connecting a vacuum pump to the exhaust gas outlet line of the chlorine treatment apparatus, and conducting a heat-treatment at a temperature of 1000° C. during vacuum evacuation. The vacuum at the inlet mouth of the vacuum pump was 10 Torr. The amount of nitrogen adsorbed was 13.8 cc/g.

In the same way as in nitrogen, and even for heat treatment (high temperature dechlorination treatment) under vacuum evacuation, the amount of nitrogen adsorbed increased.

EXAMPLE 3

B, High Temperature Dechlorination, Effect of Amount of Carbonized Charcoal on Chlorination and Effect of Temperature on Heat Treatment in Nitrogen Two specimens (each 10 g) of Carbonized Charcoal B taken as starting material were respectively chlorinated (60 minutes) by heating to a temperature of 550° C., and running a gas mixture of 0.1 L/min chlorine in 0.9 L/min nitrogen over them. Next, under a nitrogen gas flow (3 L/min), each of the two specimens were dechlorinated by heat-treating for 30 minutes at a temperature of 700° C. for (1), and 900° C. for (2). In the same way, two specimens (each 25 g) of Carbonized Charcoal B taken as starting material were respectively chlorinated (60 minutes) by heating to a temperature of 550° C., and running a gas mixture of 0.1 L/min chlorine in 0.9 L/min nitrogen over them. Next, under a nitrogen gas flow (3 L/min), each of the two specimens were dechlorinated by heat-treating at a temperature of 700° C. for (3), and 900° C. for (4). The specimens of (1) and (2) after the chlorination treatment (before the dechlorination treatment) were cooled to room temperature, and when the weight was measured (this weight is called the chlorinated carbonized charcoal weight; inside the parentheses, the atomic ratio Cl/C is shown; this is the same hereinafter), the weight had increased 39.0% by weight (0.131). The amount of nitrogen adsorbed was (1): 12.8 cc/g; (2): 14.4 cc/g; (3): 12.6 cc/g; and (4): 14.1 cc/g.

Figure 4:
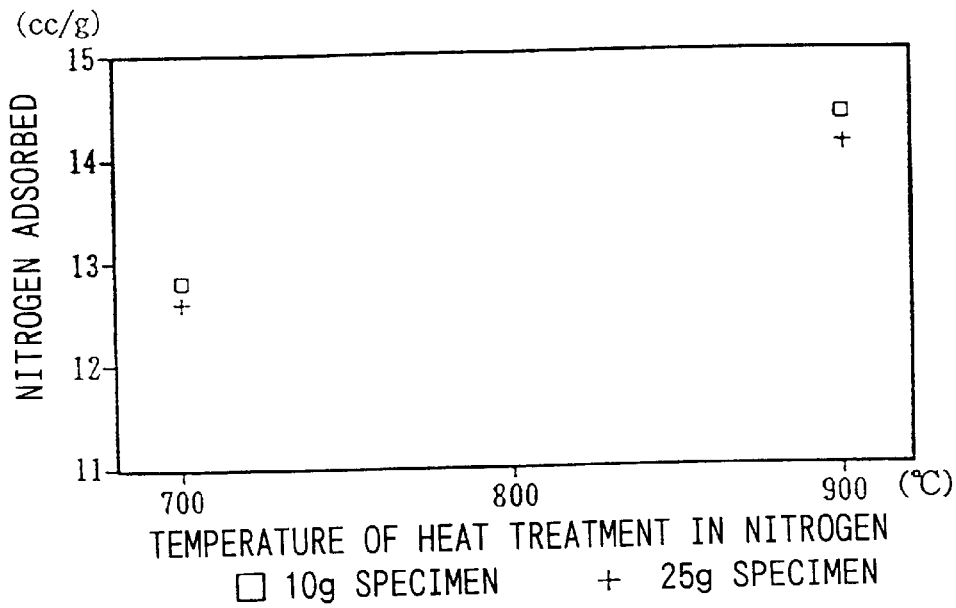
FIG. 4 is a graph which shows the relationship between the amount of nitrogen adsorbed for chlorine treated specimens and the temperature of the high temperature dechlorination treatment according to Example 3.

The relationship between the amount of nitrogen adsorbed by the specimens which were chlorine treated and the temperature of the heat treatment (high temperature dechlorination treatment) in nitrogen for the present Example is shown in FIG. 4.

With regard to the temperature of the heat treatment in nitrogen, a wide range of 700~900° C. is effective, but it was found that the higher the temperature the greater the effectiveness.

EXAMPLE 4

A/B, Low Temperature Dechlorination/Water

Carbonized Charcoal A (15 g) (1) and Carbonized Charcoal B (15 g) (2) were each chlorinated (60 minutes) by heating to a temperature of 500° C., and running a gas mixture of 0.1 L/min chlorine in 0.9 L/min nitrogen over them. Next, the specimens of (1) and (2) were dechlorinated (low temperature dechlorination treatment) by heat-treating at a temperature of 700° C. for 30 minutes under a flow of nitrogen gas which had been saturated with steam at 25° C. (3 L/min, at a pressure of approximately 1 atm; therefore, the concentration of the water vapor was approximately 3% by volume). During the chlorination treatment and during the dechlorination treatment, the presence of hydrogen chloride in the nitrogen exhaust gas was confirmed by means of a detector tube. The weight of (2) after the dechlorination treatment had decreased by −12.4% by weight. The amount of nitrogen adsorbed was (1): 12.9 cc/g, and (2): 14.4 cc/g.

The amount of nitrogen adsorbed by chlorine treated (low temperature dechlorination) Carbonized Charcoal A (1) was 65% greater than that of (4) in Comparative Example 1. The amount of nitrogen adsorbed by chlorine treated (low temperature dechlorination) Carbonized Charcoal B was 21% greater than that of (7) in Comparative Example 1.

EXAMPLE 5

A, High Temperature Dechlorination+Low Temperature Dechlorination, Effect of Temperature on Chlorination Seven specimens (each 15 g) of Carbonized Charcoal A taken as starting material were respectively chlorinated (60 minutes) by heating to temperatures of 350° C. for (1), 400° C. for (2), 450° C. for (3), 500° C. for (4), 550° C. for (5), 600° C. for (6), and 700° C. for (7), and running a gas mixture of 0.1 L/min chlorine in 0.9 L/min nitrogen over them. Next, under a nitrogen gas flow (3 L/min), each of the seven specimens were dechlorinated by heat-treating (high temperature dechlorination treatment) at a temperature of 1000° C. for 60 minutes, then, additionally, heat-treating (low temperature dechlorination treatment) at a temperature of 700° C. for 30 minutes under a current of nitrogen gas which had been saturated with steam at 25° C. The weights of the chlorinated carbonized charcoal had respectively increased by (1): 32.3% by weight (0.109); (2): 36.7% by weight (0.124);

(3): 42.3% by weight (0.143); (4): 43.7% by weight (0.148); (5):

35.2% by weight (0.119); (6): 25.5% by weight (0.086); and (7):

21.7% by weight (0.073). The weights after the dechlorination treatment in nitrogen gas respectively decreased by (1): −5.1% by weight; (2): −5.4% by weight; (3): −6.1% by weight; (4):

−5.8% by weight; (5): −4.6% by weight; (6): −4.8% by weight; and (7): −5.2% by weight. The weights after the dechlorination treatment in steam decreased respectively by (1): −11.3% by weight; (2): −11.9% by weight; (3): −10.8% by weight; (4): −11.0% by weight; (5): −11.0% by weight; (6): −10.5% by weight; and (7): −10.8% by weight. The amount of nitrogen adsorbed was (1): 13.3 cc/g; (2): 14.6 cc/g; (3): 14.1 cc/g; (4): 14.2 cc/g; (5): 14.0 cc/g; (6): 13.9 cc/g and (7): 13.2 cc/g.

Figure 5:
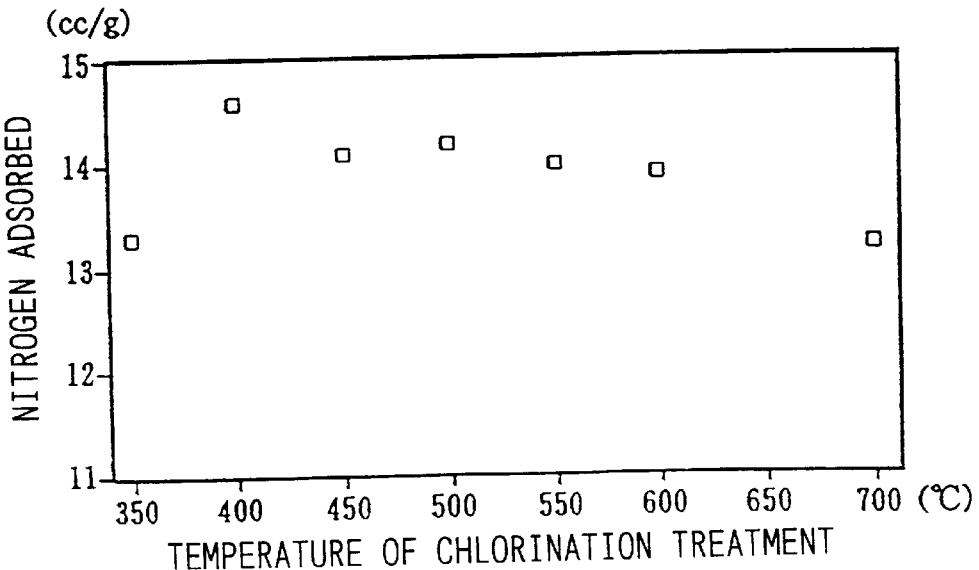
FIG. 5 is a graph which shows the relationship between the amount of nitrogen adsorbed for chlorine treated specimens and the temperature of the chlorine treatment according to Example 5.

The relationship between the amount of nitrogen adsorbed by the specimens which were chlorine treated and the temperature of the chlorination treatment of the present Example is shown in FIG. 5.

A chlorination temperature within a wide range of 350~700° C. is effective. In addition, the weight (carbon) loss due to the chlorine treatment did not exceed approximately 10%.

EXAMPLE 6

A, High Temperature Dechlorination+Low Temperature Dechlorination, Effect of Time on Chlorination Four specimens (each 15 g) of Carbonized Charcoal A taken as starting material were respectively chlorinated by heating to a temperature of 500° C., and running a gas mixture of 0.1 L/min chlorine in 0.9 L/min nitrogen over them. This time, the chlorination reaction time for each of the four specimens was (1): 15 minutes; (2): 30 minutes; (3): 60 minutes; and (4): 120 minutes. Next, under a nitrogen gas flow (3 L/min), each of the four specimens were dechlorinated by heat-treating at a temperature of 1000° C. for 20 minutes, then, additionally, heat-treating at a temperature of 700° C. for 30 minutes under a flow of nitrogen gas which had been saturated with steam at 25° C. The weights of the chlorinated carbonized charcoal had respectively increased by (1): 28.9% by weight (0.098); (2): 39.0% by weight (0.132); (3): 42.3% by weight (0.143); and (4): 42.3% by weight (0.143). The amount of nitrogen adsorbed was (1): 13.5 cc/g; (2): 14.2 cc/g; (3): 14.1 cc/g; and (4): 14.1 cc/g.

When the temperature was 500° C. and the chlorine density was 10% by volume, the chlorination reaction for 15 g of carbonized charcoal was completed in approximately 30 minutes. In addition, even if the chlorination reaction went for more than 60 minutes, the atomic ratio did not increase.

EXAMPLE 7

A, High Temperature Dechlorination+Low Temperature Dechlorination, Effect of Chlorine Concentration on Chlorination Three specimens (each 15 g) of Carbonized Charcoal A taken as starting material were each chlorinated (60 minutes)

by heating to a temperature of 500° C., and running a gas mixture of 0.1 L/min chlorine in 0.9 L/min nitrogen over them. This time, the flow rate of the chlorine and the nitrogen ($N_2$(L/min)/$Cl_2$(L/min)) were respectively (1): 0.9/0.1; (2): 0.85/0.15; and (3): 0.80/0.20. Next, under a nitrogen gas flow (3 L/min), each of the three specimens were dechlorinated by heat-treating at a temperature of 1000° C. for 20 minutes, then, additionally, heat-treating at a temperature of 700° C. for 30 minutes under a current of nitrogen gas which had been saturated with steam at 25° C. The weights of the chlorinated carbonized charcoal had respectively increased by (1): 42.3% by weight (0.143); (2): 43.1% by weight (0.146); and (3): 42.6% by weight (0.144). The amount of nitrogen adsorbed was (1): 14.3 cc/g;

(2): 14.4 cc/g; and (3): 14.2 cc/g.

Even when the chlorine concentration was 20% by volume, the atomic ratio did not increase.

EXAMPLE 8

A, High Temperature Dechlorination+Low Temperature Dechlorination, Effect of Temperature on Heat Treatment in Nitrogen Eight specimens (each 15 g) of Carbonized Charcoal A taken as starting material were each chlorinated (60 minutes) by heating to temperatures of 500° C., and running a gas mixture of 0.1 L/min chlorine in 0.9 L/min nitrogen over them. Next, under a nitrogen gas flow (3 L/min), each of the eight specimens were heat-treated for 20 minutes at a temperature of 800° C. for (1); 900° C. for (2); 950° C. for (3); 1000° C. for (4); 1050° C. for (5); 1075° C. for (6); 1100° C. for (7); and 1200° C. for (8). Additionally, each specimen was dechlorinated by heat-treating at a temperature of 700° C. for 30 minutes under a current of nitrogen gas which had been saturated with steam at 25° C.

The amount of nitrogen adsorbed was (1): 12.8 cc/g; (2): 13.8 cc/g; (3): 14.1 cc/g; (4): 14.3 cc/g; (5): 14.2 cc/g; (6): 14.2 cc/g; (7): 14.0 cc/g; and (8): 13.3 cc/g.

Figure 6:
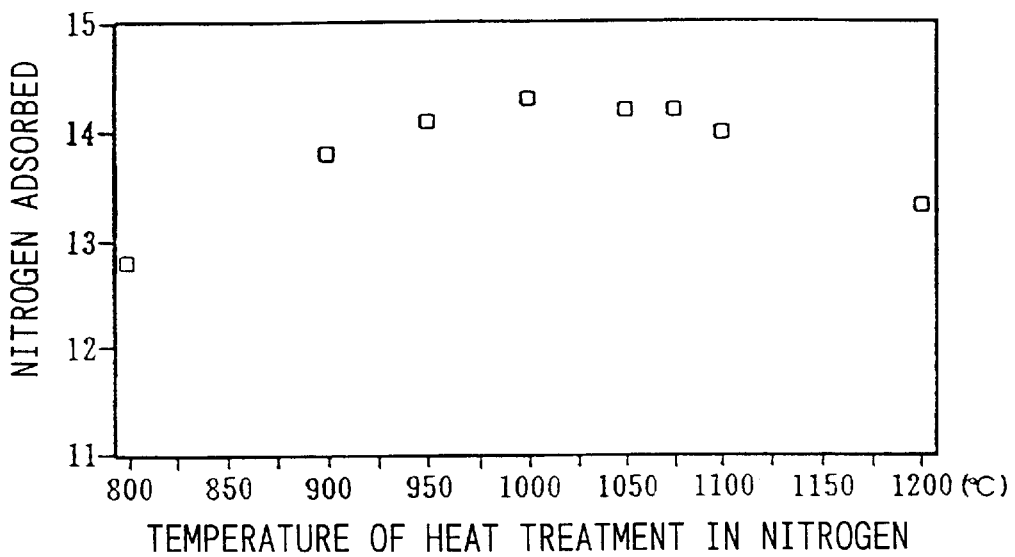
FIG. 6 is a graph which shows the relationship between the amount of nitrogen adsorbed for chlorine treated specimens and the temperature of the high temperature dechlorination treatment according to Example 8.

The relationship between the amount of nitrogen adsorbed by the chlorine treated specimens and the temperature of the heat treatment (high temperature dechlorination treatment) in nitrogen for the present Example is shown in FIG. 6.

The heat treatment in nitrogen is effective in a wide temperature range of 800~1200° C., and, in particularly, a temperature range of 950~1100° C. was the most suitable.

EXAMPLE 9

A, High Temperature Dechlorination+Low Temperature Dechlorination, Effect of Temperature on Heat Treatment in Steam Three specimens (each 15 g) of Carbonized Charcoal A taken as starting material were each chlorinated (60 minutes) by heating to a temperature of 500° C., and running a gas mixture of 0.1 L/min chlorine in 0.9 L/min nitrogen over them. Next, under a nitrogen gas flow (3 L/min), each of the three specimens were heat-treated at a temperature of 1000° C. for 20 minutes. Additionally, each of the three specimens were dechlorinated by heat-treating for 30 minutes at a temperature of 650° C. for (1); 700° C. for (2); and 750° C. for (3) under a current of nitrogen gas which had been saturated with steam at 25° C. The amount of nitrogen adsorbed was (1): 13.8 cc/g; (2): 14.2 cc/g; and (3): 13.1 cc/g.

Figure 7:
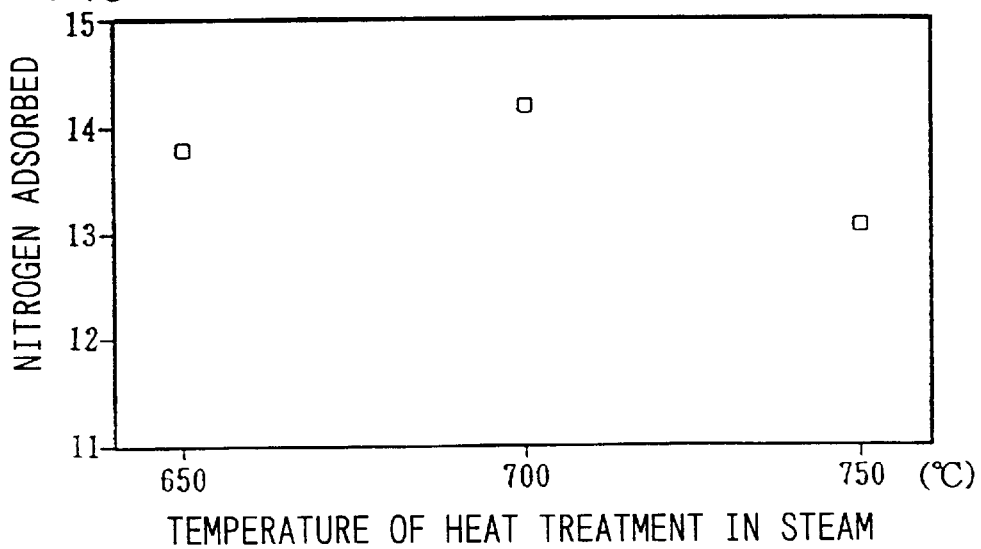
FIG. 7 is a graph which shows the relationship between the amount of nitrogen adsorbed for chlorine treated specimens and the temperature of the low temperature dechlorination treatment according to Example 9.

The relationship between the amount of nitrogen adsorbed for the chlorine treated specimens and the temperature of the heat treatment (low temperature dechlorination treatment) in steam for the present Example is shown in FIG. 7.

The heat treatment in steam was effective in a temperature range of 650~750° C.

EXAMPLE 10

B, Low Temperature Dechlorination+High Temperature Dechlorination

Two specimens, (1): 10 g; and (2): 25 g, of Carbonized Charcoal B taken as starting material were each chlorinated (60 minutes) by heating to a temperature of 500° C., and running a gas mixture of 0.1 L/min chlorine in 0.9 L/min nitrogen over them.

Next, each specimen was dechlorinated by heat-treating (low temperature dechlorination treatment) at a temperature of 700° C. for 30 minutes under a nitrogen gas flow (3 L/min) which had been saturated with steam at 25° C., then, additionally heat-treating (high temperature dechlorination treatment) at a temperature of 900° C. for 30 minutes under a nitrogen gas flow (3 L/min). The amount of nitrogen adsorbed was (1): 16.1 cc/g; and (2): 15.1 cc/g.

Even when the a high temperature dechlorination treatment is conducted after a low temperature dechlorination treatment, the results of the chlorine treatment are approximately the same as when a low temperature dechlorination treatment is conducted after a high temperature dechlorination treatment.

EXAMPLE 11

B/C High Temperature Dechlorination+Low Temperature Dechlorination, Effect of Variety of Carbonized Charcoal Carbonized Charcoal B (15 g) (1), and Carbonized Charcoal C (15 g) (2) were each chlorinated (60 minutes) by heating to a temperature of 500° C., and running a gas mixture of 0.1 L/min chlorine in 0.9 L/min nitrogen over them. Next, under a nitrogen gas flow (3 L/min), the two specimens were each heat-treated at a temperature of 1000° C. for 20 minutes. Additionally, under a current of nitrogen gas which had been saturated with steam at 25° C., the two specimens were dechlorinated by heat-treating at a temperature of 700° C. for 30 minutes. The weights of the chlorinated carbonized charcoal increased, respectively, (1): 45.0% by weight (0.152), and (2):

43.0% by weight (0.145). The weights after the dechlorination treatment in nitrogen gas had decreased, respectively, (1):

−4.3% by weight, and (2): −4.2% by weight. The amount of nitrogen adsorbed was (1): 16.0 cc/g; and (2): 14.8 cc/g. The amount of oxygen adsorbed was (1): 15.2 cc/g; and (2): 14.1 cc/g.

The chlorine treatment was effective for coconut shell char, phenol resins, and furan resin.

COMPARATIVE EXAMPLE 2

Carbonized Charcoals Undergone Heat Treatment Only/Effect of Hydrogen Chloride Treatment Carbonized Charcoal A (15 g) was heat-treated at a temperature of 500° C. for 60 minutes while a current of 0.9 L/min of nitrogen gas (not mixed with chlorine) was run over it. Next, it was heat-treated at 1000° C. for 20 minutes, and, additionally, heat-treated (specimen (1)) at 700° C. for 30 minutes. After sufficient acid washing in an aqueous solution of hydrochloric acid, another specimen of Carbonized Charcoal A (15 g) (specimen (2)) was heat-treated at 900° C. for 60 minutes while a flow of 0.9 L/min of nitrogen gas (not mixed with chlorine) was run over it. Another specimen of Carbonized Charcoal A (15 g) (specimen (3)) was heat-treated at 1000° C. for 60 minutes while a flow of approximately 0.5 L/min of hydrogen chloride gas was run over it. The amount of nitrogen adsorbed was (1): 9.1 cc/g; (2): 9.5 cc/g; and (3): 10.4 cc/g.

A hydrogen chloride treatment, or a heat treatment alone did not show results like those of the chlorine treatments.

EXAMPLE 12

A/B, High Temperature Dechlorination+Low Temperature Dechlorination, Dechlorination Treatment in Incompletely Burned LPG Exhaust Gas Carbonized Charcoal A (15 g) (1), and Carbonized Charcoal B (15 g) (2) were each chlorinated (60 minutes) by heating to a temperature of 500° C., and running a gas mixture of 0.1 L/min chlorine in 0.9 L/min nitrogen over them. Next, under a nitrogen gas flow (3 L/min), the two specimens were each heat-treated at a temperature of 1000° C. for 20 minutes. Additionally, the two specimens were dechlorinated by heat-treating at a temperature of 700° C. for 30 minutes in incompletely burned LPG exhaust gas (approximately 3 L/min). The amount of nitrogen adsorbed was (1): 13.5 cc/g; and (2): 15.5 cc/g.

The low temperature dechlorination treatment was also effective under a current of incompletely burned LPG exhaust gas.

EXAMPLE 13

B, High Temperature Dechlorination+Low Temperature Dechlorination, High Temperature Dechlorination, Effect of Hydrogen containing Compound Three specimens (each 15 g) of Carbonized Charcoal B taken as starting material were each chlorinated (60 minutes) by heating to a temperature of 500° C., and running a gas mixture of 0.1 L/min chlorine in 0.9 L/min nitrogen over them. Next, under a nitrogen gas flow (3 L/min), each of the three specimens were heat-treated at a temperature of 1000° C. for 20 minutes. The specimen which was dechlorinated by this heat treatment only was specimen (1). One of the remaining two was made specimen (2) and, additionally, it was dechlorinated by heat-treating at a temperature of 700° C. for 30 minutes under a current of nitrogen gas which had been saturated with steam at 25° C. Additionally, the remaining specimen (3) was dechlorinated by heat-treating at 700° C. for 30 minutes in methane (0.05 L/min) diluted with nitrogen (0.9 L/min). The weight after the dechlorination treatment in nitrogen gas had decreased by −4.3% by weight. The amount of nitrogen adsorbed was (1): 15.9 cc/g; (2): 15.9 cc/g; and (3): 16.5 cc/g.

The dechlorination treatment was also effective under a methane atmosphere.

EXAMPLE 14

B, High Temperature Dechlorination+Low Temperature Dechlorination, Effec of Temperature on Heat Treatment in Methane Four specimens (each 15 g) of Carbonized Charcoal B taken as starting material were each chlorinated (60 minutes) by heating to a temperature of 500° C., and running a gas mixture of 0.1 L/min chlorine in 0.9 L/min nitrogen over them. Next, under a nitrogen gas flow (3 L/min), each of the four specimens were heat-treated at a temperature of 1000° C. for 20 minutes. Additionally, in methane (0.05 L/min) diluted with nitrogen (0.9 L/min), they were dechlorinated by heat-treating for 30 minutes at a temperature of 600° C. for (1), 650° C. for (2), 700° C. for (3) and 750° C. for (4). The weights after the dechlorination treatment had decreased (1): −7.6% by weight; (2): −7.9% by weight; (3): −8.6% by weight; and (4): −9.4% by weight. The amount of nitrogen adsorbed was (1): 15.9 cc/g; (2): 15.9 cc/g; (3): 16.2 cc/g; and (4): 15.7 cc/g.

Figure 8:
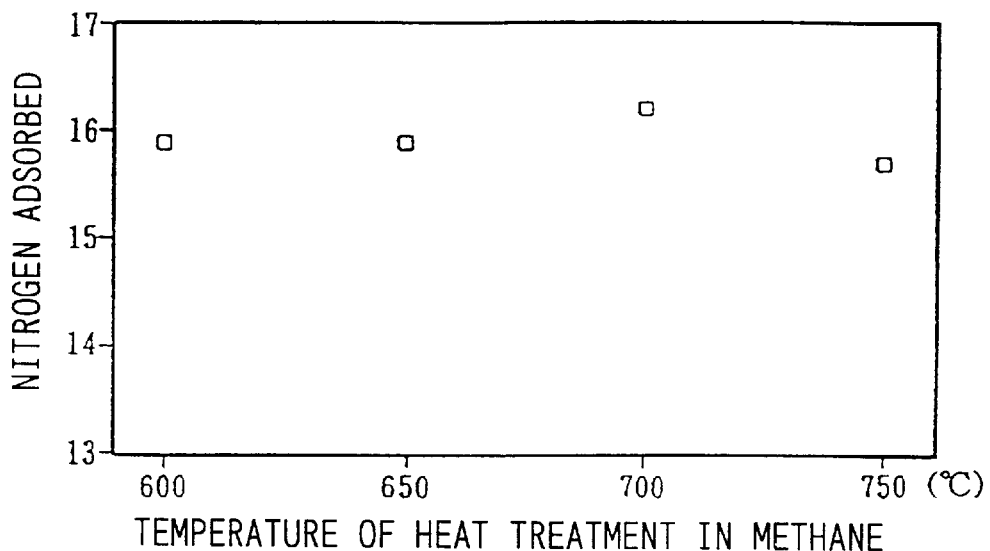
FIG. 8 is a graph which shows the relationship between the amount of nitrogen adsorbed for chlorine treated specimens and the temperature of the low temperature dechlorination treatment according to Example 14.

The relationship between the amount of nitrogen adsorbed by the chlorine treated specimens and the temperature of the heat treatment (low temperature dechlorination treatment) in methane gas for the present Example is shown in FIG. 8.

The heat treatment in methane was effective in a range of 600~750° C.

EXAMPLE 15

B, Low Temperature Dechlorination, Effect of Temperature on Dechlorination

The Carbonized Charcoal B used in the present Example was obtained by carbonization at 600° C.

Three specimens (each 15 g) of Carbonized Charcoal B taken as starting material were each chlorinated (30 minutes) by heating to a temperature of 700° C. for (1), 900° C. for (2), and 1000° C. for (3) and running a gas mixture of 0.1 L/min chlorine in 0.9 L/min nitrogen over them. Next, each of the three specimens were dechlorinated by heat-treating at a temperature of 700° C. for 30 minutes under a nitrogen gas current which had been saturated with steam at 25° C. The weight of the chlorinated carbonized charcoal for (1) had increased 9.5% by weight (0.032). The amount of nitrogen adsorbed (the number inside parentheses is the amount of oxygen adsorbed) was (1): 13.1 cc/g; (2): 13.2 cc/g (14.6 cc/g); and (3): 13.1 cc/g.

Figure 9:
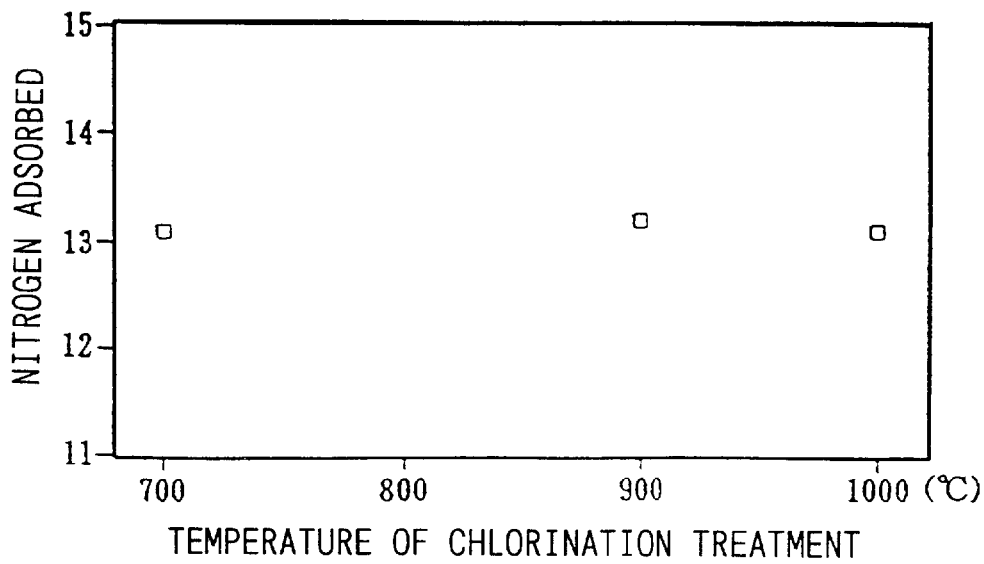
FIG. 9 is a graph which shows the relationship between the amount of nitrogen adsorbed for chlorine treated specimens and the temperature of the chlorine treatment according to Example 15.

The relationship between the amount of nitrogen adsorbed for chlorine treated specimens and the temperature of the chlorination treatment for the present Example is shown in FIG. 9.

For Carbonized Charcoal B as well, a chlorination temperature in a wide range of 700~1000° C. was effective. In addition, the degree of chlorination was also effective at Cl/C=0.032.

EXAMPLE 16

B, Low Temperature Dechlorination, Effect of Temperature on Dechlorination

Four specimens (each 10 g) of Carbonized Charcoal B taken as starting material were respectively chlorinated (60 minutes) by heating to a temperature of 500° C., and running a gas mixture of 0.1 L/min chlorine in 0.9 L/min nitrogen over them. Next, they were dechlorinated by heat-treating under a nitrogen gas flow (0.5 L/min, the steam concentration was approximately 85% by volume) which contained 3 g/min of ion exchanged water for 30 minutes at a temperature of 600° C. for (1), 700° C. for (2), 800° C for (3), and 900° C. for (4), and, additionally, heat-treating at a temperature of 700° C. for 30 minutes under a current of nitrogen gas which had been saturated with steam at 25° C. During the chlorination treatment and the dechlorination treatment, the presence of hydrogen chloride in the nitrogen exhaust gas was confirmed by means of a detector tube. The weights after dechlorination had respectively decreased by (1): −9.6% by weight; (2): −16.4% by weight; (3): −28.8% by weight; and (4): −49.6% by weight. The amount of nitrogen adsorbed was (1): 12.5 cc/g; (2): 12.5 cc/g; (3): 12.8 cc/g; and (4): 10.5 cc/g.

Figure 10:
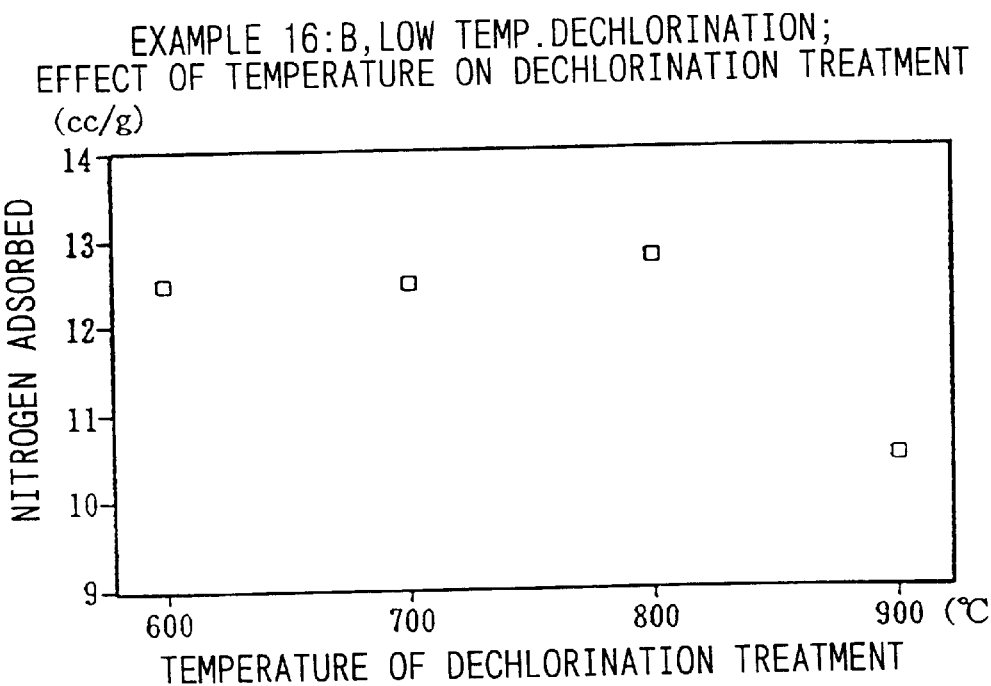
FIG. 10 is a graph which shows the relationship between the amount of nitrogen adsorbed for chlorine treated specimens and the temperature of the low temperature dechlorination treatment according to Example 16.

The relationship between the quantity of nitrogen adsorbed for the chlorine treated specimens and the temperature of the heat treatment (low temperature dechlorination treatment) in steam for the present Example is shown in FIG. 10.

The above-mentioned low temperature dechlorination treatment was effective in a temperature range of 600~800° C. For temperatures greater than 900° C., the weight decreased due to usual activating effects, and the amount of nitrogen adsorbed was reduced.

EXAMPLE 17

B, High Temperature Dechlorination+Low Temperature Dechlorination, Effect of Temperature on Chlorination The Carbonized Charcoal B used in the present Example was obtained by carbonization at 600° C.

Five specimens (each 15 g) of Carbonized Charcoal B taken as starting material were respectively chlorinated (120 minutes) by heating to a temperature of 350° C. for (1), 400° C. for (2), 450° C. for (3), 500° C. for (4), and 550° C. for (5), and running a gas mixture of 0.1 L/min chlorine in 0.9 L/min nitrogen over them. Next, each of the five specimens were dechlorinated by heat-treating at a temperature of 1000° C. for 60 minutes under a nitrogen gas flow (3 L/min), and, additionally, heat-treating the five specimens at a temperature of 700° C. for 30 minutes under a nitrogen gas current which had been saturated with steam at 25° C. (3 L/min). The weights of the chlorinated carbonized charcoal of specimen (2), and specimen (5) had each increased by (2): 70.0% by weight (0.237), and (5): 29.6% by weight (0.100).

After the heat treatment in nitrogen gas, the weights had decreased by (2): −7.5% by weight, and (5): −7.5% by weight.

The amount of nitrogen adsorbed (the number inside parentheses is the amount of oxygen adsorbed) was (1): 16.4 cc/g (15.4 cc/g); (2): 15.2 cc/g (14.6 cc/g); (3): 15.9 cc/g, (4): 15.8 cc/g, and (5): 15.8 cc/g.

Figure 11:
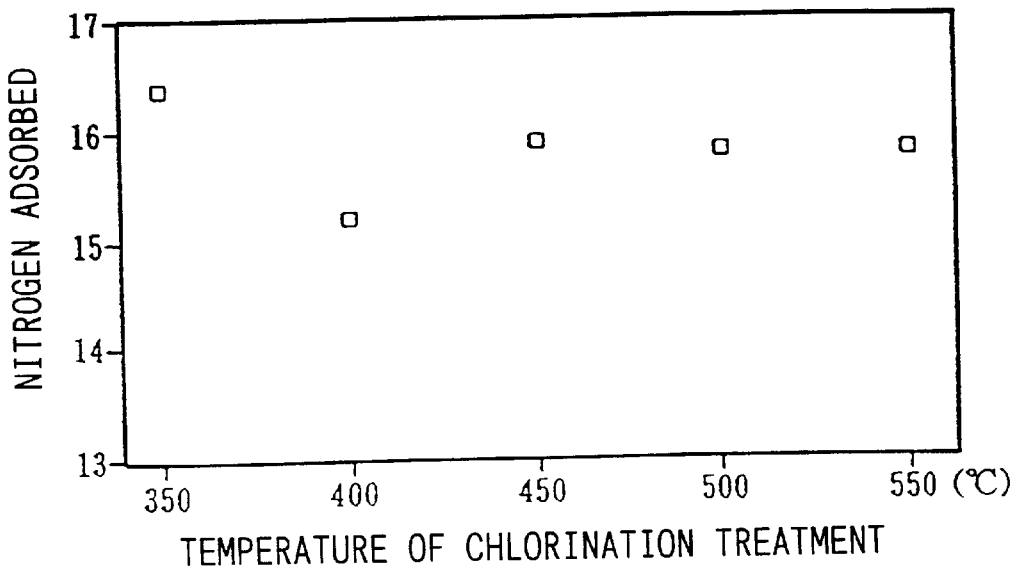
FIG. 11 is a graph which shows the relationship between the amount of nitrogen adsorbed for chlorine treated specimens and the temperature of the chlorine treatment according to Example 17.

The relationship between the amount of nitrogen adsorbed for chlorine treated specimens and the temperature of the chlorination treatment for the present Example is shown in FIG. 11.

For Carbonized Charcoal B as well, a chlorination temperature in a wide range of 350~550° C. was effective.

EXAMPLE 18

B, High Temperature Dechlorination/Low Temperature Dechlorination, Effect of Temperature on Heat Treatment in Nitrogen The Carbonized Charcoal B used in the present Example was obtained by carbonization at 600° C.

Four specimens (each 15 g) of Carbonized Charcoal B taken as starting material were respectively chlorinated (120 minutes) by heating to a temperature of 400° C., and running a gas mixture of 0.1 L/min chlorine in 0.9 L/min nitrogen over them. Next, under a nitrogen gas flow (3 L/min), each of the four specimens were heat-treated for 20 minutes at a temperature of 900° C. for (1), 1000° C. for (2), 1100° C. for (3), and 1200° C. for (4). Additionally, under a flow of nitrogen gas which had been saturated with steam at 25° C., the four specimens were dechlorinated by heat-treating at a temperature of 700° C. for 30 minutes. The amount of nitrogen adsorbed was (1): 15.2 cc/g; (2): 16.4 cc/g; (3): 15.8 cc/g, and (4): 15.4 cc/g.

Figure 12:
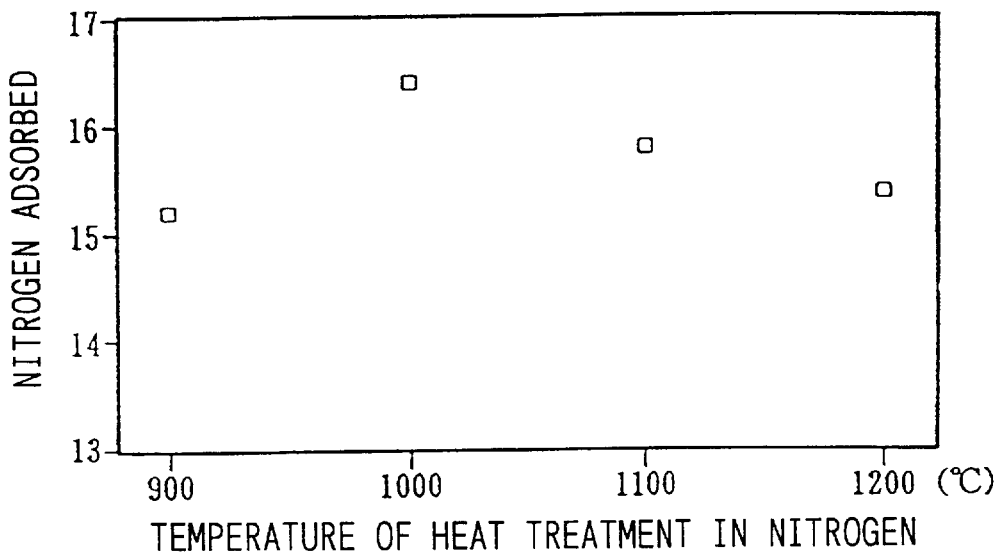
FIG. 12 is a graph which shows the relationship between the amount of nitrogen adsorbed for chlorine treated specimens and the temperature of the high temperature dechlorination treatment according to Example 18.

The relationship between the amount of nitrogen adsorbed for chlorine treated specimens and the temperature of the heat treatment under a flow of nitrogen gas (high temperature dechlorination treatment) for the present Example is shown in FIG. 12.

For Carbonized Charcoal B as well, the heat treatment in nitrogen was effective in a wide range of 900~1200° C., and, in particular, a temperature of 1000° C. was the most suitable.

EXAMPLE 19

B, High Temperature Dechlorination+Low Temperature Dechlorination, Effect of Temperature on Heat Treatment in Nitrogen Eight specimens (each 10 g) of Carbonized Charcoal B taken as starting material were respectively chlorinated (60 minutes) by heating to a temperature of 550° C., and running a gas mixture of 0.1 L/min chlorine in 0.9 L/min nitrogen over them. Next, under a nitrogen gas flow (3 L/min), each of the eight specimens were heat-treated for 30 minutes at a temperature of 600° C. for (1), 700° C. for (2), 800° C. for (3), 900° C. for (4), 1000° C. for (5), 1100° C. for (6), 1200° C. for (7), and 1300° C. for (8). The eight specimens were additionally dechlorinated by heat-treating at a temperature of 600° C. for 30 minutes under a flow of nitrogen gas which had been saturated with steam at 25° C. The weights after the dechlorination treatment decreased respectively by (1): −10.1% by weight; (2): −10.1% by weight; (3): −10.1% by weight; (4): −10.3% by weight; (5): −10.6% by weight; (6): −11.4% by weight; (7): −11.5% by weight, and (8) −11.9% by weight. The amount of nitrogen adsorbed was (1): 13.6 cc/g; (2): 14.2 cc/g; (3): 15.2 cc/g; (4): 15.5 cc/g;

(5): 15.8 cc/g; (6): 15.7 cc/g, (7): 15.2 cc/g, and (8) 14.3 cc/g.

Figure 13:
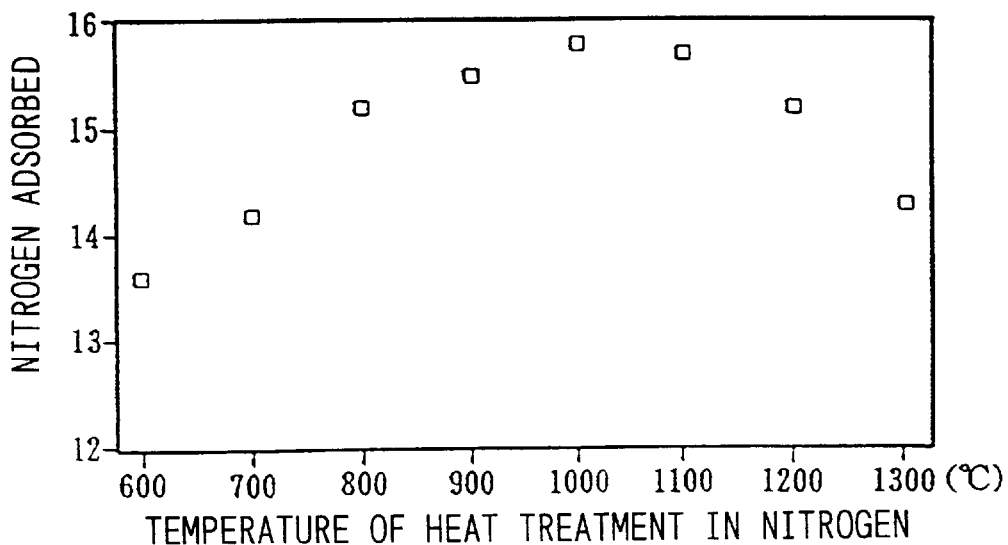
FIG. 13 is a graph which shows the relationship between the amount of nitrogen adsorbed for chlorine treated specimens and the temperature of the high temperature dechlorination treatment according to Example 19.

The relationship between the amount of nitrogen adsorbed for chlorine treated specimens and the temperature of the heat treatment (high temperature dechlorination treatment) in nitrogen for the present Example is shown in FIG. 13.

The heat treatment in nitrogen was effective in the range of 600~1300° C., and, particular, it was found that a temperature in the range of 900~1100° C. was most suitable. In addition, the amount of nitrogen adsorbed was approximately the same as for when the carbonization temperature was 550° C. and the chlorination temperature was 400° C. (Example 18).

EXAMPLE 20

B, High Temperature Dechlorination/Low Temperature Dechlorination, Effect of Temperature on Heat Treatment in Nitrogen and Comparison of Dechlorination by Water and Methane The Carbonized Charcoal B used in the present Example was obtained by carbonization at 600° C. This was chlorinated (60 minutes) by heating to a temperature of 500° C., and running a gas mixture of 0.1 L/min chlorine in 0.9 L/min nitrogen over it. The weight of the chlorinated carbonized charcoal increased approximately 45% by weight (0.152).

The amount of nitrogen adsorbed was (1): 4.5 cc/g. When this specimen was heat-treated (under a nitrogen gas flow, this was the same up to (9) below) at a temperature of 600° C. (specimen (2)), the amount of nitrogen adsorbed was 7.5 cc/g, and the weight increase based on the weight of the carbonized charcoal was 28% by weight (0.095). In addition, when this specimen was heat-treated at a temperature of 700° C. (specimen (3)), the amount of nitrogen adsorbed was 10.0 cc/g, and the weight increase was 14% by weight (0.047).

In addition, when this specimen was heat-treated at a temperature of 800° C. (specimen (4)), the amount of nitrogen adsorbed was 13.3 cc/g, and the weight increase was 6.8% by weight (0.023). In addition, when this specimen was heat-treated at a temperature of 900° C. (specimen (5)), the amount of nitrogen adsorbed was 14.2 cc/g, and the weight increase was 4.0% by weight (0.014). In addition, when this specimen was heat-treated at a temperature of 1000° C. (specimen (6)), the amount of nitrogen adsorbed was 14.6 cc/g, and the weight decreased −4.3% by weight (−0.015). In addition, when this specimen was heat-treated at a temperature of 1100° C. (specimen (7)), the amount of nitrogen adsorbed was 14.5 cc/g. In addition, when this specimen was heat-treated at a temperature of 1200° C. (specimen (8)), the amount of nitrogen adsorbed was 14.1 cc/g. In addition, when this specimen was heat-treated at a temperature of 1300° C. (specimen (9)), the amount of nitrogen adsorbed was 13.3 cc/g High temperature dechlorination is effective in a wide temperature range of 600~1300° C. In particular, in the temperature range of 800~1300° C., high amounts of nitrogen adsorption were obtained.

Next, five specimens which were given the same chlorination and heat treatment as mentioned above (the specimen numbers are the same as for (1) to (5), above) were prepared, then, under a gas flow of nitrogen which had been saturated with steam at 25° C., they were dechlorinated by heat-treating at 500° C. (120 minutes) for (1), and 600° C. (30 minutes) for (2), (3), (4), and (5). The amount of nitrogen adsorbed was (1): 11.0 cc/g; (2):

13.3 cc/g; (3): 14.3 cc/g; (4): 15.2 cc/g; and (5): 15.8 cc/g.

In the same way, five specimens which were given the same chlorination and heat treatments as mentioned above were prepared, then, in methane (0.05 L/min) diluted with nitrogen (0.9 L/min), they were dechlorinated by heat-treating at 600° C. (30 minutes). The amount of nitrogen adsorbed was (1): 12.0 cc/g; (2): 13.6 cc/g; (3): 14.2 cc/g; (4): 15.1 cc/g; and (5):

15.4 cc/g.

The ease of dechlorination by low temperature dechlorination is approximately the same for methane and for steam.

Figure 14:
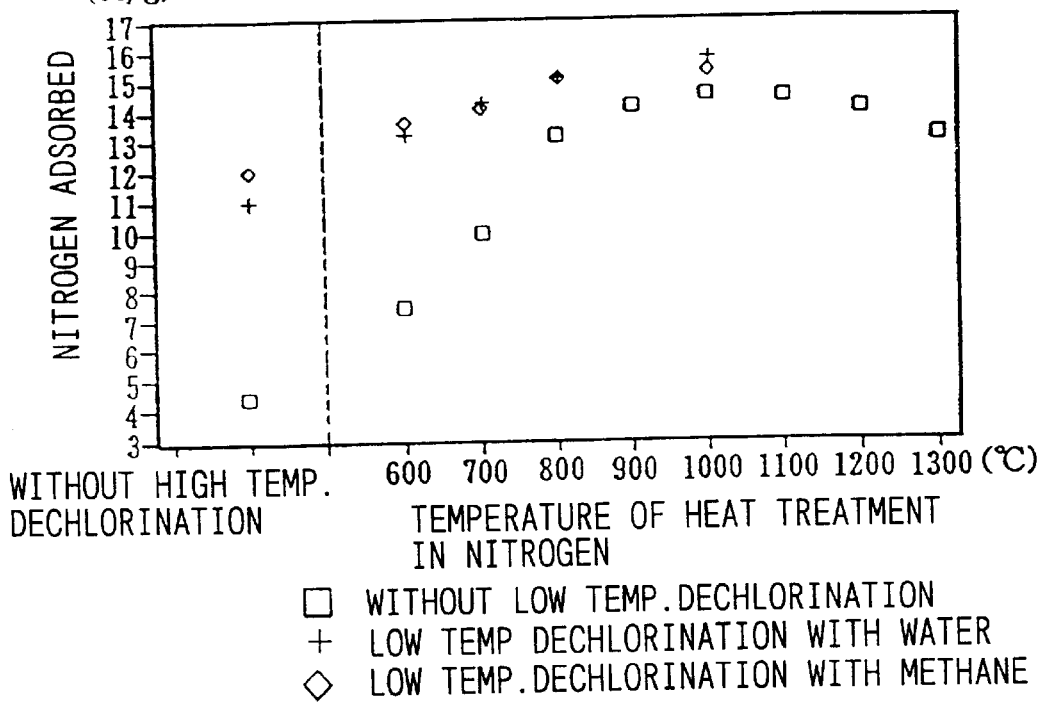
FIG. 14 is a graph which shows the relationship between the amount of nitrogen adsorbed for chlorine treated specimens and the temperature of the high temperature dechlorination treatment according to Example 20.

The relationship between the amount of nitrogen adsorbed for chlorine treated specimens and the temperature of the chlorination treatment (high temperature dechlorination treatment) in nitrogen for the present Example is shown in FIG. 14.

Compared with treatments of high temperature dechlorination treatment alone and treatments of low temperature dechlorination treatment alone, it is apparent that treatments in which low temperature dechlorination takes place after high temperature dechlorination obtain higher amounts of nitrogen adsorption. In addition, it was found that when low temperature dechlorination occurs after a high temperature dechlorination treatment, even if the temperature range for the high temperature dechlorination is from 600° C. to at least 800° C., sufficiently high nitrogen adsorption can be obtained.

EXAMPLE 21

B, Low Temperature Dechlorination, Dechlorination by Means of Steam Only

Carbonized Charcoal B (each 15 g) was chlorinated (120 minutes) by heating to a temperature of 400° C., and running a gas mixture of 0.1 L/min chlorine in 0.9 L/min nitrogen over it. Next, it was dechlorinated by heat-treating at a temperature of 800° C. for 60 minutes under an atmosphere of steam only. The amount of nitrogen adsorbed was 13.0 cc/g.

It was not necessary to dilute the steam with nitrogen.

EXAMPLE 22

B, Low Temperature Dechlorination+High Temperature Dechlorination, Effect of Temperature on Heat Treatment in Nitrogen Five specimens (each 10 g) of Carbonized Charcoal B taken as starting material were respectively chlorinated (60 minutes) by heating to a temperatures of 550° C., and running a gas mixture of 0.1 L/min chlorine in 0.9 L/min nitrogen over them. Next, under a nitrogen gas flow (0.5 L/min) which contained 3 g/min of ion exchanged water, each specimen was dechlorinated by heat-treating for 30 minutes at a temperature of 600° C. Next, under a nitrogen gas flow (3 L/min), each of the five specimens was dechlorinated by heat-treating for 30 minutes at a temperature of 700° C. for (1), 800° C. for (2), 900° C. for (3), 1000° C. for (4), and 1100° C. for (5). The amount of nitrogen adsorbed was (1): 13.0 cc/g; (2): 13.3 cc/g; (3): 13.7 cc/g; (4): 14.0 cc/g, and (5): 13.8 cc/g.

Figure 15:
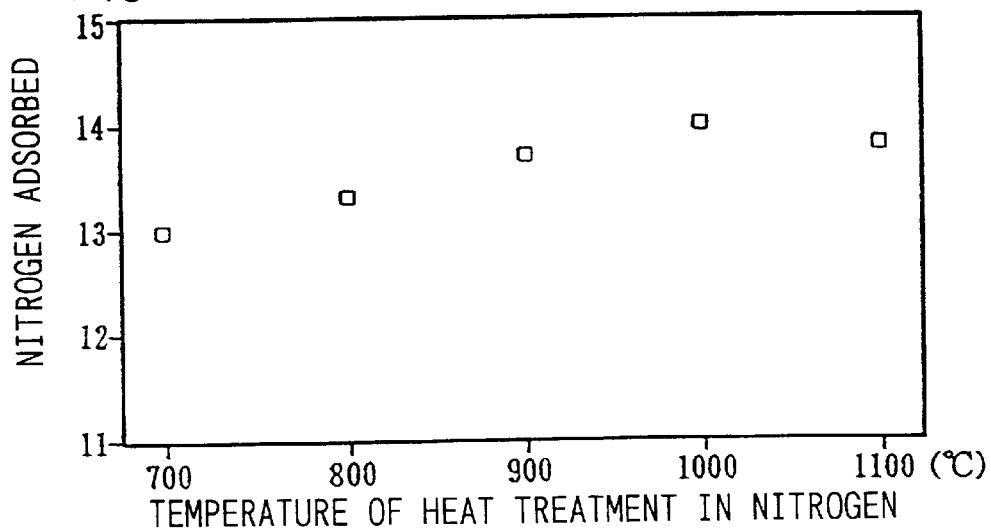
FIG. 15 is a graph which shows the relationship between the amount of nitrogen adsorbed for chlorine treated specimens and the temperature of the high temperature dechlorination treatment according to Example 22.

The relationship between the amount of nitrogen adsorbed by the chlorine treated specimens and the temperature of the heat treatment (high temperature dechlorination treatment) in nitrogen for the present Example is shown in FIG. 15.

It was found that a temperature in the range of 700~1100° C. is effective for the temperature of a heat treatment in nitrogen which follows a low temperature dechlorination treatment,.

EXAMPLE 23

B, High Temperature Dechlorination+Low Temperature Dechlorination+High Temperature Dechlorination The Carbonized Charcoal B used in the present Example was obtained by carbonization at 600° C.

Three specimens (each 15 g) of Carbonized Charcoal B taken as starting material were respectively chlorinated (30 minutes) by heating to a temperature of 500° C., and running a gas mixture of 0.1 L/min chlorine in 0.9 L/min nitrogen over them. Next, under a nitrogen gas flow (3 L/min), each of the three specimens were dechlorinated by heat-treating (high temperature dechlorination treatment) for 10 minutes at a temperature of 600° C. for (1), 700° C. for (2), and 800° C. for (3). The amount of nitrogen adsorbed was (1): 7.5 cc/g; (2): 10.0 cc/g; and (3): 13.3 cc/g. Additionally, under a flow of nitrogen gas which had been saturated with steam at 25° C., each specimen was dechlorinated by heat-treating (low temperature dechlorination treatment) for 15 minutes at a temperature of 600° C. for (1), 700° C. for (2), and 700° C. for (3). The amount of nitrogen adsorbed was (1): 13.6 cc/g; (2): 14.2 cc/g; and (3): 15.2 cc/g. Additionally, under a flow of nitrogen gas, each specimen was dechlorinated by heat-treating (high temperature dechlorination treatment) for 15 minutes at a temperature of 1000° C. The amount of nitrogen adsorbed was (1): 14.9 cc/g; (2): 15.3 cc/g; (3): and 15.6 cc/g.

Figure 16:
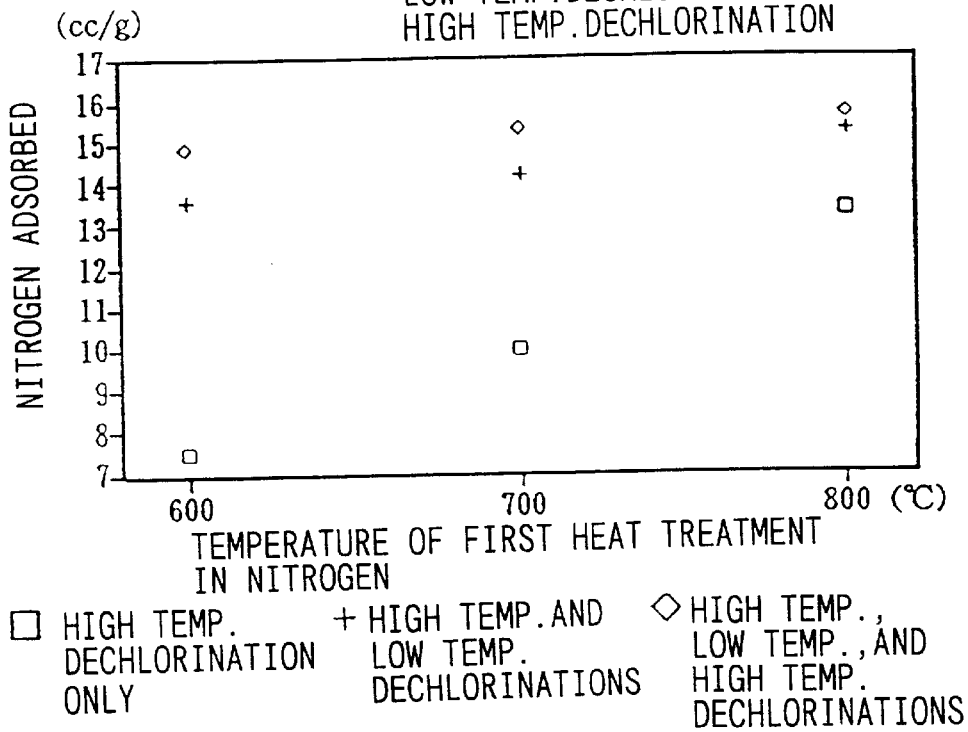
FIG. 16 is a graph which shows the relationship between the amount of nitrogen adsorbed for chlorine treated specimens and the temperature of the initial high temperature dechlorination treatment according to Example 23.

The relationship between the amount of nitrogen adsorbed for chlorine treated specimens and the temperature of the initial heat treatment (high temperature dechlorination treatment) in nitrogen for the present Example is shown in FIG. 16.

The amount of nitrogen adsorbed increases with the degree of dechlorination treatment.

EXAMPLE 24

C, High Temperature Dechlorination+Low Temperature Dechlorination

Two specimens (each 15 g) of Carbonized Charcoal C taken as starting material were respectively chlorinated (60 minutes) by heating to a temperature of 500° C., and running a gas mixture of 0.1 L/min chlorine in 0.9 L/min nitrogen over them. Next, under a nitrogen gas flow (3 L/min), the two specimens were each heat-treated for 20 minutes at a temperature of 800° C. for (1), and 1000° C. for (2). Additionally, under a flow of nitrogen gas which had been saturated with steam at 25° C., the two specimens were each dechlorinated by heat-treating for 30 minutes at a temperature of 700° C. The amount of nitrogen adsorbed was (1): 14.1 cc/g; and (2): 14.8 cc/g.

Figure 17:
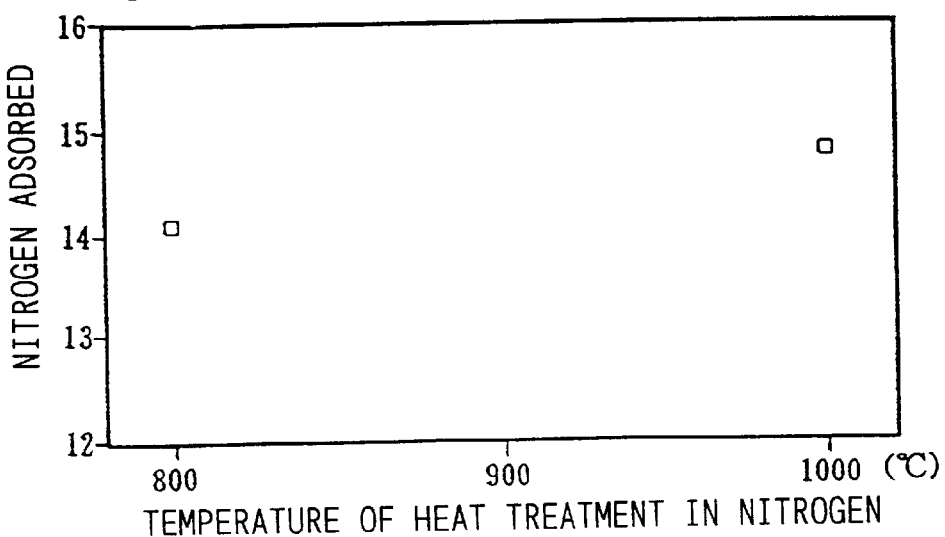
FIG. 17 is a graph which shows the relationship between the amount of nitrogen adsorbed for chlorine treated specimens and the temperature of the high temperature dechlorination treatment according to Example 24.

The relationship between the amount of nitrogen adsorbed by chlorine treated specimens and the temperature of the heat treatment (high temperature dechlorination treatment) in nitrogen for the present Example is shown in FIG. 17.

For furan resin as well, the heat treatment in nitrogen is effective at a temperature range of 800~1000° C.

EXAMPLE 25

B, Comparison of Chlorine Treatment and Activation Treatment, Pore Volume and Specific Surface Area The pore volume and the BET specific surface area of Carbonized Charcoal B (specimen (1)), activation treated Carbonized Charcoal B (specimen (2)), and chlorine treated Carbonized Charcoal B (specimen (3)) were measured. Specimen (2) was obtained by heat-treating Carbonized Charcoal B in nitrogen at a temperature of 900° C., and then activating it in carbon dioxide at a temperature of 900° C. for 20 minutes (activation yield 80%). Specimen (1) manufactured in Example 11 was used as Specimen (3). The pore volume was (1): 0.18 $cm^3$/g, (2): 0.30 $cm^3$/g, and (3): 0.33 $cm^3$/g; the BET specific surface area was (2): 1000 $m^2$/g, and (3): 800 $m^2$/g. In addition, the saturation adsorption amount of benzene at 25° C. was (2): 0.26 g/g, and (3): 0.29 g/g. The amount of nitrogen adsorbed by (2) was 11.5 cc/g.

It was found that, for chlorine treated carbonaceous material, the pore volume is a little larger than that for activation treated carbonaceous material, but the specific surface area is smaller. It was found that chlorine treatment produces the effect of pore formation. In addition, the adsorption amount for benzene, which has a larger molecular diameter than that of nitrogen, was approximately the same value.

TABLE 4

List of the Amounts of Nitrogen Adsorbed for the Examples (Part 1)

| | A | B | C | D | E | F | G | H | J |
|---|---|---|---|---|---|---|---|---|---|
| Example 1 | high temperature | (1) | A | 500 | 1000 | | | | 12.6 |
| | | (2) | B | 500 | 1000 | | | | 13.9 |
| Example 2 | high temperature | (1) | B | 550 | 1000 | | | vacuum | 13.8 |
| Example 3 | high temperature | (1) | B | 550 | 700 | | | 10 g | 12.8 |
| | | (2) | B | 550 | 900 | | | 10 g | 14.4 |
| | | (3) | B | 550 | 700 | | | 25 g | 12.6 |
| | | (4) | B | 550 | 900 | | | 25 g | 14.1 |
| Example 4 | low temperature | (1) | A | 500 | | 700 | water | | 12.9 |
| | | (2) | B | 500 | | 700 | water | | 14.4 |
| Example 5 | high/low temperature | (1) | A | 350 | 1000 | 700 | water | | 13.3 |
| | | (2) | A | 400 | 1000 | 700 | water | | 14.6 |
| | | (3) | A | 450 | 1000 | 700 | water | | 14.1 |
| | | (4) | A | 500 | 1000 | 700 | water | | 14.2 |
| | | (5) | A | 550 | 1000 | 700 | water | | 14.0 |
| | | (6) | A | 600 | 1000 | 700 | water | | 13.9 |
| | | (7) | A | 700 | 1000 | 700 | water | | 13.2 |
| Example 6 | high/low temperature | (1) | A | 500 | 1000 | 700 | water | 15 min | 13.5 |
| | | (2) | A | 500 | 1000 | 700 | water | 30 min | 14.2 |
| | | (3) | A | 500 | 1000 | 700 | water | 60 min | 14.1 |
| | | (4) | A | 500 | 1000 | 700 | water | 120 min | 14.1 |
| Example 7 | high/low temperature | (1) | A | 500 | 1000 | 700 | water | 10% | 14.3 |
| | | (2) | A | 500 | 1000 | 700 | water | 15% | 14.4 |
| | | (3) | A | 500 | 1000 | 700 | water | 20% | 14.2 |
| Example 8 | high/low temperature | (1) | A | 500 | 800 | 700 | water | | 12.8 |
| | | (2) | A | 500 | 900 | 700 | water | | 13.8 |
| | | (3) | A | 500 | 950 | 700 | water | | 14.1 |
| | | (4) | A | 500 | 1000 | 700 | water | | 14.3 |
| | | (5) | A | 500 | 1050 | 700 | water | | 14.2 |
| | | (6) | A | 500 | 1075 | 700 | water | | 14.2 |
| | | (7) | A | 500 | 1100 | 700 | water | | 14.0 |
| | | (8) | A | 500 | 1200 | 700 | water | | 13.3 |

TABLE 4-continued

List of the Amounts of Nitrogen Adsorbed for the Examples
(Part 1)

| | A | B | C | D | E | F | G | H | J |
|---|---|---|---|---|---|---|---|---|---|
| Example 9 | high/low temperature | (1) | A | 500 | 1000 | 650 | water | | 13.8 |
| | | (2) | A | 500 | 1000 | 700 | water | | 14.2 |
| | | (3) | A | 500 | 1000 | 750 | water | | 13.1 |
| Example 10 | low/high temperature | (1) | B | 550 | 900 | 700 | water | 10 g | 16.1 |
| | | (2) | B | 550 | 900 | 700 | water | 25 g | 15.1 |
| Example 11 | high/low temperature | (1) | B | 500 | 1000 | 700 | water | | 16.0 |
| | | (2) | C | 500 | 1000 | 700 | water | | 14.8 |
| Example 12 | high/low temperature | (1) | A | 500 | 1000 | 700 | LPG | | 13.5 |
| | | (2) | B | 500 | 1000 | 700 | LPG | | 15.5 |
| Example 13 | high temperature | (1) | B | 500 | 1000 | | | | 15.9 |
| | high/low temperature | (2) | B | 500 | 1000 | 700 | water | | 15.9 |
| | high/low temperature | (3) | B | 500 | 1000 | 700 | methane | | 16.5 |
| Example 14 | high/low temperature | (1) | B | 500 | 1000 | 600 | methane | | 15.9 |
| | | (2) | B | 500 | 1000 | 650 | methane | | 15.9 |
| | | (3) | B | 500 | 1000 | 700 | methane | | 16.2 |
| | | (4) | B | 500 | 1000 | 750 | methane | | 15.7 |
| Example 15 | low temperature | (1) | B | 700 | | 700 | water | | 13.1 |
| | | (2) | B | 900 | | 700 | water | | 13.2 |
| | | (3) | B | 1000 | | 700 | water | | 13.1 |

TABLE 5

List of the Amounts of Nitrogen Adsorbed for the Examples
(Part 2)

| | A | B | C | D | E | F | G | H | J |
|---|---|---|---|---|---|---|---|---|---|
| Example 16 | low temperature | (1) | B | 500 | | 600 | water | | 12.5 |
| | | (2) | B | 500 | | 700 | water | | 12.5 |
| | | (3) | B | 500 | | 800 | water | | 12.8 |
| | | (4) | B | 500 | | 900 | water | | 10.5 |
| Example 17 | high/low temperature | (1) | B | 350 | 1000 | 700 | water | | 16.4 |
| | | (2) | B | 400 | 1000 | 700 | water | | 15.2 |
| | | (3) | B | 450 | 1000 | 700 | water | | 15.9 |
| | | (4) | B | 500 | 1000 | 700 | water | | 15.8 |
| | | (5) | B | 550 | 1000 | 700 | water | | 15.8 |
| Example 18 | high/low temperature | (1) | B | 400 | 900 | 700 | water | | 15.2 |
| | | (2) | B | 400 | 1000 | 700 | water | | 16.4 |
| | | (3) | B | 400 | 1100 | 700 | water | | 15.8 |
| | | (4) | B | 400 | 1200 | 700 | water | | 15.4 |
| Example 19 | high/low temperature | (1) | B | 550 | 600 | 600 | water | | 13.6 |
| | | (2) | B | 550 | 700 | 600 | water | | 14.2 |
| | | (3) | B | 550 | 800 | 600 | water | | 15.2 |
| | | (4) | B | 550 | 900 | 600 | water | | 15.5 |
| | | (5) | B | 550 | 1000 | 600 | water | | 15.8 |
| | | (6) | B | 550 | 1100 | 600 | water | | 15.7 |
| | | (7) | B | 550 | 1200 | 600 | water | | 15.2 |
| | | (8) | B | 550 | 1300 | 600 | water | | 14.3 |
| Example 20 | high temperature | (1) | B | 500 | | | | | 4.5 |
| | | (2) | B | 500 | 600 | | | | 7.5 |
| | | (3) | B | 500 | 700 | | | | 10.0 |
| | | (4) | B | 500 | 800 | | | | 13.3 |
| | | (5) | B | 500 | 900 | | | | 14.2 |
| | | (6) | B | 500 | 1000 | | | | 14.6 |
| | | (7) | B | 500 | 1100 | | | | 14.5 |
| | | (8) | B | 500 | 1200 | | | | 14.1 |
| | | (9) | B | 500 | 1300 | | | | 13.3 |
| | high/low temperature | (1) | B | 500 | | 500 | water | | 11.0 |
| | | (2) | B | 500 | 600 | 600 | water | | 13.3 |
| | | (3) | B | 500 | 700 | 600 | water | | 14.3 |
| | | (4) | B | 500 | 800 | 600 | water | | 15.2 |
| | | (5) | B | 500 | 1000 | 600 | water | | 15.8 |
| | high/low temperature | (1) | B | 500 | | 600 | methane | | 12.0 |
| | | (2) | B | 500 | 600 | 600 | methane | | 13.6 |
| | | (3) | B | 500 | 700 | 600 | methane | | 14.2 |
| | | (4) | B | 500 | 800 | 600 | methane | | 15.1 |
| | | (5) | B | 500 | 1000 | 600 | methane | | 15.4 |
| Example 21 | low temperature | (1) | B | 400 | | 800 | water | | 13.0 |
| Example 22 | low/high temperature | (1) | B | 550 | 700 | 600 | water | | 13.0 |
| | | (2) | B | 550 | 800 | 600 | water | | 13.3 |
| | | (3) | B | 550 | 900 | 600 | water | | 13.7 |

TABLE 5-continued

List of the Amounts of Nitrogen Adsorbed for the Examples
(Part 2)

| A | B | C | D | E | F | G | H | J |
|---|---|---|---|---|---|---|---|---|
| | | (4) | B | 550 | 1000 | 600 | water | | 14.0 |
| | | (5) | B | 550 | 1100 | 600 | water | | 13.8 |
| Example 23 | high/low/high temperature | (1) | B | 500 | 600 | 600 | water | 1000° C. | 14.9 |
| | | (2) | B | 500 | 700 | 700 | water | 1000° C. | 15.3 |
| | | (3) | B | 500 | 800 | 700 | water | 1000° C. | 15.6 |
| Example 24 | high/low temperature | (1) | C | 500 | 800 | 700 | water | | 14.1 |
| | | (2) | C | 500 | 1000 | 700 | water | | 14.8 |

TABLE 6

List of the Amounts of Nitrogen Adsorbed for the Examples
(Part 3)

| A | B | C | D | E | F | G | H | J |
|---|---|---|---|---|---|---|---|---|
| Comparative Example 1 | (1) | G2-X | | | | | | 9.3 |
| | (2) | 4GA | | | | | | 10.0 |
| | (3) | G15L | | | | | | 8.5 |
| | (4) | A | | 800 | | | | 7.8 |
| | (5) | B | | | | | | 4.8 |
| | (6) | B | | 700 | | | | 10.4 |
| | (7) | B | | 900 | | | | 11.9 |
| | (8) | C | | 800 | | | | 9.9 |
| | (9) | C | | 1000 | | | | 10.6 |
| Comparative Example 2 | (1) | A | (500) | 1000 | (700) | | | 9.1 |
| | (2) | A | | 900 | | | HCl | 9.5 |
| | (3) | A | (1000) | | | | HCl | 10.4 |
| Example 25 | (2) | B | | 900 | | | 900° C. | 11.5 |

Note: Example 25 is carbon dioxide activation

The items for each example are as follows in Tables 4~6

| A | Example Number | Treatment Method for Dechlorination |
|---|---|---|
| | high temperature: | high temperature dechlorination |
| | low temperature: | low temperature dechlorination |
| | high/low temperature: | high temperature dechlorination followed by low temperature dechlorination |
| | low/high temperature: | low temperature dechlorination followed by high temperature dechlorination |
| | high/low/high temperature: | high temperature dechlorination, followed by low temperature dechlorination, followed by high temperature dechlorination |
| B | Specimen Number | |
| C | Type of carbonized charcoal | |
| D | Temperature of Chlorination Treatment (° C.) | |
| E | Temperature of Heat Treatment Under Nitrogen (° C.) | |
| F | Temperature of Heat Treatment Under Hydrogen Containing Compound (° C.) | |
| G | Type of Hydrogen Containing Compound | |
| H | Other Parameters | |
| J | Quantity of Nitrogen Adsorbed (cc/g) | |

Measurement of Electrostatic Capacity

Figure 18:
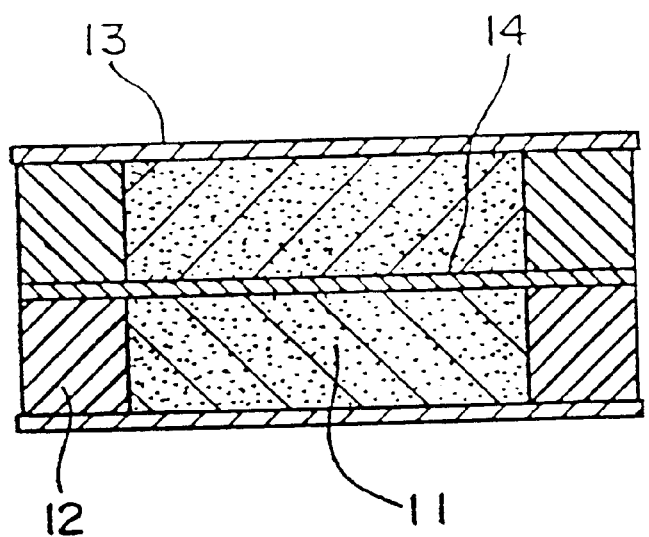
FIG. 18 is a cross sectional outline diagram of a capacitance measurement cell made according to an Example of the present invention.

An electrostatic capacity measuring cell as shown in FIG. 18 was manufactured by preparing two rods (25ø×2t mm) made from vinyl chloride resin and inserting a paste of carbonaceous material (carbon crushed to several Rm, to which 30% sulfuric acid aqueous solution has been added) into them, these were placed on opposite sides sandwiching a polypropylene separator, and both sides were held between platinum collecting electrodes. In FIG. 18, number 11 is a carbon electrode, number 12 is a gasket, number 13 is a collecting electrode and number 14 is a separator. After charging, the cell is discharged at a fixed electric flow I, the time $\Delta t$ over which the voltage decreases from voltage V1 to V2 is measured and the electrostatic capacity is calculated by means of the following equation $$C = I \times \Delta t / (V_1 V_2)$$

In the present measurement, after charging at 900 mV for 24 hours, it was discharged at a fixed electric flow (I=4 mA/cm$^2$), and the time for the voltage to decrease from $V_1$=540 mV to $V_2$=360 mV was measured and the electrostatic capacity calculated.

COMPARATIVE EXAMPLE 3

Carbon Dioxide Activation

Carbonized Charcoal B was heat-treated (15 minutes) at a temperature of 900° C., and then carbon dioxide activated (under a carbon dioxide atmosphere) at a temperature of 900° C. Four types of specimens were made with activation times of (1): 110 minutes (activation yield: 81.0%); (2): 190 minutes (activation yield: 69.6%); (3): 300 minutes (activation yield: 57.5%); and (4): 345 minutes (activation yield: 50.9%) (activation yield=the weight of the carbonized charcoal after activation/the weight of the carbonized charcoal before activation). The specific surface area of the four types of specimens were (1): 990 $m^2/g$; (2): 1370 $m^2/g$, (3): 1750 $m^2/g$; and (4): 1920 $m^2/g$, in addition, the pore volume was (1): 0.33 $cm^3/g$; (2): 0.45 $cm^3/g$; (3): 0.60 $cm^3/g$; and (4): 0.70 $cm^3/g$. These were crushed to several microns, made into paste by the addition of 30% sulfuric acid aqueous solution, and left for two weeks. The electrostatic capacity was (1): 49.6 $F/cm^3$, (2): 51.4 $F/cm^3$, (3): 45.7 $F/cm^3$; and (4): 45.7 $F/cm^3$. Here, F represents Farads, and $cm^3$ the volume (the total of the positive electrode and the negative electrode) of the carbon electrode 11.

The lower the activation yield, the higher the specific surface area and the pore volume, but the lower the electrostatic capacity. The electrostatic capacity was at its greatest at 51.4 $F/cM^3$.

COMPARATIVE EXAMPLE 4

Steam Activation

Carbonized Charcoal B was heat-treated (15 minutes) at a temperature of 900° C., and then steam activated at a temperature of 800° C. The steam activation was conducted by means of a 6.5 L/min current saturated with steam at 800° C. Three types of specimens were made with activation times of (1): 60 minutes (activation yield: 77.0%); (2): 90 minutes (activation yield 68.6%); and (3): 143 minutes (activation yield 55.1%). The specific surface area of the three types of specimens were (1): 1120 $m^2/g$; (2): 1380 $m^2/g$, and (3): 1810 $m^2/g$; in addition, the pore volume was (1): 0.35 $cm^3/g$; (2): 0.43 $cm^3/g$; and (3): 0.58 $cm^3/g$. These were each crushed to several microns, made into paste by the addition of 30% sulfuric acid aqueous solution, and left for two weeks. The electrostatic capacity was (1): 37.8 $F/cm^3$, (2): 34.6 $F/cm^3$, and (3): 33.6 $F/cm^3$.

The lower the activation yield, the higher the specific surface area and the pore volume, but the lower the electrostatic capacity. The electrostatic capacity was at its greatest at 37.8 $F/cm^3$.

EXAMPLE 26

B, Effect of Temperature on Chlorination

The Carbonized Charcoal B used in the present Example was obtained by carbonization at 600° C.

Three specimens (each 15 g) of Carbonized Charcoal B taken as starting material were respectively chlorinated (120 minutes) by heating to a temperature of 550° C. for (1), 600° C. for (2), and 650° C. for (3); and running a gas mixture of 0.1 L/min chlorine in 1.0 L/min nitrogen over them. Next, each of the three specimens were dechlorinated by heat-treating for 15 minutes at a temperature of 750° C. under a nitrogen gas flow (3 L/min), then, additionally, heat-treating for 15 minutes at a temperature of 700° C. under a flow of nitrogen gas (0.5 L/min, steam concentration was approximately 85% by volume) which contained 3 g/min of ion exchanged water. The weights of the chlorinated carbonized charcoal had respectively increased in weight by (1): 25.0% by weight (0.084); (2): 18.5% by weight (0.062); and (3): 12.0% by weight (0.041). The weights after the dechlorination treatment in nitrogen gas had respectively increased in weight by (1): 4.6% by weight (0.016); (2): 4.3% by weight (0.015); and (3): 2.8% by weight (0.009). The electrostatic capacity was (1): 79.0 $F/cm^3$, (2): 74.5 $F/cm^3$, and (3): 75.4 $F/cm^3$.

The electrostatic capacity of the chlorine treated carbonaceous material was 25~30 $F/cm^3$ (a 50~60% increase) greater than that for the carbon dioxide activation treated carbonaceous material. The temperature for chlorination was effective in a wide range of 550~650° C.

EXAMPLE 27

B, Effect of Temperature on Heat treatment in Nitrogen

The Carbonized Charcoal B used in the present Example was obtained by carbonization at 600° C.

Five specimens (each 15 g) of Carbonized Charcoal B taken as starting material were respectively chlorinated (120 minutes) by heating to a temperature of 550° C., and running a gas mixture of 0.1 L/min chlorine in 1.0 L/min nitrogen over them. Next, under a nitrogen gas flow (3 L/min), each of the five specimens were heat-treated for 15 minutes at a temperature of 650° C. for (1), 700° C. for (2), 750° C. for (3), 800° C. for (4), and 850° C. for (5). Additionally, under a flow of nitrogen gas (0.5 L/min) which contained 3 g/min of ion exchanged water, they were dechlorinated by heat-treating at a temperature of 700° C. for 15 minutes. The specific surface area of the five types of specimens were (1): 780 $m^2/g$, (2): 790 $m^2/g$, (3): 790 $m^2/g$, (4): 830 $m^2/g$, and (5): 860 $m^2/g$; in addition, the pore volume was (1): 0.31 $cm^3/g$, (2): 0.32 $cm^3/g$, (3): 0.33 $cm^3/g$, (4): 0.33 $cm^3/g$, and (5): 0.33 $cm^3/g$. The electrostatic capacity was (1): 80.5 $F/cm^3$, (2): 79.0 $F/cm^3$, (3): 78.5 $F/cm^3$, (4): 76.5. $F/cm^3$, and (5): 75.0 $F/cm^3$.

The electrostatic capacity of the chlorine treated carbonaceous material was 25~30 $F/cm^3$ (50~60% increase) greater than that for the carbon dioxide activation treated carbonaceous material. A temperature in a wide range of 650~850° C. was effective for the heat treatment in nitrogen.

The results for Comparative Example 3, Comparative Example 4, Example 26, and Example 27 are shown in Table 7.

TABLE 7

Measurement Results of Electrostatic Capacity

|  |  | Specific Surface Area ($m^2/g$) | Pore Volume ($cm^3/g$) | Electrostatic Capacity ($F/cm^3$) |
|---|---|---|---|---|
| Comparative Example 3 | (1) | 990 | 0.33 | 49.6 |
|  | (2) | 1370 | 0.45 | 51.4 |
|  | (3) | 1750 | 0.60 | 45.7 |
|  | (4) | 1920 | 0.70 | 45.7 |
| Comparative Example 4 | (1) | 1120 | 0.35 | 37.8 |
|  | (2) | 1380 | 0.43 | 34.6 |
|  | (3) | 1810 | 0.58 | 33.6 |
| Example 26 | (1) |  |  | 79.0 |
|  | (2) |  |  | 74.5 |
|  | (3) |  |  | 75.4 |

TABLE 7-continued

Measurement Results of Electrostatic Capacity

|  |  | Specific Surface Area (m²/g) | Pore Volume (cm³/g) | Electrostatic Capacity (F/cm³) |
|---|---|---|---|---|
| Example 27 | (1) | 780 | 0.31 | 80.5 |
|  | (2) | 790 | 0.32 | 79.0 |
|  | (3) | 790 | 0.33 | 78.5 |
|  | (4) | 830 | 0.33 | 76.5 |
|  | (5) | 860 | 0.33 | 75.0 |

EXAMPLE 28

B, X-ray photoelectron spectroscopy

The Carbonized Charcoal B used in the present Example was obtained by carbonization at 800° C. A part of the carbonized charcoal starting material was made specimen (1). Carbonized Charcoal B (30 g) was chlorinated (120 minutes) by heating to a temperature of 550° C., and running a gas mixture of 0.5 L/min chlorine in 2.0 L/min nitrogen over it. The chlorinated carbonized charcoal obtained was divided into three pieces, two of these were made specimen (2) and specimen (3) (specimen (2) and specimen (3) were the same). The remaining chlorinated carbonized charcoal was dechlorinated by heat-treating at a temperature of 1000° C. for 30 minutes under a nitrogen gas flow (3 L/min). The obtained carbonaceous material (partially dechlorinated) was divided into two pieces, and one made specimen (4). The remaining carbonaceous material was dechlorinated by heat-treating at a temperature of 700° C. for 30 minutes under a nitrogen gas flow (3 L/min) which had been saturated with steam at 25° C. The obtained carbonaceous material (almost completely dechlorinated) was made specimen (5). When the weight of the chlorinated carbonized charcoal was measured, there had been a weight increase of 24.6% by weight (0.083) based on the weight before the chlorination treatment. For the weight after the dechlorination treatment in nitrogen, there was a weight increase of 2.6% by weight (0.009) based on the weight before the chlorination treatment. For the weight after the dechlorination treatment in steam, there was a weight decrease of −4.6% by weight based on the weight before the chlorination treatment. X-ray photoelectron spectroscopy (Model–500 manufactured by ULVAC PHI Company) for the five specimens was conducted, and the association energy of carbon (C), chlorine (Cl), and oxygen (O), and the ratio of elements were measured. Elements other than those three mentioned above, for example, hydrogen, were ignored. The specimens used for measurement were made by crushing with a mortar, and then thinly adhering them to adhesive tape. Under a vacuum of $10^{-8}$ mmHg, for the first 3 minutes, analysis of all elements was conducted by means of a wide scan (0~1100 eV), and then, for a period of 30 minutes, peak estimation (narrow scan) for each element was conducted. The X-ray source used the Kα line of Mg (hv=1253 eV). The measurement results are shown in Table 8. In Table 8, the unit for association energy is (eV), and the unit for element composition is the atomic fraction (atom%). In addition, the subscripts to the bottom right in $C_{1S}$, $O_{1S}$ and $Cl_{2P}$ show the quantum number of orbital angular momentum and the main quantum numbers for the electrons.

TABLE 8

Results of X-ray photoelectron spectroscopy

| Specimen | $C_{1S}$ (eV) | (atom %) | $O_{1S}$ (eV) | (atom %) | $Cl_{2P}$ (eV) | (atom %) |
|---|---|---|---|---|---|---|
| (1) | 284.2 | 92.88 | 532.3 | 7.05 |  | 0.07 |
| (2) | 284.3 | 86.50 | 532.3 | 7.43 | 200.0 | 6.07 |
| (3) | 284.2 | 87.68 | 532.3 | 5.19 | 199.9 | 7.12 |
| (4) | 284.3 | 91.43 | 532.2 | 7.06 | 200.0 | 1.51 |
| (5) | 284.3 | 92.63 | 532.4 | 7.36 |  | 0.02 |

For all of the specimens, the tops of the peaks for the $C_{1S}$ spectrum was 284.2~284.3 eV, and this was in agreement with the $C_1S$ association energy for graphite carbon. When waveform separation for the $C_{1S}$ spectrum of specimen (5) was conducted, unorganized carbon (carbon other than graphite carbon) was approximately 30%, and carbon of the polyaromatic ring structures was approximately 70%. The results are shown in Table 9.

TABLE 9

Waveform Separation of the $C_{1S}$ spectrum for specimen (5)

| (eV) | Atomic Fraction (atom %) |
|---|---|
| 288.50 | 6.31 |
| 285.94 | 24.02 |
| 284.31 | 69.67 |

Specimens were made using a heating temperature in the nitrogen gas flow of 800° C. for specimen (6), and 1200° C. for specimen (7), the other conditions being the same as those above; when X-ray photoelectron spectroscopy was conducted, carbon of the polyaromatic ring structures was approximately 67.9% for specimen (6) and approximately 72.4% for specimen (7).

The atomic ratio of oxygen to carbon and the atomic ratio of carbon to chloride were calculated from the element composition of Table 8, and the results are shown in Table 10. In Table 10, the atomic ratio of chlorine to carbon calculated from weight variation are also shown combined.

TABLE 10

The Atomic Ratio of Oxygen to Carbon, and the Atomic Ratio of Chlorine to Carbon

| Specimen | O/C | Cl/C | Cl/C* |
|---|---|---|---|
| (1) | 0.076 | NA** |  |
| (2) | 0.086 | 0.070 | 0.083 |
| (3) | 0.059 | 0.081 |  |
| (4) | 0.077 | 0.017 | 0.009 |
| (5) | 0.079 | NA |  |

*Atomic ratio of chlorine to carbon calculated from weight variation
**Below detectable limits The atomic ratio of oxygen to carbon was approximately the same value as the literature value for activated carbon, O/C=0.06~0.09 (Kitagawa et al. "Activated Carbon Industry" pages 53 and 58, Jukagaku Kogyo Tsushin Company (1975). The atomic ratio of chlorine to carbon for specimen (2) is in approximate agreement with the value calculated from the X-ray photoelectron spectroscopy value and the weight variation. The reason the atomic ratio of chlorine to carbon for specimen (4) is not in agreement, is considered to be due to the loss of carbon or volatile components. It is apparent that the chlorine which reacted with the unorganized carbon was approximately 80% dechlorinated by means of the heat treatment in nitrogen, and the approximately 20% remaining was dechlorinated by means of the heat treatment in steam. From the results of the above Examples, it was observed that even though dechlorination was not complete the effects of the present invention can be obtained.

EXAMPLE 29

Weight Variation when Dechlorination is conducted in Water and Methane

Two specimens (each 15 g) of Carbonized Charcoal B taken as starting material were each chlorinated (60 minutes) by heating to a temperature of 500° C., and running a gas mixture of 0.1 L/min chlorine in 0.9 L/min nitrogen over them. Next, under a nitrogen gas flow (3 L/min), the two specimens were dechlorinated by heat-treating at a temperature of 800° C. for 30 minutes. Based on the weight (100%) at this time, they were dechlorinated in a gas of a hydrogen containing compound and rechlorinated repeatedly three and a half times, and the respective weight variation measured. Specimen (1) was dechlorinated by heat-treating at a temperature of 700° C. for 30 minutes under a flow of nitrogen gas (3 L/min) which had been saturated with steam at 25° C., and specimen (2) was dechlorinated by heat-treating at a temperature of 700° C. for 30 minutes under methane (0.05 L/min) which had been diluted with nitrogen (0.9 L/min). Rechlorination was conducted under the same conditions as the first chlorination.

The weight variations for the two specimens were (1): 100% →88.7% (dechlorination)→99.1% (chlorinating)→85.3% (dechlorination)→95.5% (chlorination)→80.8% (dechlorination)→91.9% (chlorination)→77.5% (dechlorination); and (2): 100% →93.7% (dechlorination)→102.7% (chlorination)→98.1% (dechlorination)→102.1% (chlorination)→98.3% (dechlorination)→101.5% (chlorination)→98.9% (dechlorination).

For specimen (2) which was dechlorinated in methane, the weight after dechlorination was approximately fixed even though chlorination and dechlorination were repeated three and a half times; however, for specimen (1) which was dechlorinated in steam, the weight after dechlorination every time a dechlorination and a rechlorination took place decreased on average 14.2%. In addition, the weight of a specimen after rechlorination increased by an average of 10.5% in comparison with the weight of a specimen immediately after dechlorination treatment. It was found that the weight decrease after dechlorination corresponds to the weight decrease due to the gasification of only those carbon atoms which are bonded to chlorine atoms (—C—C—Cl→—C—H)(10.5×(1~35.5-12)/(35.5-1)=−14.2).

EXAMPLE 30

Bromine Treatment, Quantity of Nitrogen Adsorbed

Carbonized Charcoal B was further carbonized at 600° C. for 30 minutes. Under a gas flow of nitrogen gas which contained 8% by weight bromine (1 L/min), three specimens (each 15 g) were bromination treated and made into brominated carbonized charcoal by heating at 500° C. for 3 hours for specimen (1), 600° C. for 2 hours for specimen (2), and 700° C. for 1 hour for specimen (3). Next, the brominated carbonized charcoal was debromination treated by heating at 1000° C. for 30 minutes under a nitrogen gas flow (3 L/min). In addition, this debromination treated carbon was debromination treated by heating for 15 minutes at 700° C. under a nitrogen gas flow (1 L/min) which contained 3 g/min of steam.

In the bromination treatment, the amount of bromine reacted for carbonized charcoal was (1): 61.7% by weight (0.093), (2): 20.0% by weight (0.030), and (3): 8.5% by weight (0.013). Here, the amount of bromine reacted was expressed by taking the weight increase in the bromination treatment as the amount of bromine reacted, the weight be fore the bromination treatment as the amount of carbon, and dividing the bromine weight by the carbon weigh t (% by weight). The numerical values inside the parentheses are the values converted into the bromine/carbon atomic ratio (Br/C).

When the amount of nitrogen adsorbed by the above-mentioned bromine treated carbon was measured at 25° C. and 1 atm, (1) was 18.0 cc/g, (2) was 16.6 cc/g, and (3) was 15.0 cc/g.

In addition, the specific surface area of specimen (1) was 800 m$^2$/g, and the pore volume was 0.31 cm$^3$/g; and the specific surface area for specimen (2) was 670 m$^2$/g, and the pore volume was 0.27 cm$^3$/g.

EXAMPLE 31

Bromine Treatment, Electrostatic Capacity

Carbonized Charcoal B was further carbonized at 600° C. for 30 minutes. Under a gas flow of nitrogen which contained 8% by weight bromine (1 L/min), 15 g of this carbonized charcoal were bromination treated and made into brominated carbonized charcoal by heating at 500° C. for 30 minutes. Next, the brominated carbonized charcoal was debromination treated by heating at 800° C. for 15 minutes under a nitrogen gas flow (3 L/min). In addition, this debromination treated carbon was debromination treated by heating for 15 minutes at 700° C. under a gas flow (1 L/min) of nitrogen which had been saturated with steam at 25° C.

The electrostatic capacity of the above-mentioned bromine treated carbon was 77.5 F/CM$^3$.

EXAMPLE 32

Carbon Dioxide Adsorption

Carbonized charcoal was obtained by finely crushing Philippine coconut shell char, forming it into 2 mm×5~6 mm pellets using coal tar as a binder, and subjecting it to carbonization at 600° C. under a nitrogen gas flow. This carbonized charcoal (15 g) was chlorinated (60 minutes) by heating to a temperature of 550° C., and running a gas mixture of 0.1 L/min chlorine in 0.9 L/min nitrogen over it. Then it was dechlorinated by heating for 60 minutes at a temperature of 1000° C. under a nitrogen gas flow (3 L/min). Additionally, it was dechlorinated by heating for 30 minutes at a temperature of 700° C. under a flow of nitrogen gas which had been saturated with steam at 25° C. When the amount of carbon dioxide adsorbed by this chlorine treated carbon was measured at 25° C. and 1 atm, it was 80.1 cc/g.

Phenol resin (PGA–4560, product name: Resitop, manufactured by Gun-ei Chemical Industry (Ltd)) was hardened at 160° C., finely crushed, then made into pellets of 2 mm×5~6 mm using Resitop as a binder, carbonized at 600° C. under a nitrogen gas flow. and thereby carbonized charcoal obtained. This carbonized charcoal (15 g) was chlorinated (60 minutes) by heating to a temperature of 500° C., and running a gas mixture of 0.1 L/min chlorine in 0.9 L/min nitrogen over it. Then it was dechlorinated by heating for 60 minutes at a temperature of 1000° C. under a nitrogen gas flow (3 L/min). Additionally, it was dechlorinated by heating for 30 minutes at a temperature of 700° C. under a flow of nitrogen gas which had been saturated with steam at 25° C. When the amount of carbon dioxide adsorbed by this chlorine treated carbon was measured at 25° C. and 1 atm, it was 87.0 cc/g.

For the purpose of comparison, when the amount of carbon dioxide adsorbed by a commercially available activated carbon (Granular Shirasagi manufactured by Takeda Chemical Industries (Ltd)) was measured at a temperature of 25° C. and 1 atm, it was 50.2 cc/ g. In other words, the a mount of carbon dioxide adsorbed by the carbonaceous material of the present invention was about 60~73% greater with regard to commercially available products.

EXAMPLE 33

Methane Adsorption

Philippine coconut shell char was finely crushed, formed into 2 mm×5~6 mm pellets using coal tar as a binder, carbonized at 600° C. under a nitrogen gas flow, and thereby carbonized charcoal obtained. This carbonized charcoal (15 g) was chlorinated (60 minutes) by heating to a temperature of 550° C., and running a gas mixture of 0.1 L/min chlorine in 0.9 L/min nitrogen over it. Then it was dechlorinated by heating for 60 minutes at a temperature of 1000° C. under a nitrogen gas flow (3 L/min). Additionally, it was dechlorinated by heating for 30 minutes at a temperature of 700° C. under a flow of nitrogen gas which had been saturated with steam at 25° C. When the amount of methane adsorbed by this chlorine treated carbon was measured at 25° C. and 1 atm, it was 30.9 cc/g.

For the purpose of comparison, when the amount of methane adsorbed by a commercially available activated carbon (Granular Shirasagi manufactured by Takeda Chemical Industries (Ltd)) was measured at a temperature of 25 ° C. and 1 atm, it was 21.9 cc/g. In other words, the amount of methane adsorbed by the carbonaceous material of the present invention was 41% greater with regard to commercially available products.

EXAMPLE 34

Chemical Analysis of Chlorine

This was conducted by means of an oxygen flask combustion method. That is to say, approximately 10 mg of a carbon specimen were put into the platinum basket of a 500 ml volume combustion flask, 5 ml of an absorption liquid (0.04 mol/L of sodium hydroxide aqueous solution) were put into the flask, the inside of the flask was replaced with oxygen gas, then, after ignition, immediately sealed, and the carbon specimen combusted. After making the absorption liquid acidic with an aqueous solution of nitric acid, it was titrated with mercury nitrate using diphenylcarbazol as an indicator, and the chlorine measured quantitatively The carbonaceous material specimens (each 15 g) were manufactured in the following way. Carbonized Charcoal B was additionally carbonized at 600° C. for 30 minutes. Under a mixed gas flow of chlorine gas (0.1 L/min) and nitrogen gas (0.9 L/min), three specimens of Carbonized Charcoal B were chlorination treated by heating for 1 hour at a temperature of 500° C. for specimen (1), 600° C. for specimen (2), and 700° C. for specimen (3). If the weight increase after the chlorination treatment compared with the weight before the chlorination treatment are taken to be the reaction quantity of chlorine, the amount of chlorine in the chlorination treated carbon was (1): 71.0% by weight (0.241), (2): 43.0% by weight (0.146), and (3): 25.9% by weight (0.088). The chemical analysis values for the chlorine content of the chlorination treated carbonized charcoal were (1): 56.3% by weight (0.191), (2): 25.5% by weight (0.086), and (3): 16.2% by weight (0.055). The reason for the difference in the two numerical values is due to the decrease in carbon during the chlorination treatment. Moreover, the numerical values here are the weight of chlorine÷weight of carbon×100 (% by weight), the numerical values in parentheses are the atomic ratio of chlorine to carbon (Cl/C).

Carbonized charcoal which was obtained by additionally carbonizing Carbonized Charcoal B at 600° C. for 30 minutes was chlorination treated by heating for 1 hour at 500° C. under a mixed gas flow of chlorine gas (0.1 L/min) and nitrogen gas (0.9 L/min). Specimens, 15 g each, of this chlorination treated carbon were dechlorination treated by heating under a nitrogen gas flow (3 L/min) at temperatures of 800° C. for specimen (1), and 1000° C. for specimen (2), and 1200° C. for specimen (3). If the weight decrease after the dechlorination treatment with regard to the weight before the dechlorination treatment is taken to be the amount by which chlorine was reduced, and the value obtained by subtracting this from the amount of chlorine in the chlorination treated carbon is taken to be the amount of chlorine in the dechlorination treated carbon, then (1): was 19.8% by weight (0.067), (2): was 7.5% by weight (0.025), and (3): was 2.1% by weight (0.007). The chemical analysis values for the chlorine content of the dechlorination treated carbonized charcoal were (1): 15.8% by weight (0.054), (2): 6.6% by weight (0.022), and (3): 0.8% by weight (0.003). The reason for the difference in the two numerical values is due to the decrease in carbon during the dechlorination treatment. Moreover, the numerical values here are the weight of chlorine÷the weight of carbon×100 (% by weight), the numerical values in parentheses are the atomic ratio of chlorine to carbon (Cl/C).

When the amounts of nitrogen adsorbed by the above-mentioned specimens were measured at 25° C. and 1 atm, they were (1): 13.2 cc/g, (2): 14.5 cc/g, and (3): 15.1 cc/g. This performance is a greater value than that of any conventionally known activated carbon. In other words, when a dechlorination treatment is conducted after a chlorination treatment, even when part of the chlorine remains, the adsorption performance is improved and the results of the chlorine treatment of the present invention can be recognized.

EXAMPLE 35

Hydrogen, Composition Analysis of Carbon

Approximately 3 g of a carbonaceous material were completely combusted under a mixed gas flow of 0.1 L/min of oxygen and 0.9 L/min of nitrogen; and the amount of hydrogen was calculated by converting the hydrogen H to steam $H_2O$, and adsorbing it in a phosphorus pentaoxide $P_2O_5$ adsorption tube; then, the amount of steam was calculated from the variation in weight. The weight of the carbon C was taken to be the value of the weight of the carbonaceous material minus the weight of the hydrogen. The hydrogen/carbon (H/C) atomic ratio was calculated from this result.

Carbonaceous material (each 15 g) was manufactured in the following way. Carbonized Charcoal B was additionally carbonized at 600° C. for 30 minutes. 15 g of this carbonized charcoal was chlorination treated by heating at 500° C. for 1 hour under a nitrogen gas flow (1 L/min) which contained chlorine 10% by volume. Next, it is dechlorination treated by heating for 30 minutes at a temperature, recorded in Table 11, between 600 and 1300° C. under a nitrogen gas flow (3 L/min). In addition, it was dechlorination treated by heating for 15 minutes at a temperature of 700° C. under a nitrogen gas flow (1 L/min) which contained 3 g/min of steam.

With regard to this carbonaceous material, the results of the analysis of the composition of carbon and hydrogen by the method described above are as shown in the Table 11. Moreover, analysis was also made for carbonaceous material which was obtained by heating carbonized charcoal under a nitrogen current alone, and which was not given a chlorine treatment. When compared to carbonaceous material which was heat-treated at the same temperature under a nitrogen flow, the hydrogen content of the chlorine treated carbonaceous material had decreased to the level of about 0.6~0.7 times that of the carbonaceous material which was not chlorine treated. This shows that the hydrogen which is bonded to the unorganized carbon decreased relatively, and that a carbon net plane structure was developed.

TABLE 11

| Temperature of Heating Conducted under Nitrogen Gas Flow ° C. | (1) Carbon Treated with Chlorine | | (2) Carbon Not Treated with Chlorine | | Ratio (1)/(2) |
|---|---|---|---|---|---|
| | H/C wt % | (H/C Atomic ratio) | H/C wt % | (H/C Atomic ratio) | |
| 600 | 1.4 | (0.168) | — | — | — |
| 800 | 0.56 | (0.067) | 0.95 | (0.115) | 0.59 |
| 1000 | 0.22 | (0.026) | 0.37 | (0.044) | 0.59 |
| 1200 | 0.13 | (0.016) | 0.18 | (0.022) | 0.72 |
| 1300 | 0.10 | (0.012) | — | — | — |

EXAMPLE 37

True Density

Performed using a pycnometer method. That is to say, the weight of a pycnometer filled with water is $W_1$ (g), the weight when a specimen of carbonaceous material M (g) is put into the pycnometer and then filled with water is $W_2$ (g), and if the true density of water is made d, the true density of the carbonaceous material ρ can be obtained by $\rho=dm/(W_1+M-W_2)$. Moreover, a specimen of carbonaceous material was immersed in boiling water for 6 hours, and after the water had sufficiently soaked into the inside of the pores of the porous carbonaceous material, it was put into a pycnometer. In addition, because the water was ion exchanged water used at room temperature (25° C.), its true density d was 0.997 g/cm$^3$.

Carbonaceous material specimen (1) (15 g) was manufactured in the following way. Carbonized Charcoal B was additionally carbonized at 600° C. for 30 minutes. This was chlorination treated by heating at 500° C. for 1 hour under a nitrogen gas flow (1 L/min) which contained a chlorine concentration of 10% by volume. Next, it was dechlorination treated by heating for 30 minutes at a temperature of 800° C., 1000° C., and 1200° C. under a nitrogen gas flow. In addition, it was dechlorination treated by heating for 15 minutes at a temperature of 700° C. under nitrogen gas which contained 3 g/min of steam.

For the purpose of comparison, specimen (2) was obtained by heating Carbonized Charcoal B under nitrogen gas in the same conditions as specimen (1), but without conducting a chlorine treatment.

With regard to each specimen, the results of the measurement of the true density by the above described method are as shown in Table 12. That is, even when heated at the same temperature under nitrogen gas, the true density of the chlorine treated carbonaceous material obtained a value 0.01~0.03 g/cm$^3$ higher compared with the case in which there was no chlorine treatment. From this, it is presumed that as a result of the chlorine treatment, the crystallites of carbon or their accumulation forms have a specific structure.

TABLE 12

| Temperature of Heating Conducted Under Nitrogen Gas Flow ° C. | Specimen (1) g/cm$^3$ | Specimen (2) g/cm$^3$ |
|---|---|---|
| 800 | 1.78 | 1.75 |
| 1000 | 1.845 | 1.82 |
| 1200 | 1.86 | 1.85 |

EXAMPLE 38

Specific Surface Area

Carbonized Charcoal B was carbonized again for 30 minutes at 600° C. for specimen (2), 700° C. for specimen (3), 800° C. for specimen (4), and used as it was for specimen (1). These carbonized charcoals were chlorination treated by heating for 4 hours at 450° C. under a nitrogen gas flow which contained chlorine gas 10% by volume. Next, they were dechlorination treated by heating for 30 minutes at 1000° C. under a nitrogen gas flow, and, additionally, heating for 15 minutes at a temperature of 700° C. under nitrogen gas which contained 3 g/min of steam. When the surface area of each specimen was measured, they were (1): 1130 m$^2$/g, (2): 1090 m$^2$/g, (3): 810 m$^2$/g, and (4): 660 m$^2$/g.

Moreover, the value the specific surface area of the chlorine treated carbonaceous material of Example 25, written again, was 800 m$^2$/g. The values for the specific area for Example 27, written again, were (1): 780 m$^2$/g, (2): 790 m$^2$/g, (3): 790 m$^2$/q, (4): 830 m$^2$/g, and (5): 860 m$^2$/g. That is to say, the specific surface area of carbonaceous material which had been given chlorine treatment was 660~1130 m$^2$/g.

In contrast, Carbonized Charcoal B was heat-treated for 1 hour at 700° C. for specimen (1), and 1000° C. for specimen (2) under a nitrogen gas flow, and not given a chlorine treatment. Their specific surface areas were (1): 570 m$^2$/g, and (2): 600 m$^2$/g.

In addition, the values for the specific surface area of the carbon dioxide activated carbonaceous material obtained in Comparative Example 3, in which activation was conducted without conducting a chlorine treatment, written again, were (1): 990 m$^2$/g; (2): 1370 m$^2$/g, (3): 1750 m$^2$/g; and (4): 1920 m$^2$/g. In addition, the values of the specific surface area of steam activated Comparative Example 4, written again, were (1): 1120 m$^2$/g, (2): 1380 m$^2$/g, and (3): 1810 m$^2$/g. In other words, the specific surface area of activated carbonaceous material which has not been given a chlorine treatment is 990~1920 m$^2$/g.

In other words, it was found that the specific surface area of the chlorine treated carbonaceous material of the present invention, compared with material which has been given only a heat treatment, is greater, and compared with activation treated carbon, is relatively small.

EXAMPLE 39

Pore Volume

Carbonized Charcoal B was chlorination treated at 800° C., and the reaction quantity for chlorine was 8.5% by weight. Next, it was dechlorination treated by further heating for 15 minutes at 700° C. under a gas flow of nitrogen which had been saturated with steam at 25° C. The pore volume of the obtained carbonaceous material was 0.21 cm$^3$/g. In addition, Carbonized Charcoal B was chlorination treated at 350° C., and the reaction quantity for chlorine was 93% by weight (atomic ratio Cl/C was 0.315). Next, it was dechlorinated under the same conditions as described above. The pore volume of the obtained carbonaceous material was 0.48 cm$^3$/g. When the reaction quantity for chlorine in the chlorination treatment was in between the quantities of the above two situations, the carbonaceous material obtained had the value for pore volume in between the above-mentioned values for pore volume.

Used as a starting material, Carbonized Charcoal C was chlorination treated at a temperature of 700° C., and the reaction quantity for chlorine was 21% by weight, and the pore volume of the carbonaceous material, which was dechlorination treated under the same conditions as for the above-mentioned Carbonized Charcoal B, was 0.27 cm$^3$/g. In addition, Carbonized Charcoal C was chlorination treated at a temperature of 400° C., and the reaction quantity for chlorine was 67% by weight, and the pore volume of the carbonaceous material, which was dechlorination treated under the same conditions as described above, was 0.42 cm$^3$/g. When the reaction quantity for chlorine was in between the quantities of the above two situations, the carbonaceous material obtained had the value for pore volume after the dechlorination treatment had the value for pore volume in between the above-mentioned values for pore volume.

As a starting material, carbonized charcoal which was carbonized from vinylidene chloride resin at 600° C. was given a chlorination treatment at 600° C. with a chlorine reaction quantity of 40% by weight; the pore volume of the carbonaceous material, which was dechlorination treated under the same conditions as described above, was 0.29 cm$^3$/g. In addition, with a temperature of 400° C. for the chlorination treatment, and a reaction quantity for chlorine of 68% by weight, the carbonaceous material, which was then dechlorinated under the same conditions, had a pore volume of 0.39 cm$^3$/g.

Moreover, when the temperature of the heating conducted under a nitrogen gas flow is changed, the pore volume of the obtained carbonaceous material is, in contrast to the numerical values mentioned above, a little smaller at 700° C., and a little larger at 1300° C. In addition, taking the weight of carbon to be the weight before the chlorination treatment, and taking the weight of chlorine as the weight increase after the chlorination treatment, the chlorine reaction quantity is the value expressed by the weight of chlorine÷the weight of carbon÷100. In addition, the value of the pore volume of Example 27, which was given a chlorine treatment, written again, were (1): 0.31 cm$^3$/g, (2): 0.32 cm$^3$/g, (3): 0.33 cm$^3$/g, (4): 0.33 cm$^3$/g, and (5): 0.33 cm$^3$/g.

In contrast, the pore volume when a heat treatment is conducted on carbonized charcoal under nitrogen gas, without conducting a chlorine treatment, is as follows. The pore volume of heat-treated carbon, which was obtained by heat-treating Carbonized Charcoal B at 700~1300° C., was 0.15~0.18 cm$^3$/g. The pore volume of heat-treated carbon, which was obtained by heat-treating Carbonized Charcoal C at 800° C. for 15 minutes, was 0.21 cm$^3$/g. The pore volume of heat-treated carbon, which was obtained by heat-treating carbonized charcoal, obtained using furan resin as a starting material, at 800° C. for 15 minutes, was 0.07 cm$^3$/g.

When the above was put together, it was found that even though the pore volume of carbonaceous material on which only a heat treatment has been conducted was about 0.07~0.21 cm$^3$/g, the pore volume of chlorine treated char was about 0.21~0.48 cm$^3$/g, and the pore volume of chlorine treated carbonaceous material is greater.

EXAMPLE 40

The Relationship of the Amount of Nitrogen Adsorbed with Specific Surface Area and Pore Volume.

For the carbonaceous material of the present invention, Table 13 records the conditions for the type of carbonized charcoal starting material, the temperature of the second carbonization, the temperature of the chlorination treatment (the time: 60 minutes; chlorine concentration 10% by volume), and temperature of the heat-treatment conducted in a nitrogen gas flow during the chlorination treatment; the same Table shows the specific surface area, pore volume, and the amount of nitrogen adsorbed for a situation in which the above conditions were followed by a heat-treatment conducted at 700° C. for 15 minutes under a gas flow of nitrogen which had been saturated with steam at 25° C.

As a comparison, Table 14 records the conditions of the type of carbonized charcoal starting material, the type of activation gas, the temperature of activation treatment, and the activation yield for a situation in which an activation treatment was conducted without a chlorine treatment being conducted; and the specific surface area, pore volume, and the amount of nitrogen adsorbed for these conditions are shown in the same columns of the same table.

In addition, as a comparison, Table 15 shows the conditions of the type of carbonized charcoal starting material, and the temperature of the heat treatment (time: 30 minutes) for a situation in which a heat treatment was conducted under nitrogen gas without a chlorine treatment being conducted; and the specific surface area, the pore volume, and the amount of nitrogen adsorbed for these conditions are shown in the same columns of the same table.

Figure 19:
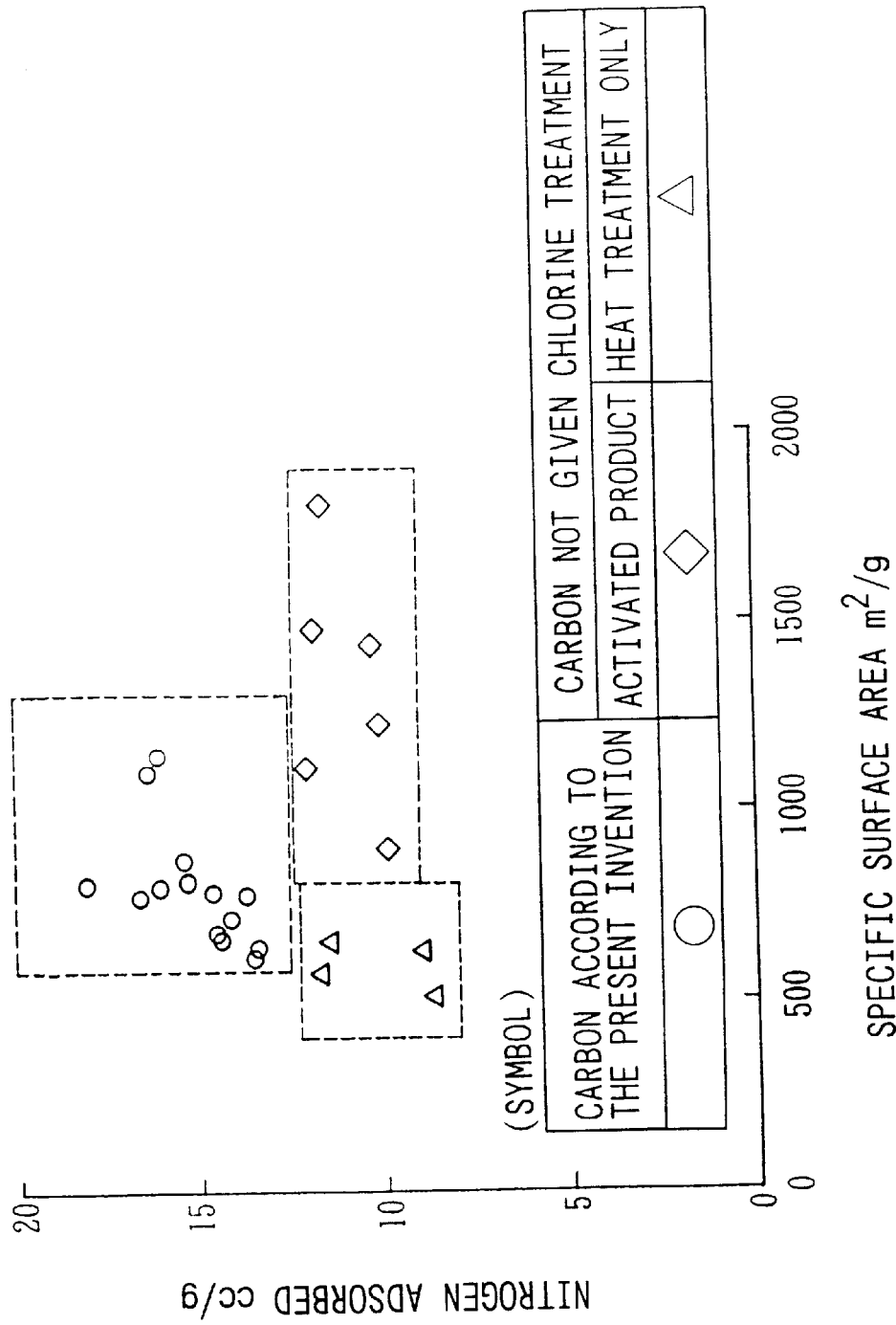
FIG. 19 is a graph which shows the relationship between the amount of nitrogen adsorbed and the specific surface area according to Example 40.
Figure 20:
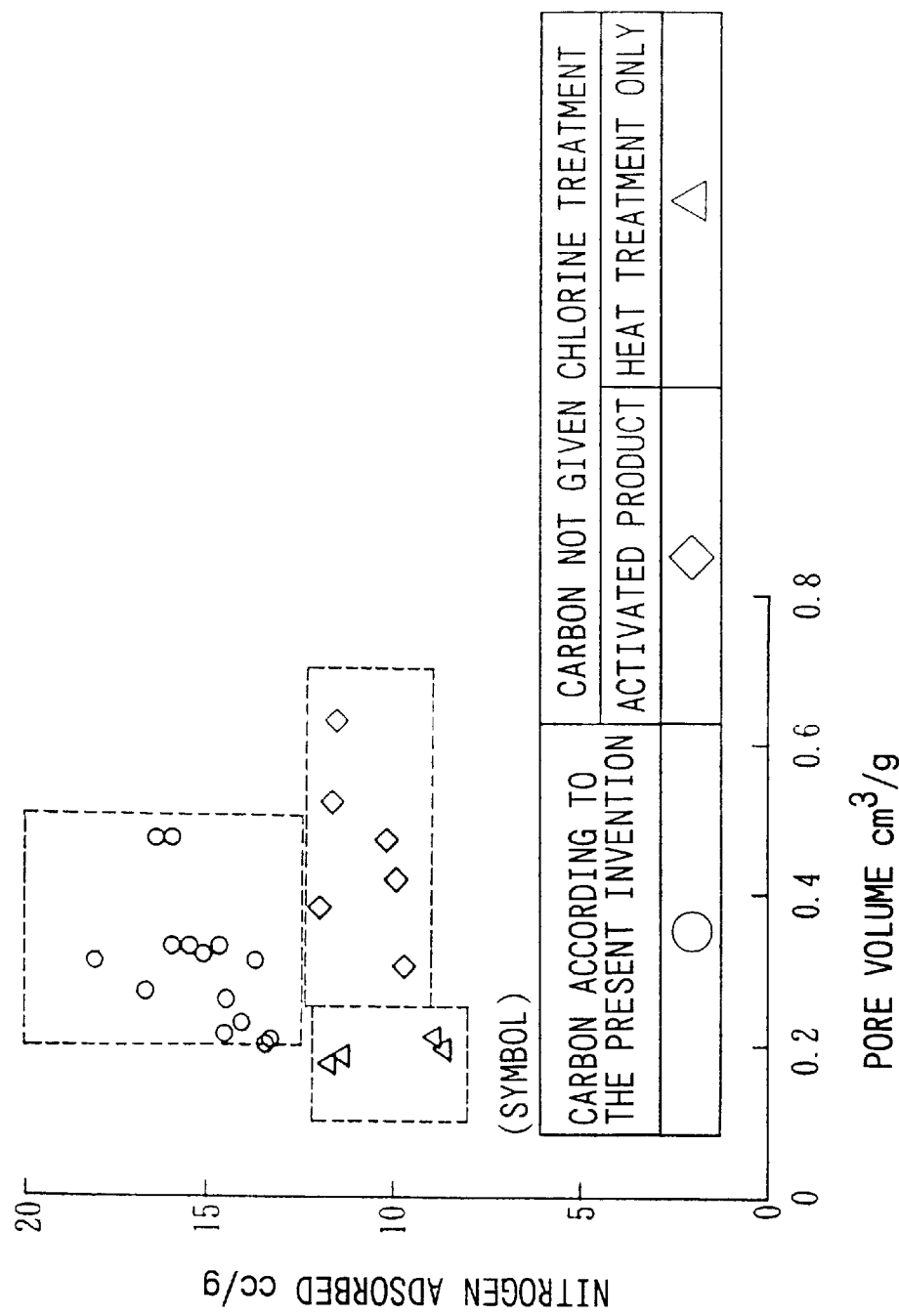
FIG. 20 is a graph which shows the relationship between the amount of nitrogen adsorbed and the pore volume according to Example 40.

These results are shown in FIG. 19 (specific surface area and amount of nitrogen adsorbed) and in FIG. 20 (pore volume and the amount of nitrogen adsorbed). It was found that the material which was only given an activation treatment had a specific surface area in the range of 890~1810 m$^2$/g, and the amount of nitrogen adsorbed was between 9.8 and 12.0 cc/g; the material which was only given a heat treatment under a nitrogen gas flow had a specific surface area in the range of approximately 520~650 m$^2$/g, and the amount of nitrogen adsorbed was between 8.7 and 11.8 cc/g; and in contrast, the carbonaceous material which was given the halogen treatment according to the present invention had a specific surface area in the range of 605~1130 cm$^3$/g, and the amount of nitrogen adsorbed was between 13.4 and 18.0 cc/g.

In addition, it was found that the material which was only given an activation treatment had a pore volume in the range of 0.31~0.63 cm$^3$/g, and the amount of nitrogen adsorbed was between 9.8 and 12.0 cc/g; the material which was only given a heat treatment under a nitrogen gas flow had a pore volume in the range of 0.18~0.21 cm$^3$/g, and the amount of nitrogen adsorbed was between 8.7 and 11.8 cc/g; and in contrast, the carbonaceous material which was given the halogen treatment according to the present invention had a pore volume in the range of 0.20~0.47 cm$^3$/g, and the amount of nitrogen adsorbed was between 13.4 and 18.0 cc/g.

It is believed that the porous carbonaceous material forms particular adsorption sites which are determined from the properties of the pores such as the specific surface area and the pore volume. Adsorption of nitrogen, carbon dioxide, and the like depends on the affinity of the individual components for the site of adsorption. Therefore, it is believed that the formation of various pores due to differences in each condition of the halogen treatment of the present invention is responsible for adsorption properties which are different for each adsorption component.

EXAMPLE 41

Pore Radius

It is possible to calculate the relationship of pore diameter to for a porous carbonaceous material by the application of the Kelvin Equation, which is based on capillary condensation theory, to the steam adsorption which occurs in porous carbonaceous material. The Kelvin Equation is $\ln(P_0/P) = 2V_L\gamma \cos\theta/(rRT)$. Here, $P_0$ is the saturated vapor pressure of water, P is the vapor pressure of water, and $V_L$ is the molecular volume of the condensation liquid (18.07 cm$^3$/mol). $\gamma$ is the surface tension of water, and has a value of 0.07196 N/m at 25° C. $\theta$ is the contact angle of water and carbon, and has a value of 48.5°. r is the diameter of the capillary tube. R is the gas constant (8.315 J/(K·mol)). T is the temperature, 25° C. (=298.1K).

TABLE 13

| Specimen | Type of Carbonized Charcoal | [A](*1) Temperature ° C. | [B](*2) Temperature ° C. | [C](*3) Temperature ° C. | Specific Surface Area m$^2$/g | Pore Volume cm$^3$/g | Amount of Nitrogen Adsorbed cc/g |
|---|---|---|---|---|---|---|---|
| (1) | A | 600 | 550 | 630 | 605 | 0.20 | 13.5 |
| (2) | A | 600 | 550 | 900 | 710 | 0.24 | 14.1 |
| (3) | A | 700 | 450 | 800 | 674 | 0.23 | 14.5 |
| (4) | A | 800 | 430 | 900 | 625 | 0.22 | 13.4 |
| (5) | B | 600 | 550 | 650 | 780 | 0.31 | 13.7 |
| (6) | B | 600 | 550 | 750 | 791 | 0.33 | 14.7 |
| (7) | B | 600 | 550 | 850 | 860 | 0.33 | 15.4 |
| (8) | B | 600 | 600 | 1000 | 794 | 0.33 | 16.0 |
| (9) | B | 600 | 350 | 1000 | 1097 | 0.47 | 16.3 |
| (10) | B | 500(*4) | 450 | 1000 | 1130 | 0.47 | 16.0 |
| (11) | B | 700 | 450 | 1000 | 811 | 0.32 | 15.3 |
| (12) | B | 800 | 450 | 1000 | 660 | 0.26 | 14.5 |
| (13)(*5) | B | 600 | 500 | 1000 | 800 | 0.31 | 18.0 |
| (14)(*6) | B | 600 | 600 | 1000 | 670 | 0.27 | 16.6 |

(*1)[A] second carbonization
(*2)[B] Chlorination treatment
(*3)[C] Heating conducted under a nitrogen gas flow
(*4)Temperature of first carbonization (this specimen was not carbonized twice)
(*5)Specimen (1) of Example 30 which was given a bromine treatment
(*6)Specimen (2) of Example 30 which was given a bromine treatment

TABLE 14

| Specimen | Type of Carbonized Charcoal | Type of Activation Gas | Activation Temperature ° C. | Activation Yield % | Specific Surface Area m$^2$/g | Pore Volume cm$^3$/g | Amount of Nitrogen Adsorbed cc/g |
|---|---|---|---|---|---|---|---|
| (1) | A | $CO_2$ | 900 | 85 | 890 | 0.31 | 9.8 |
| (2) | A | $CO_2$ | 900 | 74 | 1430 | 0.47 | 10.2 |
| (3) | A | $H_2O$ | 850 | 80 | 1320 | 0.42 | 10.0 |
| (4) | B | $CO_2$ | 900 | 78 | 1100 | 0.37 | 12.0 |
| (5) | B | $CO_2$ | 900 | 68 | 1480 | 0.52 | 11.8 |
| (6) | B | $CO_2$ | 900 | 55 | 1810 | 0.63 | 11.6 |

TABLE 15

| Specimen | Type of Carbonized Charcoal | Temperature of Heating Under Nitrogen Gas ° C. | Specific Surface Area m$^2$/g | Pore Volume cm$^3$/g | Amount of Nitrogen Adsorbed cc/g |
|---|---|---|---|---|---|
| (1) | A | 900 | 520 | 0.20 | 8.7 |
| (2) | A | 1200 | 630 | 0.21 | 8.9 |
| (3) | B | 800 | 580 | 0.18 | 11.8 |
| (4) | B | 1200 | 650 | 0.19 | 11.5 |

The quantity of steam adsorbed by the porous carbonaceous material was calculated by putting approximately 5 g of a pelletized carbon specimen into a weighing container, leaving it for 48 hours at 25° C. in a vessel in which the vapor pressure P had been adjusted by means of the concentration of sulfuric acid aqueous solution, and then, after reaching adsorption equilibrium, measuring the weight variation (w g). The pore volume per 1 g of carbonaceous material is calculated by dividing the quantity of water adsorbed (w g), the concentration of water at 25° C. (0.997/ cm³), by the quantity of the specimen (g). The accumulated pore volume of up to the vapor pressure of water P is a pore volume of less than the pore radius r.

The specimens were made in the following way. Specimen (1) was obtained by conducting a chlorination treatment on Carbonized Charcoal A for 60 minutes at a temperature of 450° C. under a gas flow of nitrogen which contained chlorine gas 10% by volume, next, a dechlorination treatment was conducted by heat-treating it for 30 minutes at a temperature of 950° C. under nitrogen gas, and, additionally, heating it at a temperature of 700° C. for 15 minutes under a gas flow of nitrogen which had been saturated with steam at 25° C. A chlorination treatment was conducted on Carbonized Charcoal B by heating for 60 minutes at a temperature of 350° C. for specimen (2), 500° C. for specimen (3), and 600° C. for specimen (4) under a gas flow of nitrogen which contained chlorine gas 10% by volume. Next, each of specimens (2), (3), and (4) were dechlorinated by heat-treating for 30 minutes at a temperature of 1000° C. under nitrogen gas, and, additionally, heating at a temperature of 700° C. for 15 minutes under a gas flow of nitrogen which had been saturated with steam at 25° C.

Figure 21:
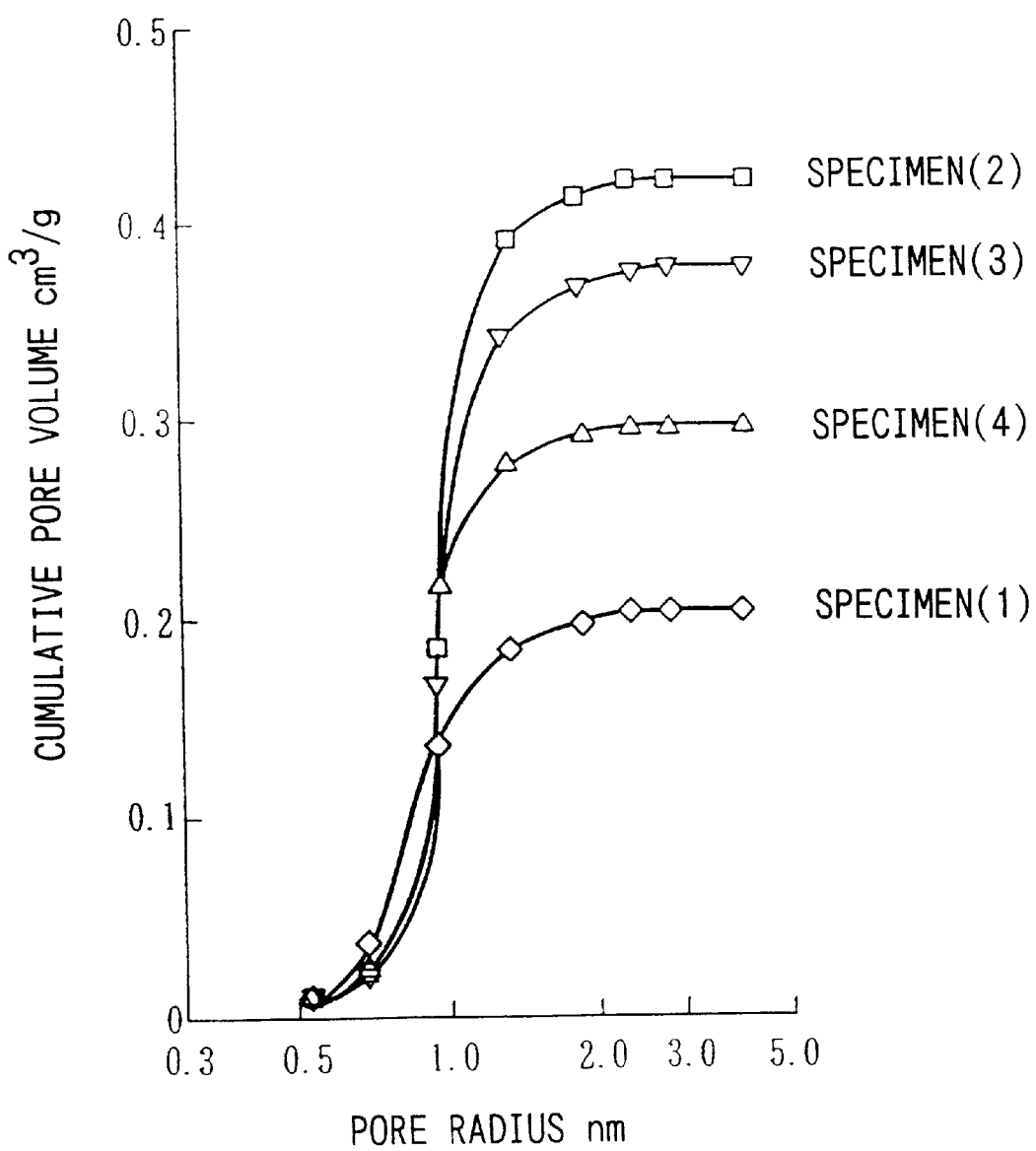
FIG. 21 is a graph which shows the relationship between the accumulated pore volume and pore radius according to Example 41.

With Regard to the four specimens, FIG. 21 shows the results calculated for the relationship of pore radius and accumulated pore volume by means of the above described method. When the pore radius is 3.0 nm or greater the accumulated pore volume becomes a roughly fixed value. This is called the overall pore volume. The overall pore volume, the pore volume for a radius of 1.5 nm or less, and the ratio of the pore volume for a radius of 1.5 nm or less to overall pore volume are shown in Table 16. The ratio for the accumulated pore volume for 1.5 nm or less to the overall pore volume is approximately 93~95%.

TABLE 16

| Specimen | Pore Volume for Radius of Less Than 1.5 nm I (cm³/g) | Total Pore Volume II (cm³/g) | Ratio (I/II) |
| --- | --- | --- | --- |
| (1) | 0.191 | 0.205 | 0.932 |
| (2) | 0.402 | 0.424 | 0.948 |
| (3) | 0.355 | 0.378 | 0.939 |
| (4) | 0.286 | 0.300 | 0.953 |

EXAMPLE 42

X-ray Diffraction

The following treatments were conducted on the carbonaceous material specimens which were obtained from a carbonized charcoal starting material which was prepared by additionally Carbonizing Carbonized Charcoal B for 30 minutes at a temperature of 600° C. Each specimen was 15 g.

Chlorine treatments were conducted on specimens (1)~(5). Carbonized charcoal was chlorination treated by heating under a nitrogen gas flow (1 L/min) which contained chlorine gas at 10% by volume. The temperatures and times for the chlorination treatments were 500° C. for 1 hour for specimens (1), (2), and (3); 350° C. for 4 hours for specimen (4); and 600° C. for 1 hour for specimen (5). Next, they were dechlorination treated by heating for 30 minutes under a nitrogen gas flow (3 L/min). The temperatures for the dechlorination treatment were 1000° C. for specimen (1), 1200° C. for specimen (2), 1500° C. for specimen (3), and 1000° C. for specimens (4) and (5). Additionally, they were dechlorination treated by heating for 15 minutes at a temperature of 700° C. under a nitrogen gas flow which contained 3 g/min of steam (specimens (1)~(5) were treated the same).

Specimens (6)~(9) were obtained from carbonized charcoal which was heated for 30 minutes under a nitrogen gas flow (3 L/min) without conducting chlorine treatments. The temperature of the heating was 800° C. for specimen (6), 1000° C. for specimen (7), 1200° C. for specimen (8), and 1500° C. for specimen (9).

Specimen (10) and (11) were obtained from carbonized charcoal which was heated for 30 minutes at a temperature of 1200° C. under a nitrogen gas flow (3 L/min) without conducting chlorine treatments, then activation was conducted by heating at a temperature of 900° C. in a carbon dioxide atmosphere. The time for the activation was 1.5 hours at 900° C. for specimen (10), and 2.5 hours for specimen (11). The carbon yield in the activation was 80% for specimen (10), and 65% for specimen (11).

With regard to each specimen manufactured, the carbonaceous material specimens was crushed by means of agate mortar and put through a 150 mesh. To this, 15% by weight of silicon (99.99%; manufactured by Kanto Kagaku (Ltd)) which had been crushed and put through a 325 mesh was added as a standard material, mixed by means of agate mortar, and then uniformly put into a specimen plate of approximately 2 mm depth. The X-ray diffraction pattern was measured using an automatic recording X-ray diffraction device (Rigaku RINT1100V (with a baseline correction function) manufactured by Rigaku Denki (Ltd)). The X-ray source used a CuK α line ($\lambda$=1.5418 nm). The K β line was removed using a nickel filter. The applied voltage was 40 kv, the current was 30 mA, the scan speed was 1°/min, and the sampling angle was 0.02°. The diffraction angle 2θ of the (002) of carbon is calculated by conducting background correction of the obtained diffraction pattern, measurement of the diffraction angle 2θ of the diffraction pattern of the (002), and, furthermore, correction using the value of the diffraction angle 2θ for the silicon standard; then, the distance of the (002) was calculated from the Brag Equation, $2d \sin \theta = \lambda$.

The results of the measurement of the distance of the (002) of the crystallites are shown in Table 17. The distance of the (002) of the carbonaceous material was 0.406~0.428 nm for chlorine treated carbonaceous material, and 0.379~0.396 nm for non-chlorine treated carbonaceous material. The chlorine treated carbonaceous material value was larger.

TABLE 17

| Specimen | Treatment Conditions | | d(002) nm |
|---|---|---|---|
| | Chlorination Temperature °C. | Temperature of Heating Under Nitrogen Gas Flow °C. | |
| (1) | 500 | 1000 | 0.423 |
| (2) | 500 | 1200 | 0.428 |
| (3) | 500 | 1500 | 0.409 |
| (4) | 350 | 1000 | 0.406 |
| (5) | 600 | 1000 | 0.417 |
| (6) | none | 800 | 0.396 |
| (7) | none | 1000 | 0.395 |
| (8) | none | 1200 | 0.394 |
| (9) | none | 1500 | 0.379 |
| (10) | none | 1200 | 0.392 |
| (11) | none | 1200 | 0.394 |

EXAMPLE 43

Raman Spectrum

The specimens (15 g) were manufactured in the following way. Carbonized Charcoal B was additionally carbonized for 30 minutes at 600° C. The carbonized charcoal was in a pellet form (small cylinders). 15 g of this carbonized charcoal were chlorination treated by heating for 1 hour at a temperature of 500° C. under a nitrogen gas flow (1 L/min) which contained chlorine gas at 10% by volume. Next, it was dechlorination treated by heating for 30 minutes at a temperature of 1000° C under a nitrogen gas flow (3 L/min), and, additionally, heating it for 15 minutes at a temperature of 700° C. under a nitrogen gas flow (1 L/min) which contained 3 g/min of steam.

Measurement of the Raman spectrum of this specimen was conducted. The device used was a microlaser Raman spectrometer model NR-1800 manufactured by Nippon Bunko (Ltd). For measurement (1), the specimen was crushed, molded into a tablet, and loaded into a specimen holder. The light source was a 300 mW Kr+ laser (647.1 nm), the exposure was 60 seconds, the number of integration was one, the detection element was a CCD (charge coupled device) type, and macro (about 30 times) back scattering was measured. For measurements (2) and (3), specimen pellets were loaded into the specimen holder as they were. The light source was a 75 mW Kr+ laser (647.1 nm), the exposure was 60 seconds, the detection element was a CCD (charge coupled device) type, and micro (about 500 times) back scattering was measured. The number of integration for measurement (2) was one. Measurement (3) was repeated four times and the average value taken.

The results (the strength of the Raman scattering, in other words, the height of the peaks) are as shown in Table 18. It is believed that the peak of 1325 cm$^{-1}$ corresponds to the defects of the unorganized carbon and the crystals or number of irregularities, the peak of 1605 cm-l corresponds to the perfection of the crystals, and the G value (the strength of 1325 cm$^{-1}$ the strength of 1605 cm$^{-1}$), which is a comparison of these, is an indicator which expresses the degree of crystallization of the carbonaceous material.

TABLE 18

| Measurement | Height of 1325 cm$^{-1}$ mm | Height of 1605 cm$^{-1}$ mm | Comparative Strength (G value) (1325/1605) |
|---|---|---|---|
| (1) | 30.0 | 21.5 | 1.40 |
| (2) | 12.0 | 9.0 | 1.33 |
| (3) | 54.0 | 42.5 | 1.27 |

EXAMPLE 44

Electrical Conductivity 15 g of phenol resin fiber (product name: Kainol, manufactured by Gun-ei Chemical Industry (Ltd)) were carbonized (30 minutes) at 600° C. under a nitrogen gas flow (2 L/min). This was chlorination treated by heating for 3 hours at a temperature of 600° C. under a nitrogen gas flow (1 L/min) which contained chlorine gas at 10% by volume. Next, a dechlorination treatment was conducted by heating for 30 minutes at a temperature of 800° C. for specimen (1), 1000° C. for specimen (2), and 1200° C. for specimen (3), and, additionally, heating for 15 minutes at a temperature of 700° C. under a gas flow of nitrogen (1 L/min) which had been saturated with steam at 25° C.

Figure 22:
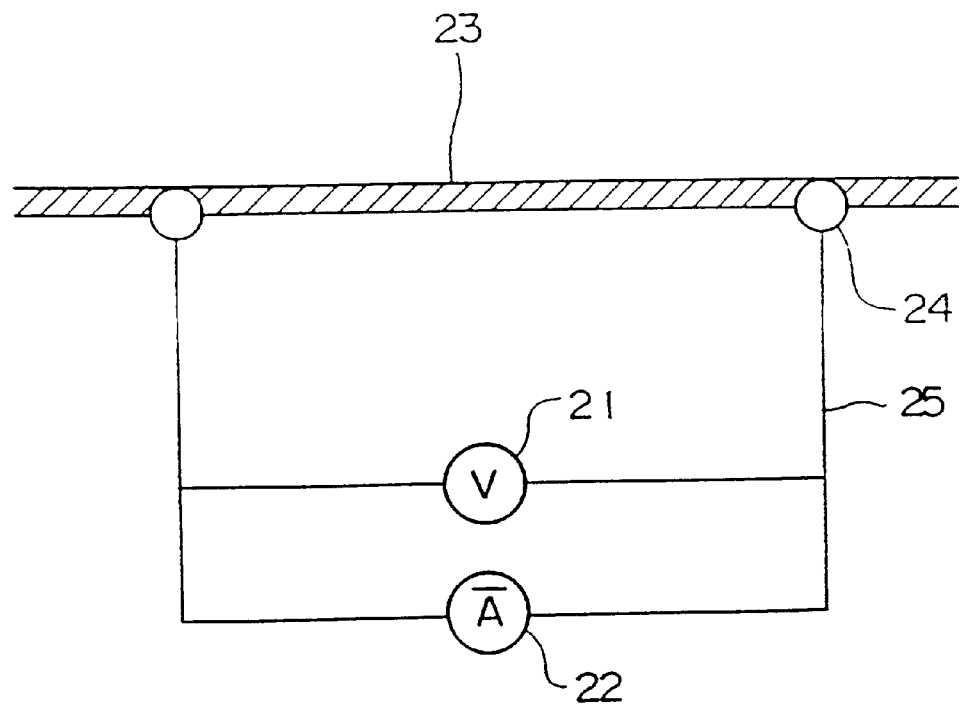
FIG. 22 is a diagram showing an outline of the measurement method for electrical conductivity according to Example 44.

The electrical conductivity at 25° C. was measured for each carbon fiber specimen. An outline of the measuring method is shown in FIG. 22. The diameter of the fibers of the carbon was 10 $\mu$m, and the length for measurement for the fibers was made 5 mm. The fibers of carbon and gold (Au) wire were connected by silver (Ag) paste. A 6 mV electric current (the equipment used was a 224-Programmable Current Source manufactured by Keithley Company) was run through the fibers of carbon and the voltage at that time measured (the equipment was a 195A-Digital Multimeter manufactured by Keithley Company). The electrical conductivity of the carbonaceous material was calculated from the diameter of the carbon fibers, their length, the electric current, and the voltage. The results were (1): 37 S/cm, (2): 49 S/cm, and (3): 85 S/cm.

The Values for the upper Limits and Lower Limits

The values for upper limits and the lower limits of the main parameters of the present invention are shown below. The value for the upper limit for the atomic ratio (Cl/C) for the chlorinated carbonized charcoal is 0.315 (Example 39), and the value for the lower limit is 0.032 (Example 15 (1)). The value for the upper limit for the temperature of the chlorination step is 1000° C. (Example 15 (3)), and the value for the lower limit is 350° C. (Example 5 (1), Example 17 (1), and others). The value for the upper limit for the temperature of the high temperature dechlorination treatment is 1300° C. (Example 20 (9)), and the value for the lower limit is 600° C. (Example 19 (1)). The value of the upper limit for the temperature of the low temperature dechlorination treatment is 800° C. (Example 16 (3)), and the value of the lower limit is 600° C. (Example 14 (1), and many others).

Industrial Applicability

As explained above, by giving carbonized charcoal a halogen treatment, a porous carbonaceous material can be obtained at a high carbon yield. For this obtained porous carbonaceous material, the amount of nitrogen adsorbed is 15~50% greater than conventional carbonaceous material, and adsorption of carbon dioxide and methane is also remarkably increased. When this porous carbonaceous material is used as electrical double layer capacitor carbon, the electrostatic capacity is increased 50~60% over that of the conventional carbonaceous material. In other words, by means of the manufacturing method for porous carbonaceous material of the present invention, a carbonaceous material is obtained which has micropores and/or submicropores which are suitable for the adsorption of small molecules such as nitrogen, and for storage of electrochemical energy.

The specific porous carbonaceous material obtained by means of the manufacturing method of the present invention is considered to be usable in various applications such a nitrogen and oxygen adsorption agent, a catalyst or its carrier, a electrochemical energy storage medium, a biochemical connection material and so on.

What is claimed is:

1. A manufacturing method for a porous carbonaceous material characterized by conducting a halogen treatment comprising:

a halogenation step wherein a halogenation heat treatment for preparing a halogenated carbonized charcoal having an atomic ratio of halogen to carbon of 0.07 or greater is conducted by bringing a carbon consisting essentially of carbonized charcoal into contact with a halogen gas consisting essentially of chlorine or bromine; and followed by a subsequent dehalogenation step wherein a dehalogenation treatment is conducted in which a part of or all halogen atoms in said halogenated carbonized charcoal are eliminated, wherein the atomic ratio of halogen to carbon is reduced to 0.06 or less by heating said halogenated carbonized charcoal under vacuum evacuation, in an inert gas, in a gas of a hydrogen containing compound or hydrogen, or in a gas of a hydrogen containing compound or hydrogen diluted with an inert gas.

2. A manufacturing method for a porous carbonaceous material according to claim 1, wherein said halogenation is a heat treatment conducted at a temperature of from 350 to 1000° C. in a halogen gas diluted with an inert gas.

3. A manufacturing method for a porous carbonaceous material according to claim 1, wherein said dehalogenation treatment is a high temperature dehalogenation treatment in which the halogenated carbonized charcoal is heated at a temperature of from 600 to 1300° C. under vacuum evacuation.

4. A manufacturing method for a porous carbonaceous material according to claim 1, wherein said dehalogenation treatment is a high temperature dehalogenation treatment in which the halogenated carbonized charcoal is heated at a temperature of from 600 to 1300° C. in an inert gas.

5. A manufacturing method for a porous carbonaceous material according to claim 1, wherein said dehalogenation treatment is a low temperature dehalogenation treatment in which the halogenated carbonized charcoal is heated at a temperature of from 600 to 850° C. in a gas of a hydrogen containing compound or hydrogen, or in a gas of a hydrogen containing compound or hydrogen diluted with an inert gas.

6. A manufacturing method for a porous carbonaceous material according to claim 1, wherein said dehalogenatioh treatment is a treatment selected from the group consisting of:

a treatment in which a high temperature dehalogenation treatment, in which said halogenated carbonized charcoal is heated at a temperature of 600 or 1300° C. in an inert gas or under vacuum evacuation followed by a low temperature dehalogenation treatment, in which said halogenated carbonized charcoal is heated at a temperature of from 600 to 850° C. in a gas of a hydrogen containing compound or in a gas of a hydrogen containing compound diluted with an inert gas;

a treatment in which said low temperature dehalogenation treatment is followed by said high temperature dehalogenation treatment; and a treatment in which said high temperature dehalogenation treatment, said low temperature dehalogenation treatment, and said high temperature dehalogenation treatment follow each other.

7. A manufacturing method for a porous carbonaceous material according to claim 5, wherein said hydrogen containing compound is at least one selected from the group consisting of water and low molecular weight hydrocarbons.

8. A manufacturing method for a porous carbonaceous material according to claim 1, wherein said carbonized charcoal is at least one carbonized substance selected from the group consisting of coconut shell, phenol resin, furan resin, and vinylidene chloride resin.

9. A porous carbonaceous material obtained by the method of claim 1, wherein an atomic ratio of halogen to carbon is 0.06 or less, a true density is from 1.75 to 1.90 g/cm$^3$, a strength ratio G, which is a ratio of a strength of Raman scattering at 1325 cm$^{-1}$ with respect to a strength of Raman scattering at 1605 cm$^{-1}$ according to laser Raman spectroscopy, is from 1.2 to 1.5, and an atomic ratio of hydrogen to carbon is from 0.01 to 0.17.

10. A porous carbonaceous material according to claim 9 characterized by having a nitrogen adsorption capacity of from 12.5 to 20 cc/g at 25° C. and 1 atm.

11. A porous carbonaceous material according to claim 9 characterized by having a carbon dioxide adsorption capacity of from 60 to 90 cc/g at 25° C. and 1 atm.

12. A porous carbonaceous material according to claim 9 characterized by having a methane adsorption capacity of from 25 to 33 cc/g at 25° C. and 1 atm.

13. A porous carbonaceous material according to claim 9 characterized by comprising crystallites in which distance (002) of the crystallites is from 0.40 to 0.43 nm according to X-ray diffraction measurement.

14. A porous carbonaceous material according to claim 9 characterized by comprising carbons of the polyaromatic ring structures in an amount of from 66 to 74% of all carbon according to X-ray photoelectron spectroscopy.

15. A porous carbonaceous material according to claim 9, which has a specific surface area of from 600 to 1300 m$^2$/g, and a pore volume of from 0.20 to 0.50 cm$^3$/g, wherein 90% or greater of said pore volume is from pores having a pore radius of 1.5 nm or less.

16. A porous carbonaceous material according to claim 9 having an electrical conductivity of from 30 to 100 S/cm at room temperature.

17. A porous carbonaceous material according to claim 9 having an electrostatic capacity for an electrical double layer capacitor of from 70 to 90 F/cm$^3$.

18. An electrical double layer capacitor comprising as electrode material a porous carbonaceous material according to claim 9.

19. An adsorbent composition for a gas comprising a porous carbonaceous material according to claim 9.

20. A material selected from the group consisting of a catalyst and a carrier, the material comprising a porous carbonaceous material according to claim 9.

21. An electrochemical energy storage medium comprising as an electrochemical energy storage composition, a porous carbonaceous material according to claim 9.

22. A biochemical composition comprising as a biochemical material, a porous carbonaceous material according to claim 9.

23. An activation method which selectively gasifies only halogenated carbon in which halogen atoms are bonded to carbon atoms, the activation method comprising the steps of: preparing a halogenated carbonized charcoal by bring a carbonized charcoal into contact with a halogen gas; and thereafter conducting a heat treatment on said halogenated carbonized charcoal at a temperature of from 500 to 800° C. in steam or in steam which has been diluted with inert gas.

24. An activation method according to claim 23, wherein said halogen gas includes at least one halogen gas selected from the group consisting of chlorine and bromine.

* * * * *